(12) United States Patent
Bennett, Jr. et al.

(10) Patent No.: US 10,372,537 B2
(45) Date of Patent: Aug. 6, 2019

(54) ELASTIC METADATA AND MULTIPLE TRAY ALLOCATION

(71) Applicant: Hitachi Vantara Corporation, Santa Clara, CA (US)

(72) Inventors: Charles C. Bennett, Jr., Carlisle, MA (US); Nathan W. Clark, Millbury, MA (US); Kevin S. Canuette Grimaldi, Watertown, MA (US); Morgan Tyler Maxwell, Ashland, MA (US); Clayton A. Curry, Framingham, MA (US); Robert Barton Cooper, Somerville, MA (US)

(73) Assignee: Hitachi Vantara Corporation, Santa Clara, CA (US)

( * ) Notice: Subject to any disclaimer, the term of this patent is extended or adjusted under 35 U.S.C. 154(b) by 165 days.

(21) Appl. No.: 15/308,916

(22) PCT Filed: Oct. 7, 2015

(86) PCT No.: PCT/US2015/054510
§ 371 (c)(1),
(2) Date: Nov. 4, 2016

(87) PCT Pub. No.: WO2016/093937
PCT Pub. Date: Jun. 16, 2016

(65) Prior Publication Data
US 2017/0075781 A1    Mar. 16, 2017

Related U.S. Application Data

(63) Continuation-in-part of application No. PCT/US2014/069206, filed on Sep. 12, 2014.

(51) Int. Cl.
*G06F 11/00* (2006.01)
*G06F 11/10* (2006.01)
(Continued)

(52) U.S. Cl.
CPC .......... *G06F 11/1076* (2013.01); *G06F 3/064* (2013.01); *G06F 3/0619* (2013.01);
(Continued)

(58) Field of Classification Search
CPC ............. G06F 11/1076; G06F 11/0727; G06F 11/2094
See application file for complete search history.

(56) References Cited

U.S. PATENT DOCUMENTS 5,515,502 A    5/1996  Wood
7,949,847 B2   5/2011  Murase
(Continued)

OTHER PUBLICATIONS

Erik Ponds, "Drobo Technology Innovation", Drobo, Inc., Jul. 2011, p. 1-32.
(Continued)

*Primary Examiner* — Charles Ehne
(74) *Attorney, Agent, or Firm* — Mattingly & Malur, PC

(57) ABSTRACT

In some examples, both object data and corresponding metadata are stored on thin provisioned block storage in which blocks for the storage of the object data and the metadata are dynamically provisioned from a shared pool. For instance, the metadata may be stored on the block storage using a tree data structure that may grow proportionally with the corresponding stored object data. The object storage may automatically adapt to the size and number of objects being stored, and storage space for metadata may be allocated dynamically on demand. Additionally, some implementations include storing data across multiple trays. For instance, a plurality of storage extents of an extent group may be allocated across a plurality of storage devices on multiple trays. The extent allocation may be tray-aware by allocating extents to maximize the probability that data remains available/recoverable in the presence of a failure in one or more trays.

20 Claims, 37 Drawing Sheets

(51) Int. Cl.
*G06F 11/20* (2006.01)
*G06F 11/07* (2006.01)
*G06F 3/06* (2006.01)

(52) U.S. Cl.
CPC .......... *G06F 3/0631* (2013.01); *G06F 3/0689* (2013.01); *G06F 11/0727* (2013.01); *G06F 11/1048* (2013.01); *G06F 11/2069* (2013.01); *G06F 11/2094* (2013.01); *G06F 2201/805* (2013.01)

(56) References Cited

U.S. PATENT DOCUMENTS

| | | | |
|---|---|---|---|
| 8,185,551 B2 | 5/2012 | Kuszmaul et al. | |
| 8,402,346 B2 | 3/2013 | Goel et al. | |
| 8,627,331 B1 | 1/2014 | Grunwald et al. | |
| 8,688,798 B1 | 4/2014 | Lentini | |
| 8,706,701 B1 | 4/2014 | Stefanov et al. | |
| 8,745,338 B1* | 6/2014 | Yadav | G06F 17/30153 707/693 |
| 8,832,363 B1* | 9/2014 | Sundaram | G06F 11/108 711/103 |
| 8,850,130 B1 | 9/2014 | Aron et al. | |
| 8,892,938 B1* | 11/2014 | Sundaram | G06F 11/2092 707/650 |
| 8,996,563 B2 | 3/2015 | Bender et al. | |
| 2005/0279837 A1 | 12/2005 | Hajji | |
| 2007/0055909 A1 | 3/2007 | Smith et al. | |
| 2007/0168396 A1 | 7/2007 | Adams et al. | |
| 2007/0260842 A1 | 11/2007 | Faibish et al. | |
| 2008/0005612 A1 | 1/2008 | Arai | |
| 2011/0082997 A1 | 4/2011 | Yochai et al. | |
| 2012/0198152 A1 | 8/2012 | Terry et al. | |
| 2013/0205070 A1 | 8/2013 | Koseki et al. | |
| 2013/0238851 A1 | 9/2013 | Chang et al. | |
| 2014/0068182 A1 | 3/2014 | Terry | |
| 2014/0195492 A1 | 7/2014 | Wilding | |
| 2015/0193168 A1* | 7/2015 | Sundaram | G06F 11/2092 711/114 |

OTHER PUBLICATIONS

International Search Report of PCT/US2015/054510 dated Jan. 8, 2016.

Extended European Search Report received in corresponding European Application No. 15867416.8 dated May 4, 2018.

* cited by examiner

ELASTIC METADATA AND MULTIPLE TRAY ALLOCATION

TECHNICAL FIELD

This disclosure relates to the technical field of storing data, such as for storing metadata about data, and/or storing data in a protected manner.

BACKGROUND

In conventional storage systems, RAID (redundant array of independent disks) based data protection can be provided by individual RAID groups. However, actual physical disks must be present and selected to act as a RAID group before the corresponding storage space can be made available for use. When a disk fails in a conventional RAID system, the failed disks must be quickly replaced, either by using a hot spare or by manually replacing the failed disk. Once the failed disk is swapped with a replacement disk, a period of high frequency I/O is directed to the replacement disk to reconstruct the data stored thereon in order to provide ongoing data protection. Namely, the RAID group enters a degraded state until the missing data from the failed disk is reconstructed on the replacement disk. During the updating period of the replacement disk, the RAID group is vulnerable to subsequent disk failures.

Another problem also exists in conventional storage systems that rely on RAID based data protection. In the event of power failure, partially written RAID stripes cannot be recovered. In general, to overcome this problem, uninterruptible power supplies have been provided or memory areas having battery backup protection have been provided. In addition, conventional RAID based storage systems are inflexible since all disks in a RAID group are dedicated to a single level of protection regardless of the storage utilization, or lack thereof, in the disks. Formatting a RAID group is a time consuming process that can further contribute to the delay of utilizing the storage space therein. While providing a hot spare can provide a ready replacement disk, such configurations require that one or more disks in the storage system remain idle and unused until a failure occurs. On the other hand, if no hot spare is provided, careful attention must be paid to the RAID group to ensure that when a failure does occur, that prompt replacement of the failed disk occurs.

When in the process of recovering a failed disk by restoring data to the replacement disk, all writes are directed to the replacement disk in order to restore the protection level of the particular RAID group. During this time, the RAID group is susceptible to additional disk failures and the time until the protection level of the RAID group is restored is generally limited by the bandwidth of the head assembly that writes to the replacement disk.

In addition, object storage systems store objects, such as files, data structures, or other types of objects, as well as information about the objects, referred to as metadata. Metadata for files and other objects may include the location of the object data within a corresponding block storage service, as well as information about creation and access times, object creator and owner, access permissions, storage size, file type, and so forth. Additionally, metadata may often be stored in a database that is essentially an object of a fixed size.

As one example, in traditional computer file systems, a user setting up the object storage system may typically reserve a fixed number of regions of a disk for storing object metadata (e.g., UNIX inodes) such as at the time of file system initialization. Accordingly, the user setting up a file system must anticipate the number of and size of the files that the file system will hold before placing the file system into service. For example, the user may err by anticipating a smaller number of files than are actually created subsequently, and may under-provision the amount of metadata space. For instance, after the metadata space has been consumed, no more data can be stored in the file system. Alternatively, the user may err by anticipating a larger number of files than are actually created subsequently, and may overprovision the metadata space. The unused metadata space in this case is unavailable for storing data and therefore resources are wasted.

Similarly, other types of computer object storage systems may customarily allocate a region of fixed storage for a database of metadata entries for the objects being stored. Accordingly, if the storage is used for a larger number of objects than anticipated, there exists the risk of underprovisioning and being unable to store additional objects. Alternatively, the user may err by anticipating a larger number of objects, and this can result in reserved metadata space being unused when a smaller number of objects than expected is placed in the storage.

Furthermore, a plurality of disks, such as hard disk drives (HDDs) and/or solid state drives (SSDs) may be stored in a tray. For example, data may be stored across a plurality of disks located in a single tray. In addition, system software that provides interface and computing capabilities to a computing device, such as an array controller or storage node, may also be stored in the disks located in a tray. Failure of the storage infrastructure in a particular tray may make the data stored in the system unavailable. As one example, failure of the power modules in a tray may make the entire system unavailable, e.g., if OS or other system modules are stored on the tray. Furthermore, the use of single trays for allocating storage for volumes, or the like, may not provide sufficient protection to assure data availability for a system.

SUMMARY

Some implementations include techniques and arrangements in which both object data and object metadata are stored on a uniform thin-provisioned block service where blocks for the storage of both data and metadata are dynamically provisioned from a shared storage pool. Consequently, implementations herein do not rely on user estimates regarding the required relative sizes of data and metadata. Rather, an instance of the object store may automatically adapt to the size and number of objects being stored, and additional storage space for metadata may be allocated dynamically, such as in an on-demand manner.

Additionally, some implementations include techniques and arrangements for storing data on multiple trays. As one example, the system may employ a "least used first" allocation algorithm across the trays to allocate extents from an extent group without concern for tray failure. Thus, with multiple trays, the allocation algorithm herein may be tray-aware, and may allocate extents to drives selected from trays in a way that maximizes the probability that data remains available and/or recoverable in the presence of a failure of one or more trays.

BRIEF DESCRIPTION OF THE DRAWINGS

The detailed description is set forth with reference to the accompanying figures. The use of the same reference numbers in different figures indicates similar or identical items or features.

DESCRIPTION OF THE EMBODIMENTS

Figure 1:
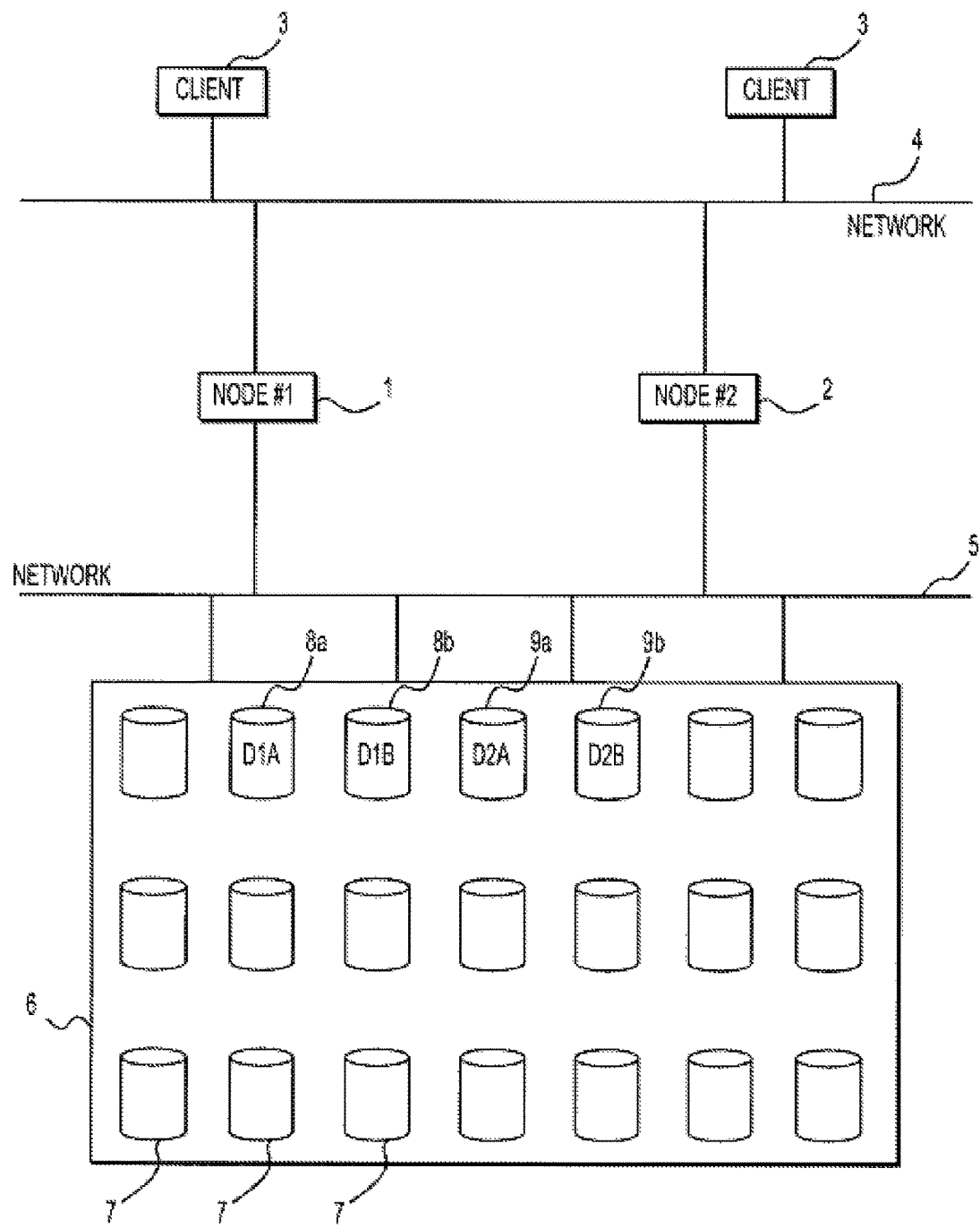
FIG. 1 is a schematic diagram of an illustrative environment for implementing the methods and systems for thin provisioned block storage according to some implementations described herein.

In an example storage system according to some implementations, a plurality of storage devices or disks comprise the underlying physical storage for the storage system. Each of the storage devices is divided into units referred to herein as "extents". Each of the extents is subdivided into a plurality of blocks, which are the smallest storage units of the storage system. The blocks individually store data or protection information. Further, the extents are arranged into extent groups, of one or more extents, which can be allocated on demand to protection classes as thin provisioned storage. One or more protection class instances are configured on the storage system by an administrator of the storage system and each protection class provides different protection algorithms and data protection capabilities for the data stored in the blocks of the extents of the allocated extent groups. The data stored in the extents may be protected using parity, Reed Solomon erasure coding (RS/EC), RAID levels, mirroring or other error detection coding techniques. Further, each protection class instance provides a unique, distinct, or otherwise individually distinguishable addressable block space from the extent groups allocated thereto so that each protection class instance can be treated as a logical unit by the clients.

The number of extents which are arranged into an extent group to be allocated to a given protection class instance may vary depending the specifics of the protection class itself. While the storage devices are divided into and managed as extents, the management information for the extents, extent groups, and protection classes may be stored in a relational database on mirrored devices separate from the devices, which store write data, protection information, and journal information for providing redundant protection to the extent management information.

Some implementations herein are directed to metadata storage. For instance, the metadata may include not only information about objects being stored in an object storage, but also the layout of the block storage that is being used for storing both the objects and the metadata. In some examples, the metadata may be stored in a tree data structure of key value pairs that is stored in thin provisioned storage. The tree structure may be stored using the same extent-mapped thin provisioning storage pool that is used for the object storage. Thus, the tree structure is able to scale along with the object storage. Further, because the metadata storage is able to grow or shrink as the number of objects being stored grows or shrinks, the storage is not constrained by the number of objects stored therein. Accordingly, the metadata storage used may be proportional to the number of objects stored in the object storage.

In some examples, the metadata is stored to a tree data structure that is maintained on a raw direct addressable block service. The block service may be a thin provisioned block service with variable data protection. As one example, the block service may be configured to expose a separate Reed-Solomon protection class instance providing extent groups of 10 data and 6 code (protection) extents. In some instances, the stored data may be stored using a file system, and the metadata may include file system metadata. For example, the file system may allow client applications to treat a large contiguous block storage address space as a collection of files. To do this, the file system may keep track of information about how the file system is using of the block store. For instance, the file system may track which parts of the address space have already been consumed and which parts are available for more files. The file system may also keep track of information about the files, such as which blocks the files occupy, what the file names are, when the files were created and by whom, and who is granted access to each file. These types of information may be referred to as file system metadata.

In some examples, the file system may use database technology to place the file system metadata in block data storage independent of the block data storage used to store the file contents. In some implementations herein, the metadata is managed as a dynamic tree of key-value pairs. The tree may be stored in a block storage space independent from the file data and using a separate protection class instance of a thin-provisioned, RS/EC protected block service. The use of the tree structure allows unbounded growth in the complexity of the metadata. The use of the thin-provisioned block storage allows unbounded growth in quantity of the metadata. By enabling independent thin-provisioned block address spaces for file data and metadata, some examples herein enable a theoretical upper limit of a trillion 4096 byte files, one 4 PB file, or any number/size of file sizes in between. Further, the metadata storage space is not subject to fixed storage limits, requires no preallocation, and scales directly with file count and the number of blocks actually used for the corresponding data.

Some examples herein may employ a log-structured merge (LSM) tree that provides key-value pair semantics. Relational-database semantics are layered on top of the key-value pair semantics for storing the metadata. The LSM tree may enable fast searching, fast writing, and unbounded growth in the complexity of the metadata. Some examples employ an independent 10+6 RS/EC protection class for storing the metadata and an independent 20+6 RS/EC protection class for storing corresponding data in a thin-provisioned variable-protection block storage; however, numerous other protection classes may be used for storing the metadata and/or data. Further, additional extents may be allocated dynamically as needed so that the metadata is able to grow synchronously with the corresponding object data.

In addition, some implementations are directed to storage of data on multiple trays to provide protection against tray failure. For instance, the system may employ an allocation algorithm across the trays to allocate extents from an extent group without concern for tray failure. Thus, for allocating data storage across multiple trays, the allocation algorithm may be tray-aware, and may allocate extents to disks selected from trays, such as for maximizing the chance that data remains recoverable when one or more trays fail. Consequently, examples herein may minimize the probability of data unavailability by dividing the selected drives/extents across multiple trays. As one example, a plurality of extents in RS/EC data protection groups may be allocated across a plurality of trays to minimize the number of extents that become unavailable when a tray fails. Further, according to some example allocation algorithms herein, tray failures have a probability of data unavailability that decreases as the number of trays is increased.

FIG. 1 is a schematic diagram of an illustrative environment for implementing the methods and systems for thin provisioned block storage according to some implementations. In FIG. 1, one or more clients 3 are connected through a network 4 with a pair of nodes 1, 2, which provide block storage to the clients as will be discussed in further detail below. Further, the nodes 1, 2 are connected through another network 5 with a shared storage pool 6 of physical storage devices 7 (e.g., disks). Within the pool 6, storage devices 8a, 8b are reserved to store management information for node 1 and storage devices 9a, 9b are reserved to store management information for node 2 as will be discussed in further detail below. The network 5 may be a storage fabric such as an SAS (serial attached SCSI) fabric to facilitate data communication from the nodes 1, 2 and the storage pool 6.

While FIG. 1 shows a pair of nodes 1, 2, implementations herein are not limited in this sense and there may be any number of nodes provided between the clients 3 and the storage pool 6. In the illustrated example, both of nodes 1, 2 are "operational" ("active") nodes, which operate according to the processing described herein. Moreover, if one of the nodes 1, 2 experiences a failure, the other of the nodes takes over operations of the failed node and continues processing so that the storage system remains operational. However, there may be any number of nodes and a two node system is described here for simplicity only.

Moreover, within the pool 6, the storage devices 8a, 8b may be configured as a mirrored pair to duplicate an extent information database 11f for node 1, and storage devices 9a, 9b may be configured as a mirrored pair to duplicate an extent information database 11f for node 2. Namely, the storage devices 8a, 8b and 9a, 9b are each a RAID1 pair to provide redundancy against the failure of one the paired drives and to ensure that each of the nodes 1, 2 can access the extent information stored therein to continue to manage the extents across storage devices 7. The remainder of the storage devices 7 in the storage pool 6 are configured to store data from the clients 3 and are managed by the nodes 1, 2. While mirrored pairs of devices 8a, 8b and 9a, 9b are not necessary to practicing all aspects, in some examples, the mirrored pairs may protect against loss of the extent information database 11f from the system memory 11 of one or more nodes due to a crash of the nodes themselves. Further, as explained in FIGS. 12-13, when the extent information database 11f is lost to node failure and the devices 8a, 8b and 9a, 9b suffer failures causing the extent information database 11*f* to become inaccessible as a whole, it is possible to recover the extent information database 11*f* by referring to the header information stored on each storage device as shown on FIG. 4.

Figure 2:
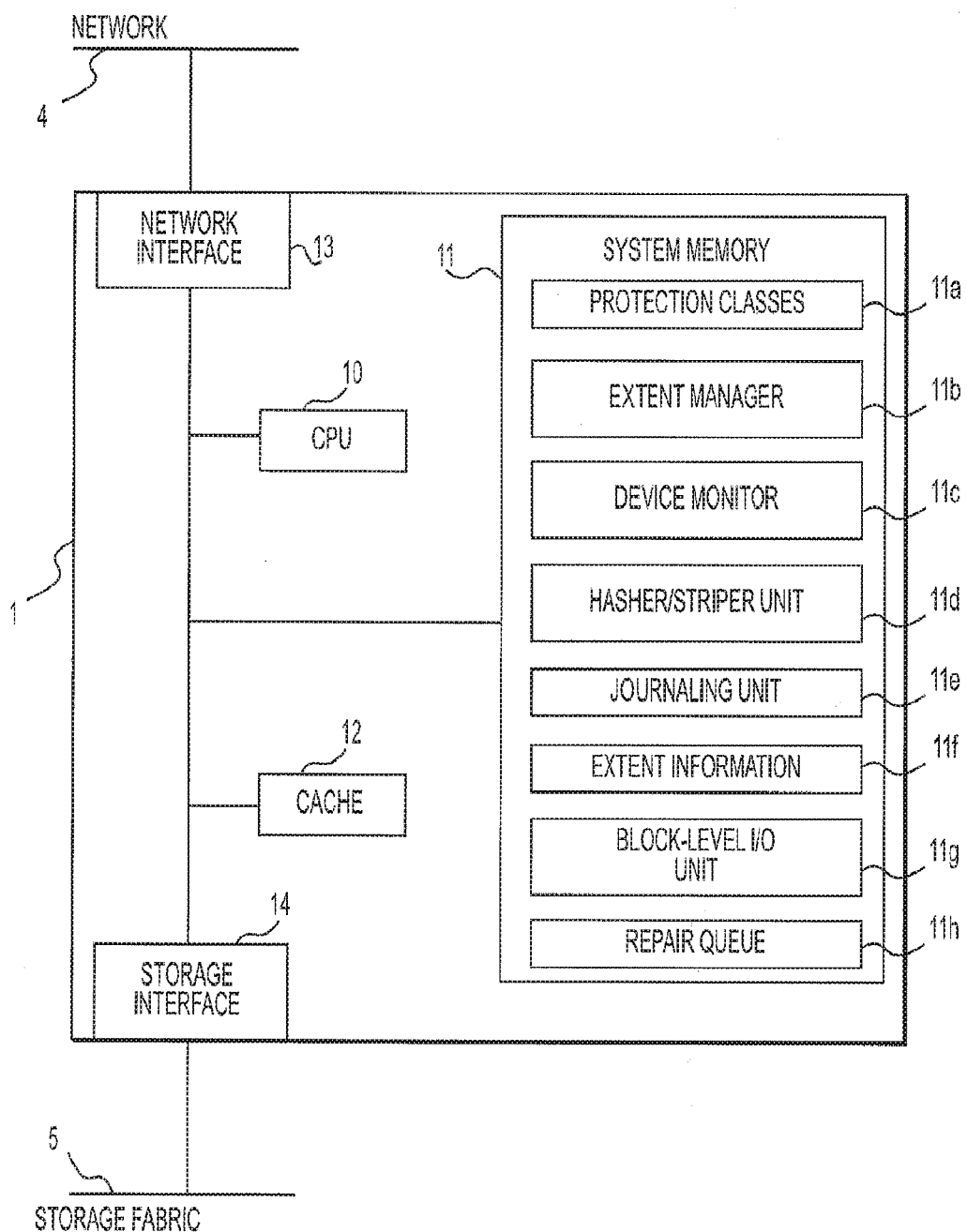
FIG. 2 is a block diagram of a hardware and software components in an example configuration for one of the nodes shown in FIG. 1 according to some embodiments.

FIG. 2 is a block diagram of hardware and software components in an example configuration for one of the nodes shown in FIG. 1. For example, node 1 includes one or more processors (e.g., a central processing unit (CPU)) 10, a cache memory area 12, a system memory 11, a network interface 13 to communicate with the clients 3 over the network 4, and a second interface 14, such as a storage interface (SAS interface, FC interface, iSCSI interface), to communicate with the storage pool 6 over the network 5 (e.g., a storage fabric (SAS fabric, FC fabric, iSCSI fabric)). However, the implementations herein are not limited as to any particular protocol.

The system memory 11 may be a non-transitory computer-readable media able to store executable instructions which are executable by the CPU 10 to provide protection class management information 11*a*, an extent manager 11*b*, a hasher/striper 11*d*, a journaling unit 11*e*, extent information database 11*f*, a block-level I/O unit 11*g*. While each node 1, 2, may store the extent information database 11*f* in the system memory 11 thereof, in order to protect against when a node experiences a failure causing the loss of the extent information database 11*f*, the storage devices 8*a*, 8*b*, 9*a* and 9*b* are provided in the storage pool to advantageously provide synchronized copies of the extent information 11*f* which the nodes 1, 2 can refer to when recovering from operation failure. Accordingly, the extent information 11*f* in the system memory 11 may be periodically updated or synchronized with the copies stored in the storage devices 8*a*, 8*b*, 9*a* and 9*b*. Thus, in some implementations described herein, while the extent information database 11*f* is referred to generally, copies of the data contained therein may be stored in both nodes as well as the storage pool 6.

Figure 3:
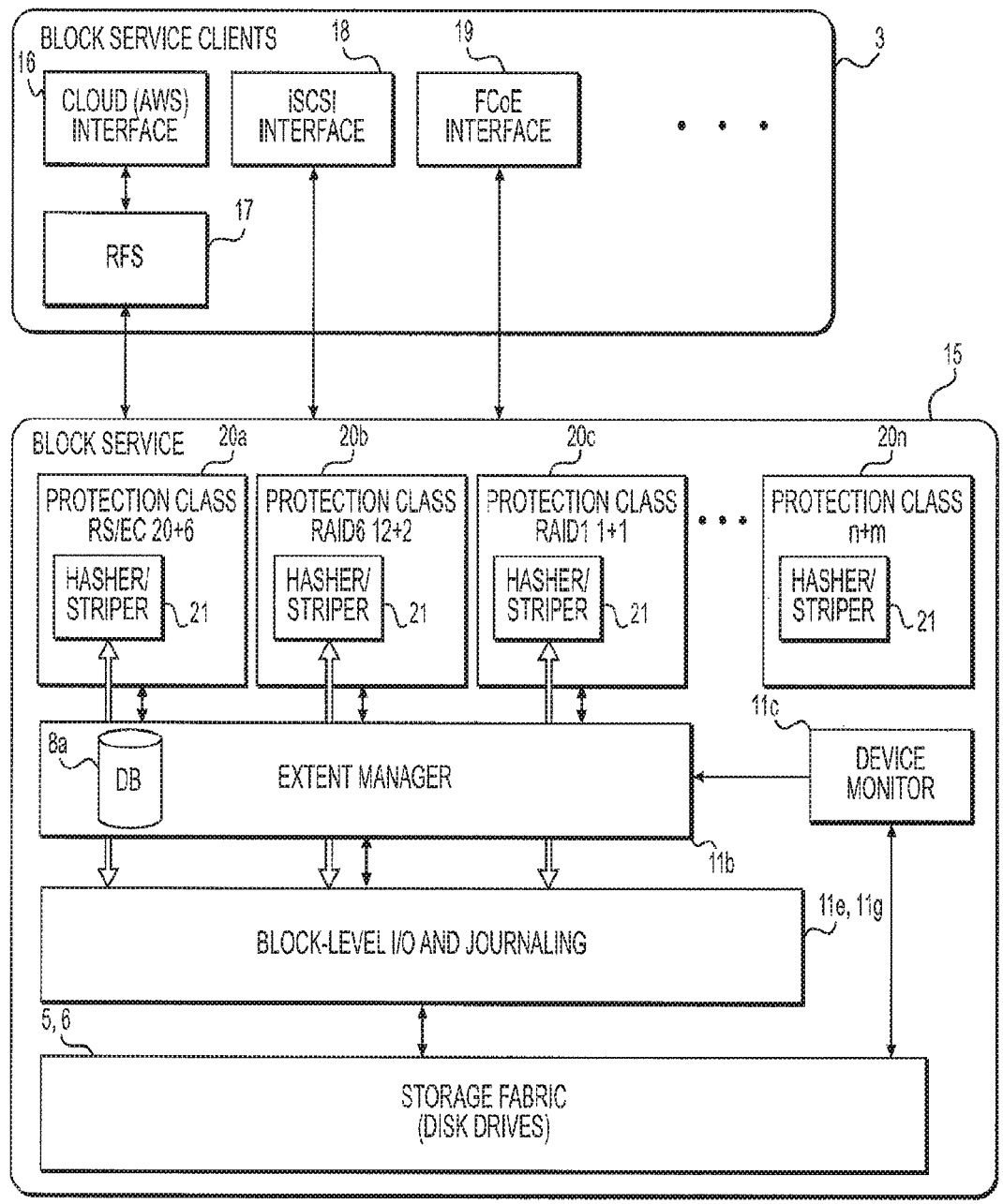
FIG. 3 is a logical diagram of an illustrative software environment showing data transaction paths between various components according to some embodiments.

FIG. 3 is a logical diagram of the illustrative software environment showing data transaction paths between various components according to some implementations. The nodes 1, 2 and storage pool 6 provide a block storage service 15 to the clients 3. The block storage service 15 is accessible by any number of interfaces and FIG. 3 shows that the clients 3 may use a cloud (e.g., AMAZON® Web Services (AWS)) interface 16 and a RFS interface 17 (remote file sharing), an iSCSI interface 18, and/or a FCoE interface 19 to access the block storage service 15.

One or more protection class instances 20*a*, 20*b*, 20*c* to 20*n* are provided by the block storage service 15 to the clients. For example, protection class 20*a* provides Reed-Solomon Erasure Coding (RS/EC) data protection. Protection class 20*b* provides RAID6 data protection and protection class 20*c* provides RAID1 data protection. Accordingly, each protection class 20*n* provides a specified level of data protection for the data stored therein and is denoted herein using the notation "A+B" where 'A' refers to the number of extents storing client-accessible data and 'B' refers to the number of extents storing protection data for the client accessible data within the extent groups of the protection class instance. Thus, in protection class instance 20*a*, RS/EC is implemented on extent groups having 20 extents of data and 6 extents of protection per extent group so that the 6 protection extents store protection data calculated according to RS/EC. Similarly, in a RAID-based protection class, for each extent group thereof, the protection extents store parity data calculated from the corresponding data extents of the extent group. In still other implementations, mirroring or other error detection coding techniques may be used, separately or in combination with the above protection techniques, to provide data protection. While protection information, protection data, parity information and parity data may be the terms used herein to describe the stored content on the protection extents, the particular algorithms used to calculate the protection information are administratively set for each protection class.

Each protection class provides an addressable block storage space for client data that has a predefined level of data protection from the extents that are allocated thereto. The addressable block storage space may be unique or otherwise individually distinguishable with respect to other addressable block storage spaces of other protections classes. In this configuration, each protection class is accessible by the clients as a logical unit having a unique, or otherwise distinct, block address space thereon and can be identified, for instance, by a logical unit number (LUN) when reading and writing thereto. Accordingly, each of the clients may access one or more of protection classes depending on whether the clients have the authority to access the content thereof. In general, client access to a particular protection class instance may be administratively set when defining the protection class instance.

Each of the protection class instances is provided with a hasher/striper service 21 by the hasher/striper unit 11*d*. The extent manager 11*b* serves as an intermediary between the protection classes and block-level I/O and journaling units 11*e*, 11*g*. Further, the extent manager utilizes the extent management information in the relational database DB stored on storage device 8*a*, for example, to manage extents and extent groups as well as the creation and allocation thereof. In other words, the storage devices provide quick access to the extent information database 11*f* which aggregates the data present in the superblocks 22 of the storage devices 7. The block-level I/O and journaling units 11*e*, 11*g* communicate with the physical storage devices 7 of the storage pool 6 to store the data of the protection classes 20*n* therein as explained in greater detail below. Additionally, a device monitor 11*c* is provided to monitor the status of the storage devices in the pool 6 to determine when any of the devices in the storage pool 6 have failed. In addition, a heartbeat monitoring function may also be provided separately in the system memory 11 or included in the device monitor 11*c* to determine when a failure has occurred in the other nodes.

Figure 4:
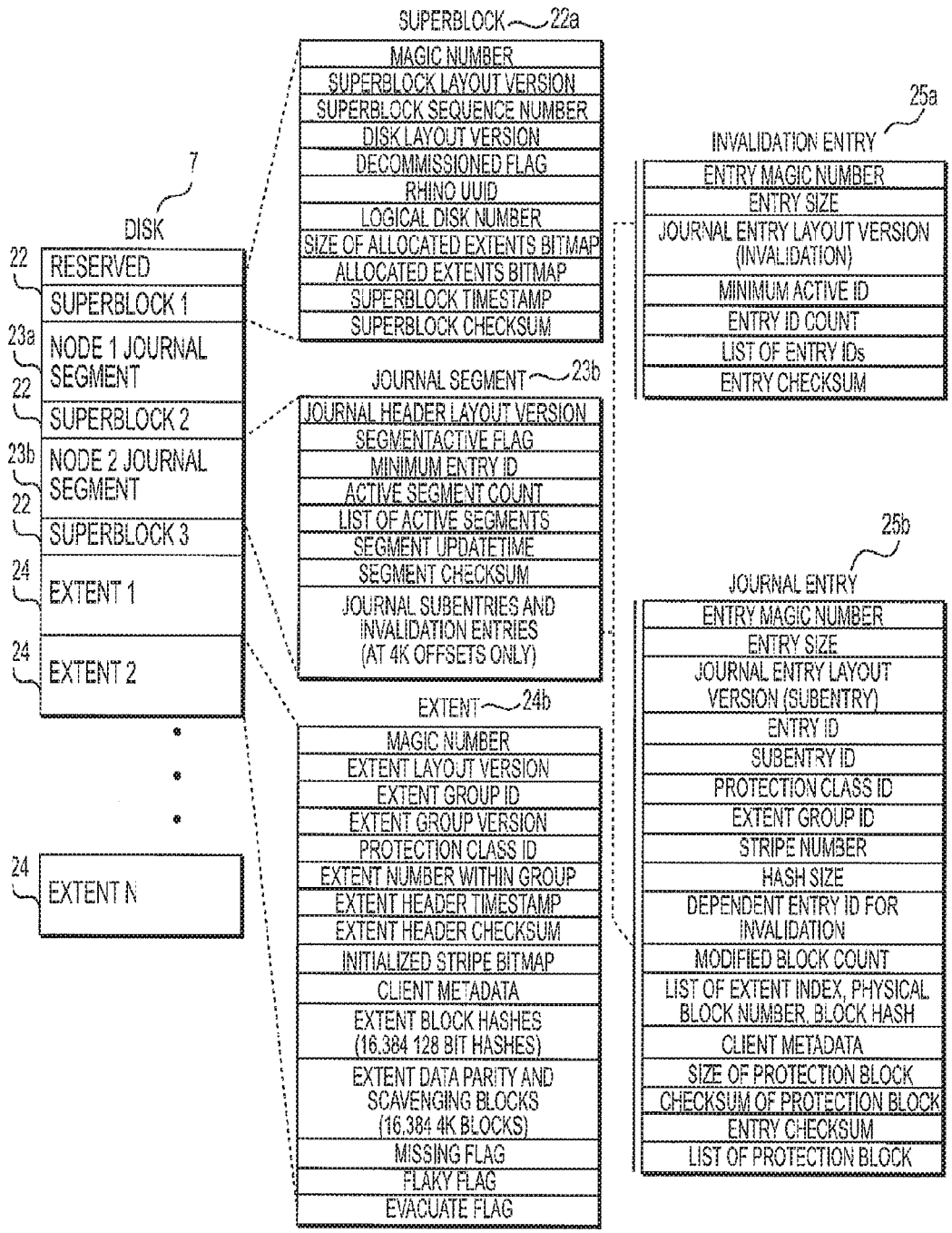
FIG. 4 is a diagram showing a disk and the data structures stored thereon.

FIG. 4 is a diagram showing a disk and the detailed data structures stored thereon. A disk (e.g., one of the storage devices 7) is arranged to store data as shown in the abstract representation of FIG. 4. A superblock 22 (e.g., superblock 1) stores disk management information including a UUID, logical disk number, and bitmap of allocated extents. Additional superblocks 22 (e.g., superblocks 2 and 3) are also arranged on the disk. Superblocks 2 and 3 store the same information as superblock 1. Thus, the superblocks 22 on a given storage device 7 redundantly store the same information.

Further, a node 1 journal segment 23*a* and a node 2 journal segment 23*b* are arranged to facilitate journaling of write data. Each segment 23 includes journal subentries 25*b* and invalidation entries 25*a* as well as active segment count and a list of active segments. The active segment count is the number of storage devices that store journal segments 23 that relate to active writes. The list of active segments is a list of the logical disk number, or other identification, of each storage device included in the active segment count.

While FIG. 4 shows that each storage device includes two journal segments 23*a*, 23*b*, the particular number of journal segments 23 corresponds to the number of nodes implemented in the storage system (e.g., three nodes and three separate journal segments 23). An invalidation entry 25a includes an entry magic number, entry size, a journal entry layout version (e.g., invalidation information), a minimum active ID, an entry ID count, a list of entry IDs, and an entry checksum. A journal subentry 25b includes an entry ID, a protection class ID, an extent group ID, a stripe number, a list of extent index, physical block numbers, and a block hash, a size of protection blocks, a checksum of the protection blocks, an entry checksum, and a list of protection blocks. A journal subentry 25b is designated as inactive for purposes of journal replay by the presence of a corresponding invalidation entry 25a in the journal segment 23 thereof.

Following the third superblock 22C, the disk 7 is divided into a plurality of extents 24 (e.g., extents 1, 2 to N). Within each of the extents 24, there is an extent header where extent information is stored that describes the individual extent. The extent header has a fixed size and may include an extent group ID to indicate which extent group the extent belongs, an extent group version which is updated when an extent is added or lost from the extent group, a protection class ID, an extent number within the extent group (e.g., the sequential placement of the extent within the extent group identified by the extent group ID), a timestamp, a checksum, and hashes of the extent blocks. For example, each extent may be provided as a 64 MB storage unit, which is then sub-divided into individual blocks that are in turn provided as 4 KB storage units. A block is the smallest storage unit defined. Thus, when writing or reading to a protection class, a block address and offset may be specified from the client.

In the case that extents are 64 MB in size, each 64 MB extent may in turn provide 16,384 individual blocks that are each 4 KB in size with a corresponding 16,384 128-bit hashes stored in the extent header. In such a configuration, the extent header has a size of 264 KB. While FIG. 4 shows management information stored in the superblocks as well as individual extent information stored in each extent across each storage device 7, the management information and the extent information other than the actual data therein is also aggregated into the extent information database 11f By aggregating the management information shown in FIG. 4 of each storage device 7 into the extent information database 11f in the system memory 11, the bandwidth necessary to retrieve the management information from each storage device can be minimized while optimally providing the management information in each node. Thus, the extent information database 11f is not only redundantly stored in the system memory 11 and the storage devices 8a, 8b, 9a, 9b but is also distributed across the devices in the storage pool 6 as shown in FIG. 4.

In general, the extent information database 11f may be divided according to each protection class instance, and may include the mapping of each extent to the storage pool. Specifically, for each protection class managed in the extent information database 11f, each extent allocated as part of an extent group may be managed in association with a logical disk number, an extent group ID, an extent group version, and an extent number within the extent group. As a result, the extent information database 11f is protected against catastrophic failure of the nodes and the storage devices 8a, 8b, 9a, 9b as additionally below with reference to FIGS. 12-13. Further, in each extent header, a missing flag indicates that the extent is currently missing and cannot be found where it is expected to be located as recorded in the extent information database 11f. This may be due, for example, to the storage device failing or to the failure in the connectivity between the storage device and the nodes 1, 2. An "evacuate" flag indicates that the extent should be moved to another storage device. Further, a "flaky" flag indicates that the storage device storing the extent is experiencing intermittent I/O errors and the data of the extent might only be read during extent group repair procedures as a last resort. For example, the device monitor 11c may set the flags for each extent according to the statuses of each of the storage devices 7 in the storage pool 6.

The following descriptions may generally refer to the disks as having extents that store data or protection information while omitting the superblocks, journal segments and management information shown in FIG. 4 for simplicity. However, in this embodiment, each of the storage devices 7 is configured like the disk as shown in FIG. 4 to provide superblocks, journal segments and equally, sized extents thereon.

Figure 5:
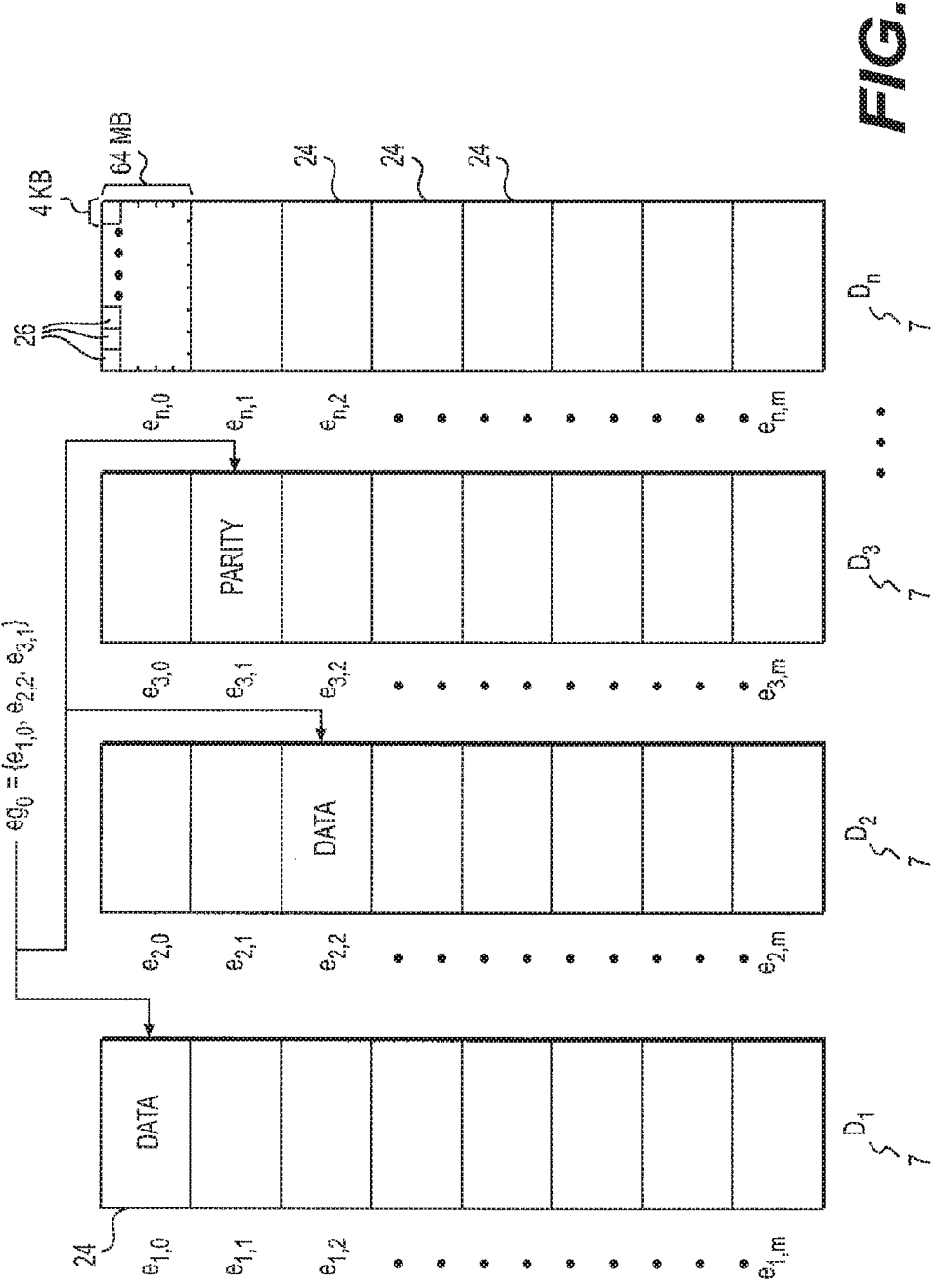
FIG. 5 is a diagram showing an example extent group of a 2+1 data protection class according to some implementations.
Figure 6:
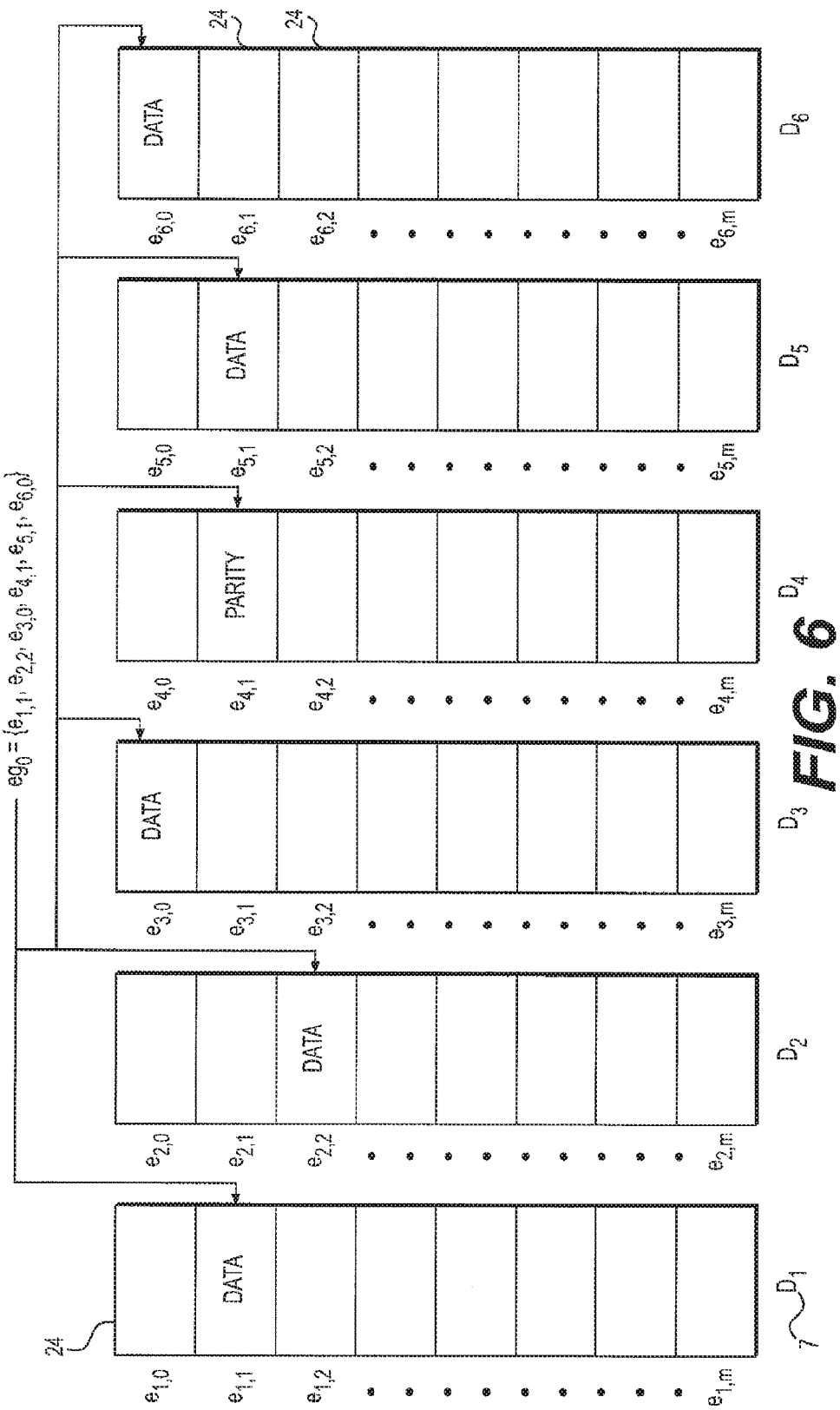
FIG. 6 is a diagram showing an example extent group with RAIDS 5+1 data protection class according to some implementations.
Figure 7:
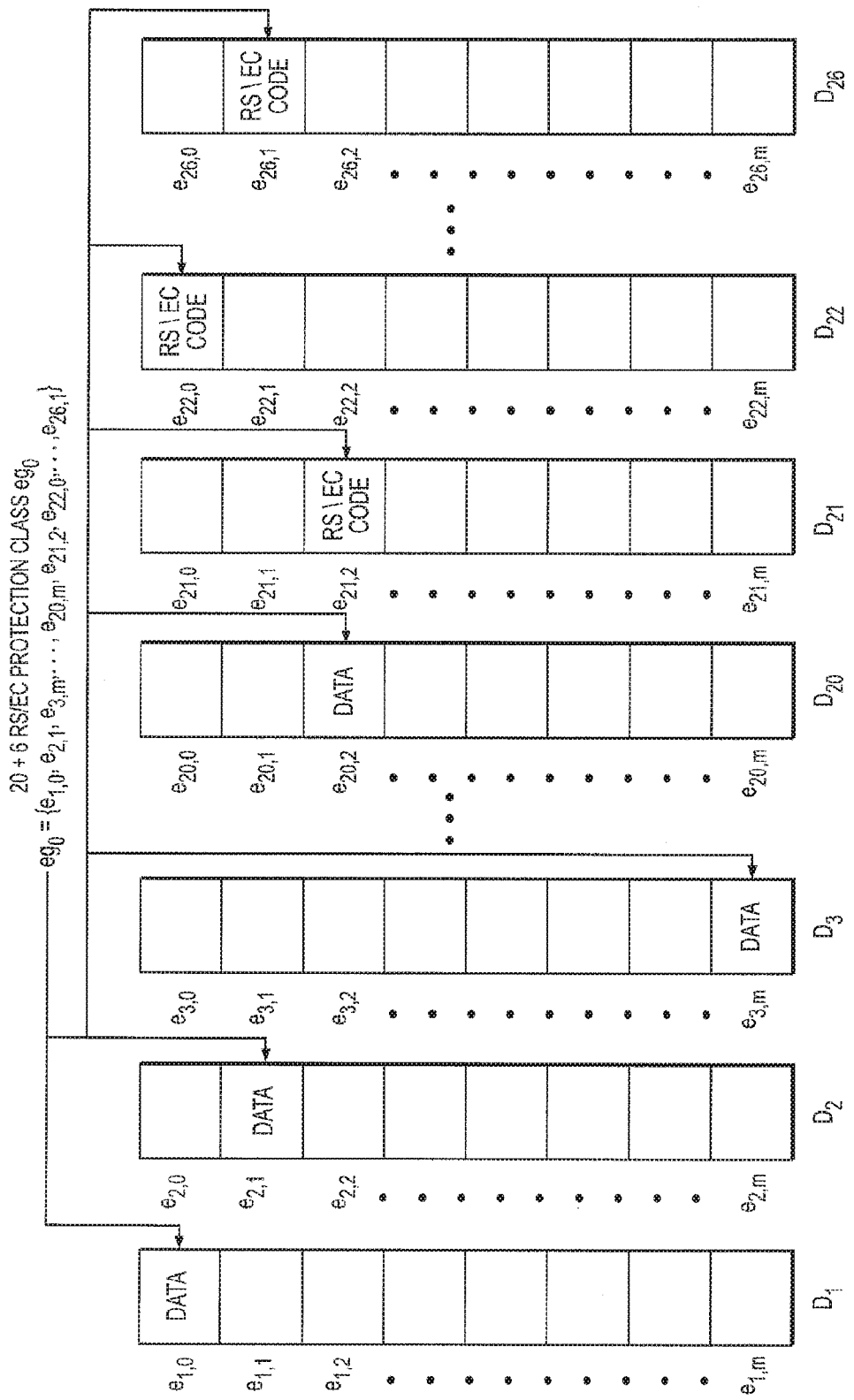
FIG. 7 is a diagram showing an example extent group with RS/EC 20+6 data protection class according to some implementations.

For simplicity, FIGS. 5-7 only show the extents which are arranged on each of the disks. In each of FIGS. 5-7, each extent is arranged on an individual storage device 7 separately from other extents of the same extent group. Accordingly, within each extent group, the extents are spread across the maximum number of storage devices to provide protection against failure of any of the storage devices. Thus, when any one storage devices fails, for a single extent group, only one extent may be inaccessible or missing within the single extent group. While in some examples, no storage device provides more than one extent to any one extent group, such a configuration is not a limiting requirement.

FIG. 5 is a diagram showing an example extent group of a 2+1 data protection class according to some implementations. FIG. 5 shows a plurality of storage devices 7, which include disks $D_1$, $D_2$, $D_3$ to $D_n$. Each of the disks as shown in FIG. 4 is divided into a plurality of extents 24. Further, each extent is sub-divided into blocks 26. According to the 2+1 protection class, as in FIG. 5, a single extent group $e_{g0}$ when allocated to an instance of the 2+1 protection class includes three extents. Two of the extents are to store client data and the third extent stores protection information for the two data extents, such as parity information for the client data in the two extents.

Disk $D_1$ is configured by the extent manager 11b to provide a plurality of extents denoted as $e_{1,0}$, $e_{1,1}$, $e_{2,1}$ to $e_{1,m}$ so that 'm' extents from $D_1$ are available to the extent manager 11b to be arranged into extent groups with extents from other disks. Disk $D_2$ is configured by the extent manager 11b to provide a plurality of extents denoted as $e_{2,0}$, $e_{2,1}$, $e_{2,2}$ to $e_{2,m}$ so that a second plurality of 'm' extents from $D_2$ are available to the extent manager 11b to be arranged into extent groups with extents from other disks. Disk $D_3$ is configured by the extent manager 11b to provide a plurality of extents denoted as $e_{3,0}$, $e_{3,1}$, $e_{3,1}$ to $e_{3,m}$ so that a third plurality of 'm' extents from $D_3$ are available to the extent manager 11b to be arranged into extent groups with extents from other disks. Thus, in general, an arbitrary disk $D_n$ is configured by the extent manager 11b to provide a plurality of extents denoted as $e_{n,0}$, $e_{n,1}$, $e_{n,1}$ to $e_{n,m}$ where 'n' denotes the logical disk number and 'm' denotes the number of extents provided thereon.

Accordingly, the extent group $e_{g0}$ for the 2+1 protection class can be defined as having three distinct extents $\{e_{1,0}, e_{2,2}, e_{3,1}\}$. The subscripts used to denote the individual extents do not represent the actual extent identification information, rather the subscript notation is merely for explanatory purposes. Data is stored in extents $e_{1,0}$, $e_{2,2}$, and protection information of $e_{1,0}$, $e_{2,2}$ is stored in $e_{3,1}$. For any extent group allocated to a 2+1 protection class, three extents are selected from three different storage devices 7 or disks in the storage pool 6. There is no requirement that the logical disk numbers be in sequence, instead the extents may be chosen by the extent manager 11b from any storage devices 7 having one extent thereon that does not belong to any extent group, a so-called free or available extent. Thus, in general, for an "A+B" protection class, there must be a number of disks having at least one free extent that is equal to the sum of A+B so that no two extents in a single extent group reside on a single storage device 7.

FIG. 6 is a diagram showing an example extent group with RAIDS 5+1 data protection class according to some implementations. As shown in FIG. 6, an extent group "$eg_0$" belonging to a "5+1" protection class requires six individual disks which each provide an extent therefrom to the extent group. The extent group $eg_0$ can therefore be defined as having six distinct extents $\{e_{1,1}, e_{2,2}, e_{3,0}, e_{4,1}, e_{5,1}, e_{6,0}\}$ where the extent 24 designated as $e_{4,1}$ stores the protection information of the extent group and is interleaved with the remaining data extents.

FIG. 7 is a diagram showing an example extent group with RS/EC 20+6 data protection class according to some implementations. As shown in FIG. 7, an extent group "$eg_0$" belonging to a RS/EC "20+6" protection class requires 26 individual disks, which each provide an extent therefrom to the extent group. The extent group $eg_0$ can therefore be defined as having 26 distinct extents $\{e_{1,0}, e_{2,1}, e_{3,m}, \ldots, e_{20,2}, e_{21,2}, e_{22,0}, \ldots, e_{26,1}\}$ where the extents 24 designated as $e_{21,2}, e_{22,0}$ through $e_{26,1}$ store protection information for the data extents $e_{1,0}, e_{2,1}, e_{3,m}, \ldots, e_{20,2}$. While the protection extents and data extents are not shown as interleaved, the interleaving is omitted for the sake of simplicity. As such, the distribution of the data extents and protection extents may be interleaved similar to the arrangement shown in FIG. 6. To provide further redundancy and even greater protection, in some implementations, protection class instances may be mirrored within the storage pool 6.

Figure 8:
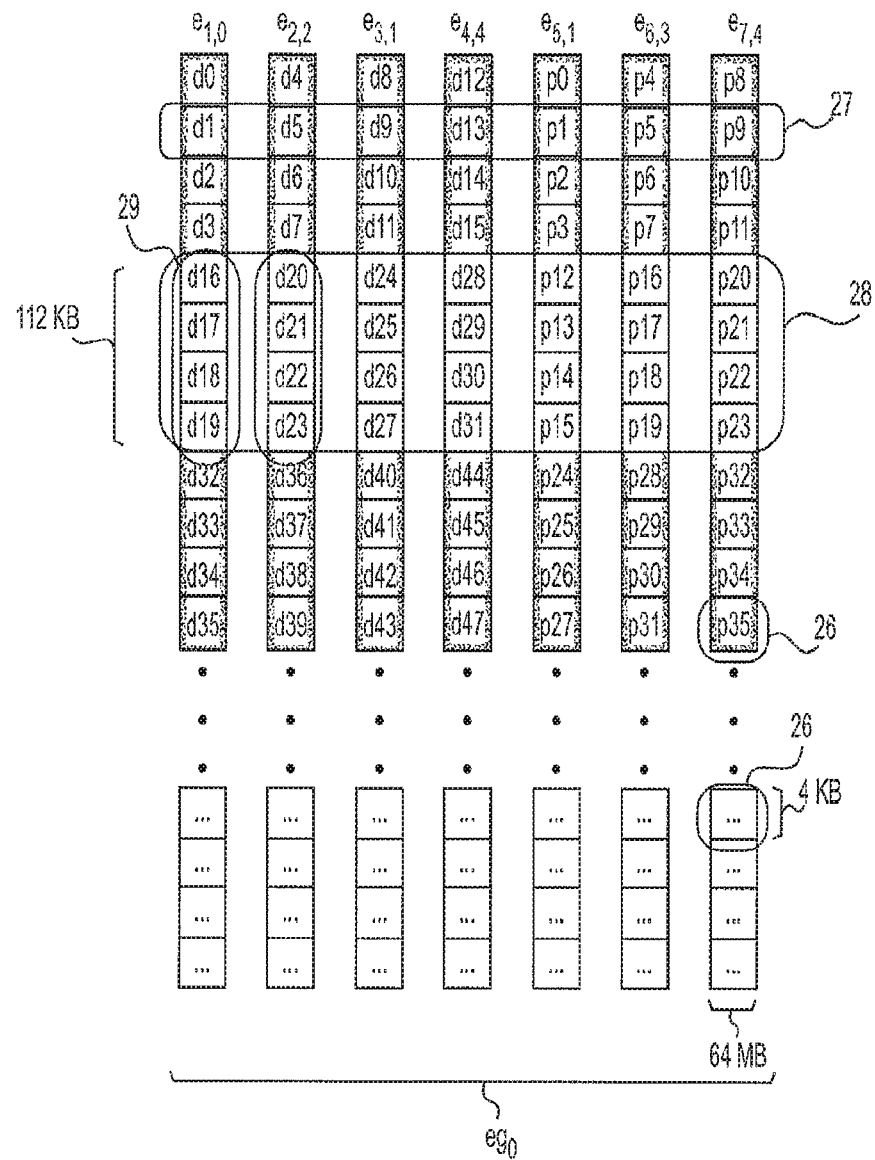
FIG. 8 is a diagram of block layout and data striping across extents according to some implementations.

FIG. 8 is a diagram of block layout and data striping across extents 24. An example extent group $eg_0$ is shown in FIG. 8 which belongs to a 4+3 protection class having 7 distinct extents $\{e_{1,0}, e_{2,2}, e_{3,1}, e_{4,4}, e_{5,1}, e_{6,3}, e_{7,4}\}$ selected from 7 individual disks. The extents are sub-divided into blocks, and data is written in blocks d0 to d47 in the extents $e_1, e_2, e_3, e_4$ while protection is written in blocks p0 to p35 in the extents $e_5, e_6, e_7$. The blocks 26 form the smallest addressable storage units in the extents. Blocks are combined for protection as a protection line 27. For example, one protection line in FIG. 8 is defined as d1, d5, d9, d13, p1, p5, p9. Further, a stripe 28 is configured from 4 protection lines 27. Within a stripe 28, the blocks 26 that belong to one extent 24 form a strip 29. As shown in FIG. 8, one strip is formed from blocks d20, d21, d22, d23. When each block 26 is 4 KB in size, each strip 29 is 16 KB and each stripe 28 is 112 KB.

Figure 9:
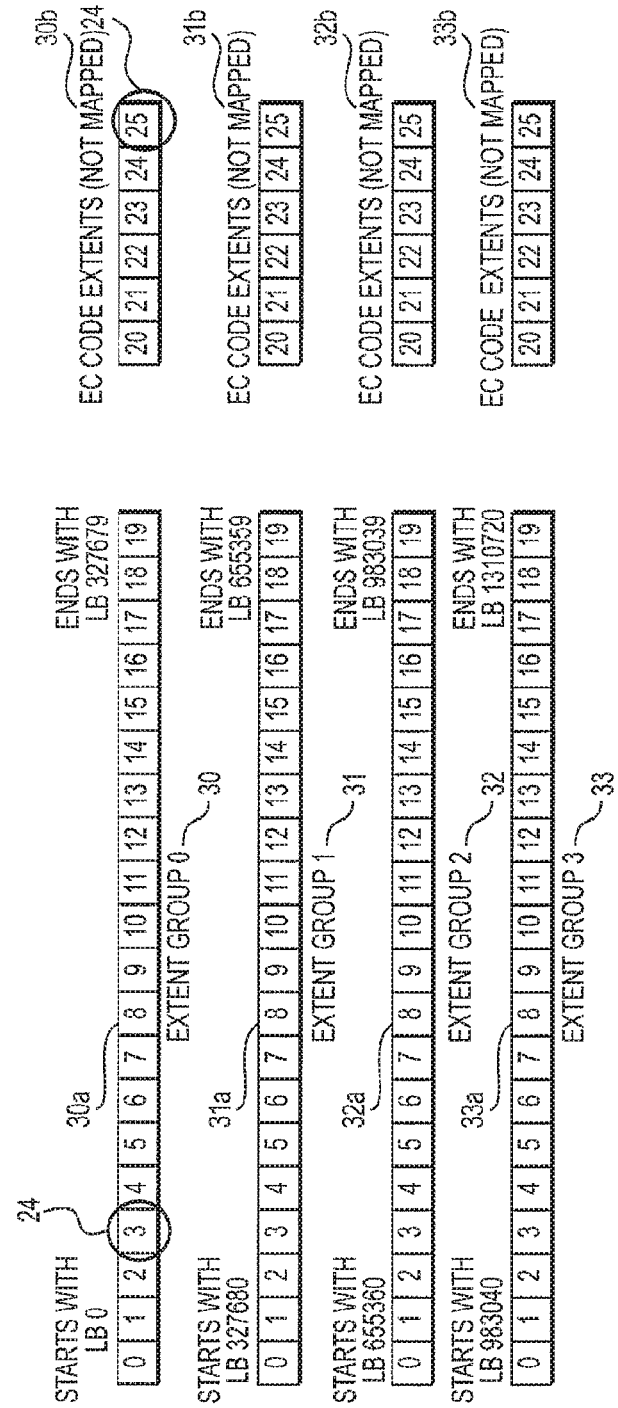
FIG. 9 is a diagram showing a representative mapping of logical blocks to extent groups for an RS/EC 20+6 protection class according to some implementations.

FIG. 9 is a diagram showing a representative mapping of logical blocks to extent groups for a RS/EC 20+6 protection class instance. In the RS/EC 20+6 protection class instance shown in FIG. 9, Extent Groups 0, 1, 2 and 3 provide the addressable block space of the protection class instance.

The first extent group 30 (i.e., Extent Group 0) has twenty extents 30a which provide continuous addressable block storage for data and six extents 30b for protection. Only the twenty extents 30a that provide continuous addressable block storage for data are addressable by the clients to store data. No logical addresses are provided to the clients or mapped by the extent manager 11b for the six protection extents 30b since the protection stored thereon is not subject to client I/O. Similarly, no logical addresses are provided to the clients or mapped by the extent manager 11b for the six protection extents 31b, 32b, 33b of the Extent Groups 1, 2 and 3.

Accordingly, as shown in FIG. 9, the extents 30a are mapped to provide the logical block (LB) addresses 0 through 327,679. As previously noted, an extent is 64 MB and is subdivided into 4K blocks to yield 16,384 blocks per extent 24. Thus, the twenty extents 30a have addressable blocks corresponding to addresses 0 through 327,679. Similarly, extents 31a provide the logical block (LB) addresses 327,680 through 655,359. Extents 32a provide the logical block (LB) addresses 655,360 through 983,039. Extents 33a provide the logical block (LB) addresses 983,040 through 1,310,720. As such, each extent group sequentially provides an addressable interval of blocks corresponding to the addressable interval of the previous extent group and naturally beginning with block address 0 for the first extent group.

While the extent information database 11f provides information for mapping the extents to the storage devices within the storage pool, the mapping between logical block addresses and the extents are not stored in the extent information database 11f. Instead, the mapping between block addresses and extents is determined mathematically. Therefore, the mapping between block addresses and the extent group, the extent within the extent group and the offset within the extent can be determined in accordance with the following equations (where '*' denotes multiplication, '/' denotes integer division, and '%' remainder of integer division):

$$\text{blocks\_per\_extent} := \text{extent\_size}/\text{block\_size} \quad \text{(Eq. 1)}$$

$$\text{data\_blocks\_per\_extent\_group} := \text{blocks\_per\_extent}*\text{data\_disks} \quad \text{(Eq. 2)}$$

$$\text{blocks\_per\_strip} := \text{strip\_size}/\text{block\_size} \quad \text{(Eq. 3)}$$

where data_disks:=number of disks used store data (i.e., "A" in a "A+B" protection class so 20 in 20+6, the 4 in 4+3)

extent_size:=number of bytes per extent (64*1024*1024)

block_size:=number of bytes per block (4*1024)

strip_size:=number of bytes per strip (16*1024).

Further, the extent group, the extent within the extent group, and the offset within the extent can be determined from a block address according to the following equations:

$$\text{extent\_group}(\text{block}) = \text{block}/\text{data\_blocks\_per\_extent\_group} \quad \text{(Eq. 4)}$$

$$\text{extent\_within\_group}(\text{block}) = \text{block}/\text{blocks\_per\_strip} \% \text{data\_disks} \quad \text{(Eq. 5)}$$

$$\text{offset\_within\_extent}(\text{block}) = (\text{block} \% \text{data\_blocks\_per\_extent\_group}/\text{blocks\_per\_strip}/\text{data\_disks}*\text{blocks\_per\_strip} + \text{block} \% \text{blocks\_per\_strip})*\text{block\_size} \quad \text{(Eq. 6)}$$

Additionally, the block address can be calculated from the extent group, the extent within group, and byte offset within the extent as follows:

$$\begin{aligned}\text{block} = &\text{extent\_group}*\text{blocks\_per\_extent\_group}//\\&\text{blocks of preceding}//\text{extent groups} + \text{offset\_within\_extent}/\text{block\_size}/\\&\text{blocks\_per\_strip}*\text{data\_disks}*\text{blocks\_per\_strip}//\\&\text{blocks of complete preceding}//\text{stripes in the extent group} +\\&\text{extent\_within\_group}*\text{blocks\_per\_strip}//\text{blocks of preceding}//\text{strips in the stripe} + \text{offset\_within\_extent}/\text{block\_size} \% \text{blocks\_per\_strip}//\text{preceding blocks within}//\text{the strip} \quad \text{(Eq. 7)}.\end{aligned}$$

Figure 10:
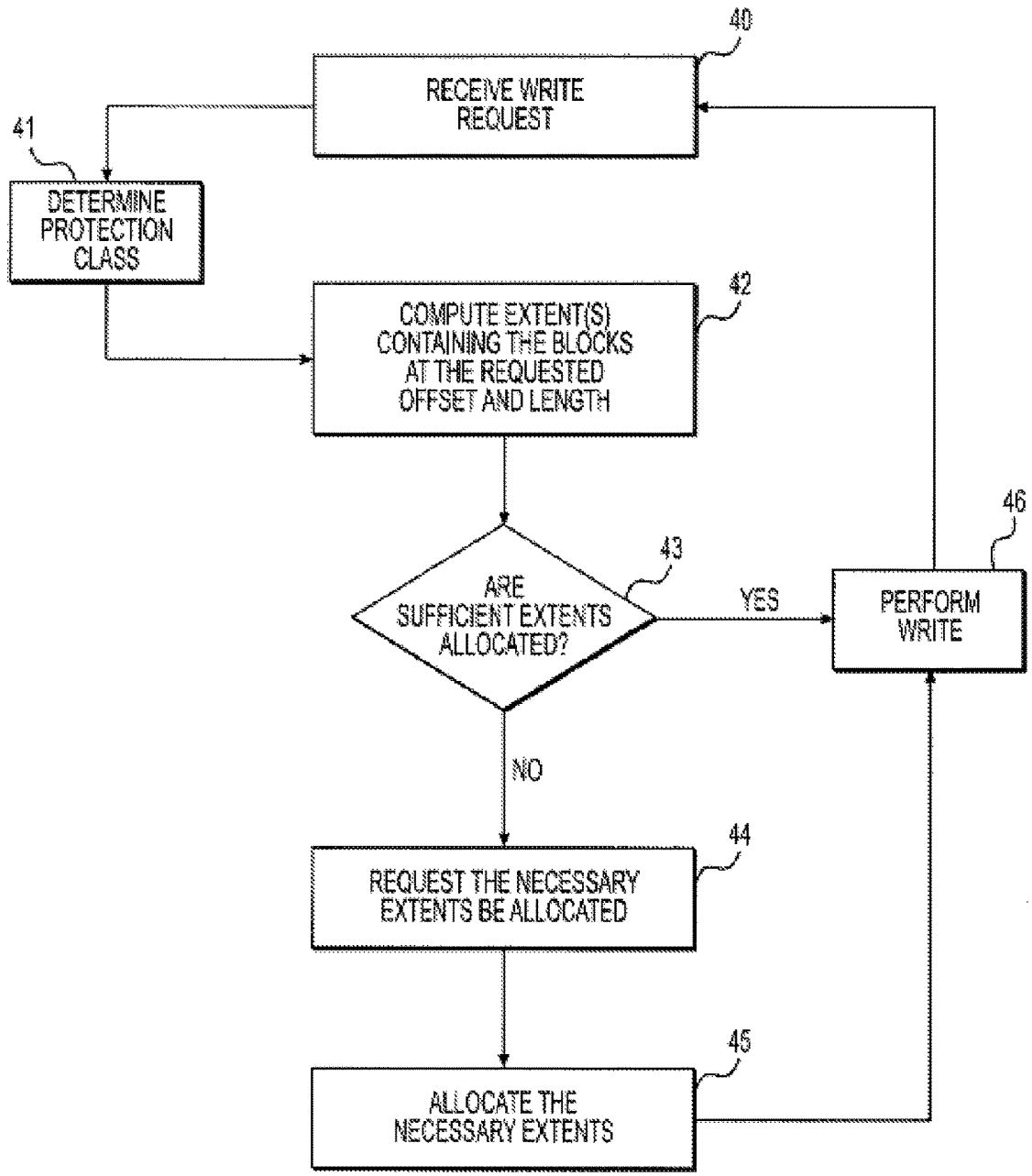
FIG. 10 is a write processing flow according to some implementations.

FIG. 10 is an example write processing flow according to some implementations. At step 40, one of the nodes 1, 2 receives a write request from a client 3 specifying write data to be stored and the write request specifies a block address (e.g., byte address), offset and length of the write data. In some implementations, the initial address space may be sparse, and write requests may be directed to any block address without requiring that extent groups are allocated for lower addresses where no writes have yet occurred. At step 41, once the write request is received, the extent management information database is referred to in order to determine whether the client which sent the request can access the particular protection class instance that the write request is attempting to modify or write to. Then, at step 42, the extents containing the blocks at the specified offset and length, which are required to complete the write request, are calculated. Once the required extents are calculated, at step 43, it is determined whether the required extents in the corresponding extent group have been allocated. If, at step 43, the required extents and extent group have been allocated, the processing flow proceeds to step 46 where the write request is performed and the write data is written to the storage devices 7 providing the required extents.

Figure 11:
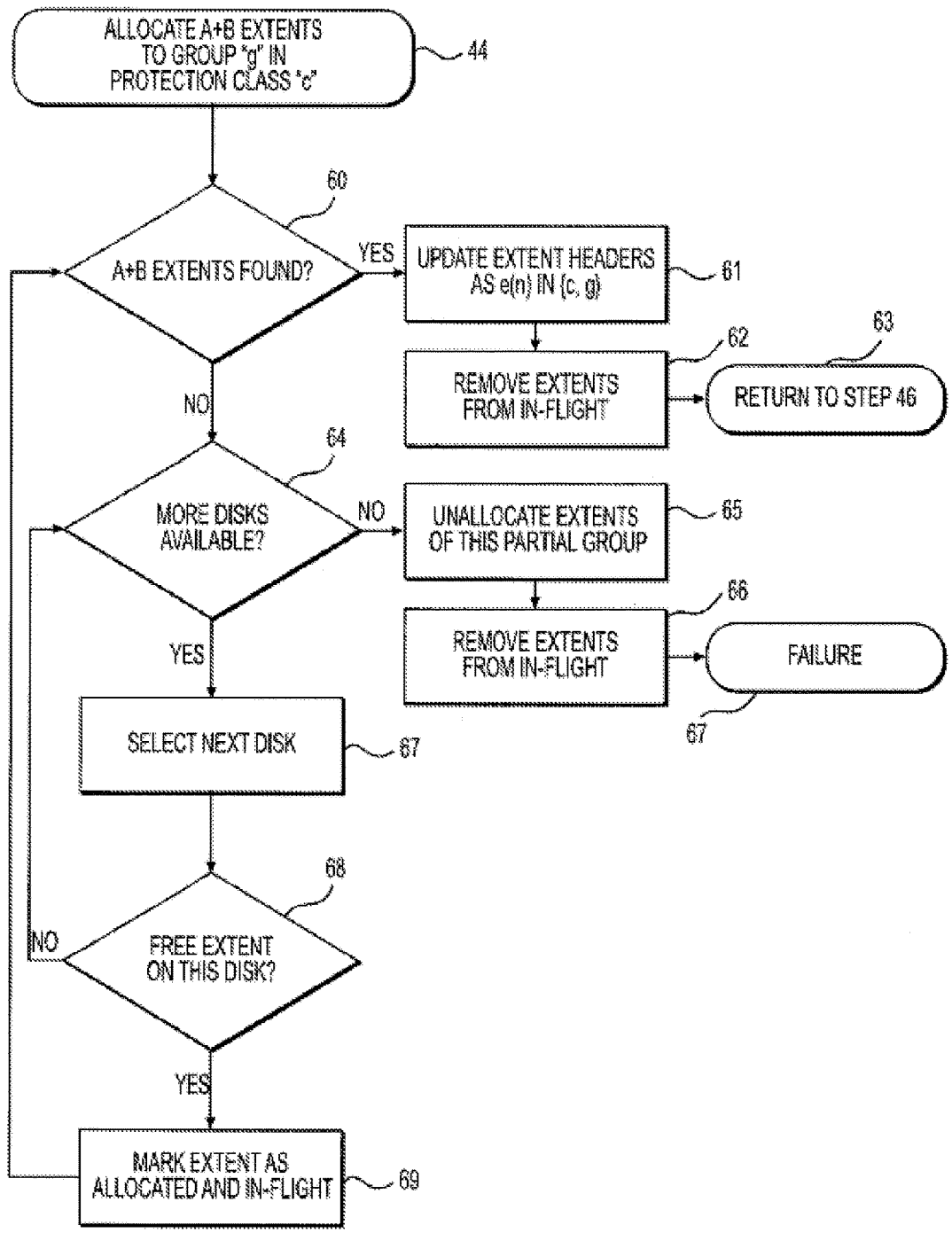
FIG. 11 is an extent group allocation processing flow according to some implementations.

However, at step 43, if the required extents and extent group have not yet been allocated to the specified protection class instance, a request is made to the extent manager 11b allocate an extent group(s) to the specified protection class at step 44. Next, processing proceeds to step 45 where the necessary extent group(s) is allocated. FIG. 11, which is described below, shows an example extent group allocation process. After the extent group(s) is allocated to the protection class at step 45, the processing flow proceeds to step 46 where the write request is performed and the write data is written to the storage devices 7 providing the required extents. Namely, as shown in FIG. 8, data is written at the block level in stripes 29 across the extents 24 of each extent group. The strips 29 within a stripe exist contiguously within the extent. As such, when a protection class receives a given write request, the hasher/striper 11d computes the parity information for each block to be written within a stripe before pushing the write data and parity information to the block level I/O 11e which interfaces with the storage devices 7 to write the stripe. Accordingly, each write request is written on a stripe-by-stripe basis in this implementation. FIG. 8 shows the arrangement of stripes across an extent group. After the write request is completed in step 46, the processing flow returns to step 40 when one of the nodes receives another write request.

FIG. 11 is an extent group allocation processing flow according to some implementations. When the extent manager 11b receives the request to allocate an extent group(s) to the specified protection class at step 43 of FIG. 10, the extent manager 11b allocates an extent group(s) as shown in FIG. 11. First, at step 60, it is determined whether enough available extents exist in the storage devices 7 of the storage pool to provide the requested extents as an extent group 'g' to the corresponding protection class instance 'c' to which the write request at step 40 is directed. Namely, for an arbitrary protection class instance 'c', each extent group thereof is provides data storage on 'A' extents and parity information on 'B' extents. Thus, each extent group is composed of A+B extents, where A and B are each integers. As such, at step 60, it is iteratively determined on a device-by-device basis whether there are A+B storage devices 7, which have A+B extents available to be allocated as an extent group 'g' to the protection class 'c'.

At step 60, if A+B extents have been found available on A+B storage devices, then at step 61, each of the extent headers are updated to reflect the allocation of the A+B extents as an extent group 'g', in the extent group ID of the extent headers 24b, and sequenced by extent number within the extent group 'g'. Further, each of the extent headers are updated to reflect the allocation of the A+B extents to the protection class instance 'c', in the protection class ID of the extent headers 24b. After the extent headers have been updated, at step 62, the designation of the A+B extents as "in-flight" is removed and the processing flow returns to step 46 in FIG. 10.

Otherwise, at step 60, if A+B extents have not yet been found in the storage pool 6, the processing flow continues to step 64 to determine if more storage devices 7 are available in the storage pool. If more storage devices are available, then at step 67, a next one of the storage devices 7 is selected and it is determined whether an available extent exists on the selected storage device by referring to the allocated extents bitmap in the superblocks 22 at step 68. At step 69, the available extent on the selected storage device is marked as allocated in the allocated extents bitmap in the superblocks 22 and is further marked as "in-flight" in the extent header 24b thereof to designate that such extents are currently in the process of being allocated as an extent group to a protection class instance and are not available to be allocated to another extent group. The designation of which extents are in-flight can be managed as a table in the extent information database 11f or in other persistent storage. Following step 69, the processing flow returns to step 60 where it is again determined whether the required number of available extents are present in the storage pool 6 to satisfy the request to allocate a new extent group to the respective protection class.

However, if more storage devices 7 are not available at step 64, the processing flow moves to step 65. At step 65, any extents that have been marked as allocated and in-flight for the extent group 'g' are unallocated from extent group 'g'. Namely, the extent headers 24b thereof are updated to show that the respective extents no longer belong to extent group 'g' of the protection class 'c'. Further, the allocated extents bitmaps of the superblocks 22 of the respective storage devices 7 are also updated at step 65. Next, at step 66, the respective extents are updated to reflect that each of the extents is no longer in-flight. As the allocation processing was unable to provide A+B available extents to fulfill the extent group allocation request, the extent allocation process is determined to have failed at step 67. In some implementations, a notification may be provided to an administrator that additional storage devices are required to be added to the storage pool 6. Moreover, since a new extent group was unable to be allocated, the write request received at step 40 in FIG. 10 will be unable to complete. Accordingly, the client should be notified that the write has failed due to a lack of available storage space.

Further, in the foregoing processing, the extent information database 11f may be periodically synchronized with the management information on the storage devices 8a, 8b and storage devices 9a, 9b to protect against the loss of the extent information 11f should either of the nodes 1,2 crash. When either of the nodes crashes, the storage devices 8a, 8b and storage devices 9a, 9b can be referred to and the extent information 11f transferred therefrom. However, in some instances, one or more of the nodes may crash while one or more of the storage devices 8a, 8b and 9a, 9b suffer contemporaneous failures. In such undesirable instances, the mapping of extents to extent groups may be lost and the extent information 11f may be reconstructed after correcting any issues with the operation of the nodes 1, 2 and storage devices 8a, 8b and 9a, 9b.

Figure 12:
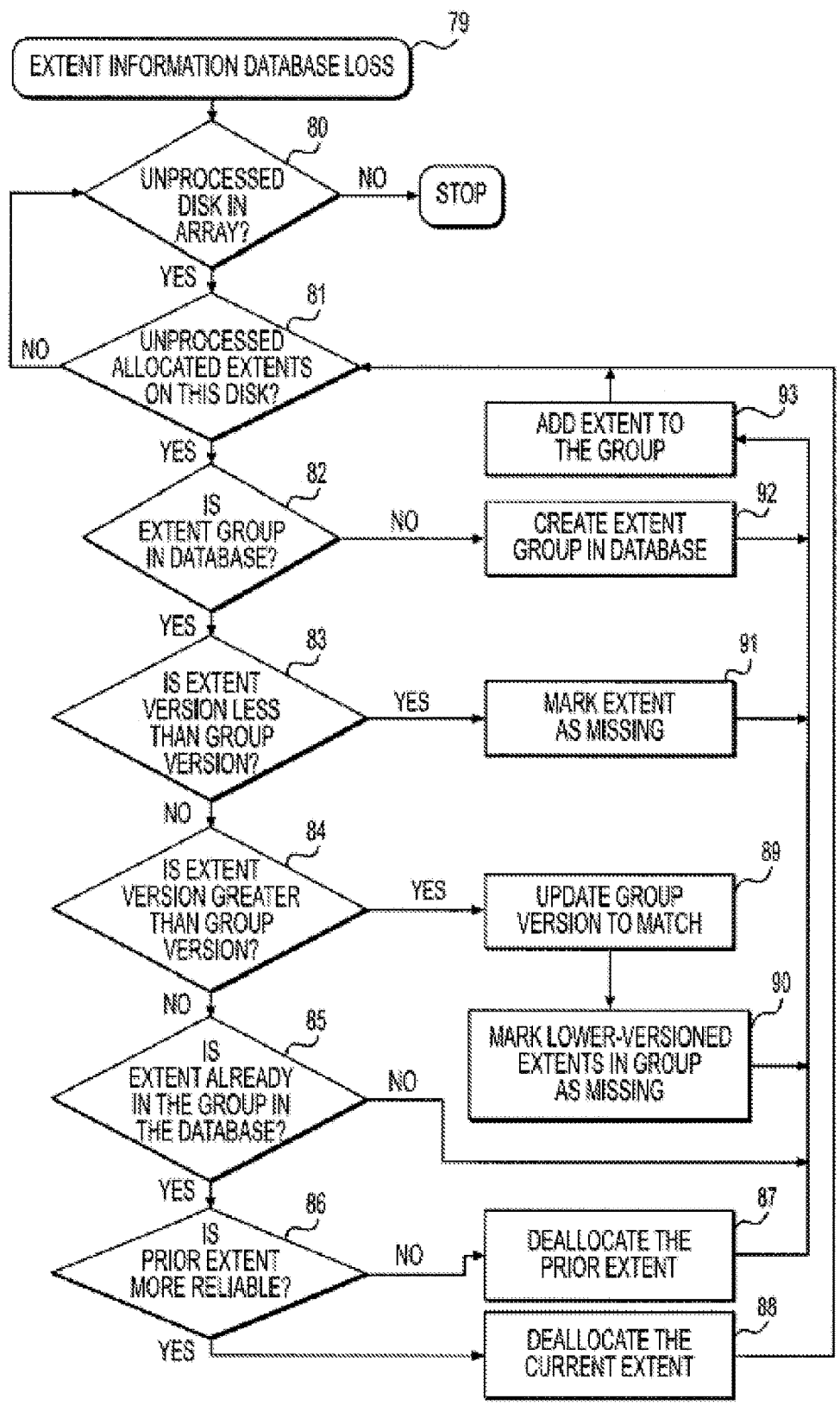
FIG. 12 is a recovery processing flow according to some implementations.

FIG. 12 is a recovery processing flow according to some implementations to reconstruct the extent information database 11f by scanning the storage devices 7 of the storage pool 6. According to some configurations, the extent information database 11f is protected against catastrophic failure of the nodes and the storage devices 8a, 8b, 9a, 9b which causes the extent information database 11f to become unavailable in the system memory 11 and the devices 8a, 8b, 9a, 9b as follows.

When the extent information database 11f is lost from the system memory 11 as well as from the copies stored in the devices 8a, 8b, or alternatively 9a, 9b, it is necessary to restore the extent information database 11f by scavenging the information regarding the allocated extents from each available device in the storage pool 6 by referring to the management information as shown in FIG. 4. The extent information database 11f needs to be scavenged from the storage pool 6 and reconstructed by one of the nodes that has recovered from the failure before client requests can be processed.

A catastrophic database failure occurs as an initial step 79 where the extent information database is lost from the system memory 11 of both nodes 1,2 as well as the storage devices 8a, 8b, and/or 9a, 9b. As such, the storage devices are scanned as follows to reconstruct the extent information database 11f. The processing flow first determines whether there is an unprocessed storage device in the storage pool 6 at step 80. When an unprocessed storage device is present in the storage pool 6, then at step 81 it is determined whether an unprocessed allocated extent is present on the unprocessed storage device to be selected for processing as in FIG. 12. If no unprocessed allocated extent is present, the processing flow returns to step 80 to select another unprocessed disk from the storage pool 6.

Otherwise, at step 82, for the unprocessed allocated extent, the extent header information is checked against all extent groups currently listed in the extent information 11f in the storage devices. If the extent header information of the unprocessed allocated extent lists an extent group that is not listed in the extent information 11f, the extent group is created in the extent information 11f at step 92 and the group version of the extent group is noted at this time. Next, the unprocessed allocated extent is added to the extent group in the extent information 11f at step 93 before moving to the next unprocessed allocated extent on the disk at step 81.

At step 82, if the extent header information of the unprocessed allocated extent lists an extent group that is already listed in the extent information 11f, then the processing flow proceeds to step 83. The extent header information of the unprocessed allocated extent is checked to determine if the extent version is less than the currently listed group version for the extent group in the extent information 11f. if the extent version is less than the currently listed group version, then at step 91, the unprocessed allocated extent is marked as "missing" before being added to the extent group in the extent information 11f at step 93.

When the extent version is not less than the currently listed group version for the extent group in the extent information 11f at step 83, then the extent version is checked to determine whether it is greater than the currently listed group version for the extent group in the extent information 11f. If the extent version for the unprocessed allocated extent is greater than the currently listed group version for the extent group at step 84, then at step 89, the group version of the extent group is updated to match the extent version of the unprocessed allocated extent. Further, at step 90, all other extents that have been previously listed as belonging to the extent group are marked as missing, and then the unprocessed allocated extent is added to the extent group in the extent information before the processing flow moves to the next unprocessed allocated extent on the disk at step 81.

If the extent version for the unprocessed allocated extent is not greater than the currently listed group version for the extent group at step 84, then the processing flow continues to step 85 where it is determined whether the unprocessed allocated extent is already listed in the extent group in the extent information 11f. If not, the processing continues to step 93 where the extent is added to the extent group. Otherwise, it is then determined whether a previously listed extent is more reliable than then unprocessed allocated extent at step 86. For each of the current and prior extents, the data stored thereon is checked against the hashes of the data. If the data and the hashes match, and no read errors occur, then the extent is considered to be reliable. If the prior extent is determined to not be more reliable at step 86, then at step 87 the prior extent is deallocated. However, at step 86, if the prior extent is more reliable than the unprocessed allocated extent, then the unprocessed allocated extent is deallocated at step 88. As such, following step 86, either the prior extent or the unprocessed allocated extent will be returned to the free table and made available to be re-allocated as in FIG. 11.

Figure 13:
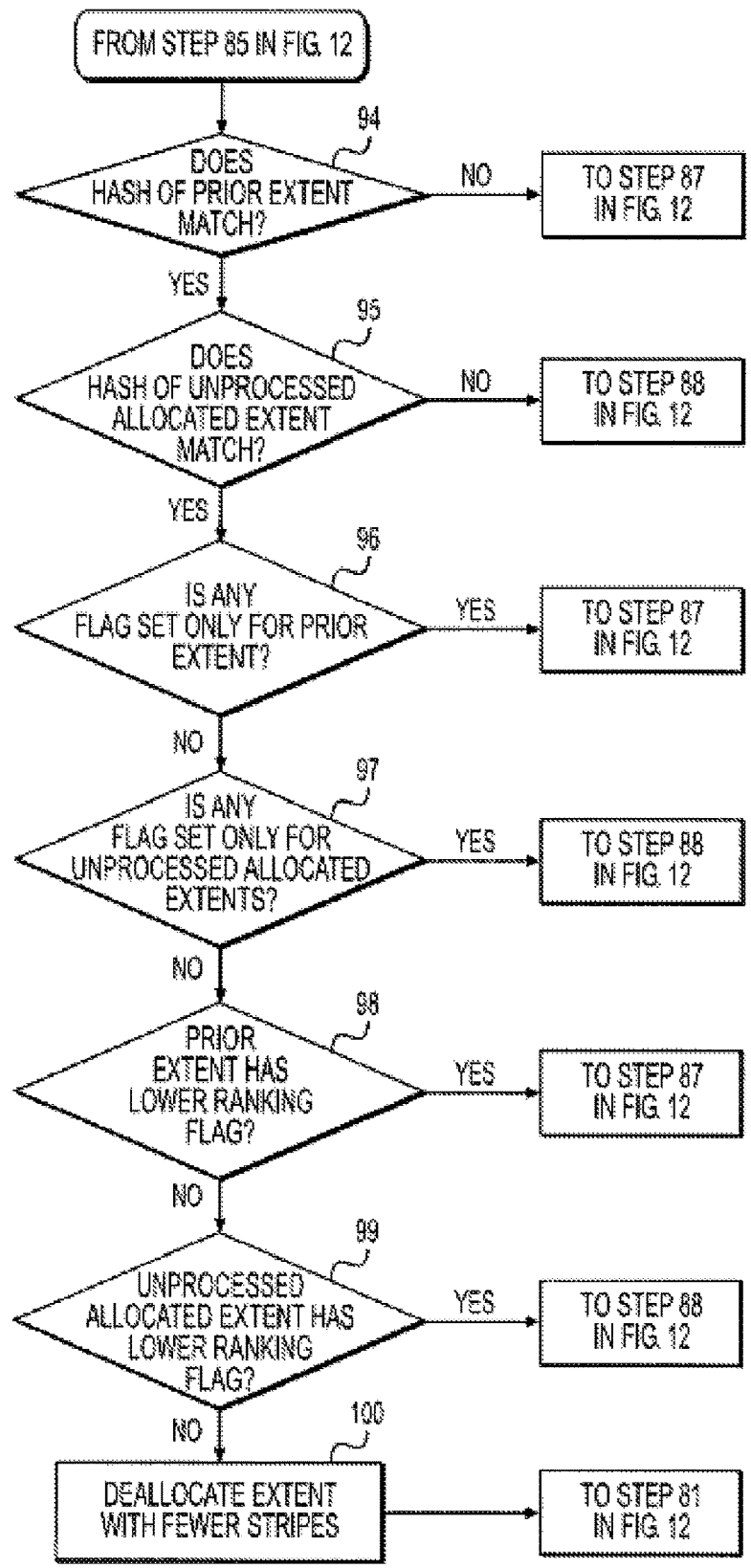
FIG. 13 is an extent reliability processing flow according to some implementations.

FIG. 13 shows an extent reliability processing flow, which modifies steps 86 to 88 of FIG. 12. When determining reliability, the hash listed in the respective extent is compared with the data stored in the respective extent. That is, at step 94, the hash stored on disk for the prior extent is checked against the data stored on disk for the prior extent. Likewise, at step 95, the hash stored on disk for the unprocessed allocated extent is checked against the data stored on disk for the unprocessed allocated extent. If the hash for the prior extent does not match the data thereof, the prior extent is deallocated at step 87 since the unprocessed allocated extent is considered more reliable and the processing flow continues as shown in FIG. 12. On the other hand, if the hash for the prior extent does match at step 94, then if the hash for the unprocessed allocated extent does not match the data thereof at step 95, the unprocessed allocated extent is deallocated at step 88 since the prior extent is considered more reliable and the processing flow continues as shown in FIG. 12. Deallocation of the respective extent can be accomplished by clearing the bit for the respective extent from the allocated extents bitmap in the superblock(s) 22 of the corresponding storage device 7.

Further, if no conflict is found for the hashes of the prior extent and the unprocessed allocated extent at steps 94 and 95, the reliability of the extents are determined according to disk quality flags, which can be set for each extent listed in the extent information 11f. Namely, it is checked whether flags are set for the prior extent and the unprocessed extent. Accordingly, at step 96, the prior extent is checked to determine whether any of the missing, evacuate and flaky flags have been set. If any flag is present only in the prior extent, the prior extent is deallocated at step 87. Otherwise, processing continues to step 97 where the unprocessed allocated extent is checked for any of the flags. If any flag is present only in the unprocessed allocated extent, the unprocessed allocated extent is deallocated at step 88.

However, if flags are set for both of the prior extent and the unprocessed allocated extent, then at step 98, the priority of the flags of the extents are judged as follows. An extent with an evacuate flag is considered more reliable than an extent with a flaky flag, which in turn is considered more reliable than a missing flag. If the prior extent has a lower ranking flag at step 98, then the prior extent is deallocated at step 87. If the unprocessed allocated extent has a lower ranking at step 99, then the processing flow continues to step 88. However, at step 100, there are no flags set for either the prior extent or the unprocessed allocated extent. Thus, at step 100, the extent having the fewer initialized stripes, as determined by referring to the initialized stripe bitmap portion of the extent header of extent 24b as shown in FIG. 4, thereon may be deallocated.

An extent for which the missing flag has been set corresponds to the storage device 7 for the extent being missing. A storage device may be missing for various reasons. When a storage device has become inaccessible and the extents thereon have been flagged as missing, in some circumstances the storage device may have undergone a failure. The failure of a storage device can potentially result in the loss of a large number of allocated extents. For example, on a 4 TB storage device, it is possible to provide over 65,000 extents which are each in turn able to be provided as members of separate extent groups to different protection class instances. As each protection class may institute different data protection algorithms, when a storage device has failed and is missing indefinitely, the protection class instances having extents thereon may have various degrees of vulnerability to data loss. For example, extents configured to have a single protection extent such as a 1+1 or 5+1 protection class extent groups are highly vulnerable to subsequent loss of additional extents. On the other hand, extent groups for protection classes that require more than one protection extent may be less susceptible to additional extent loss. Accordingly, when the storage pool 6 experiences the failure of a storage device 7, it is necessary to determine the affected protection class instances and determine the order in which extents are to be recovered.

Figure 14:
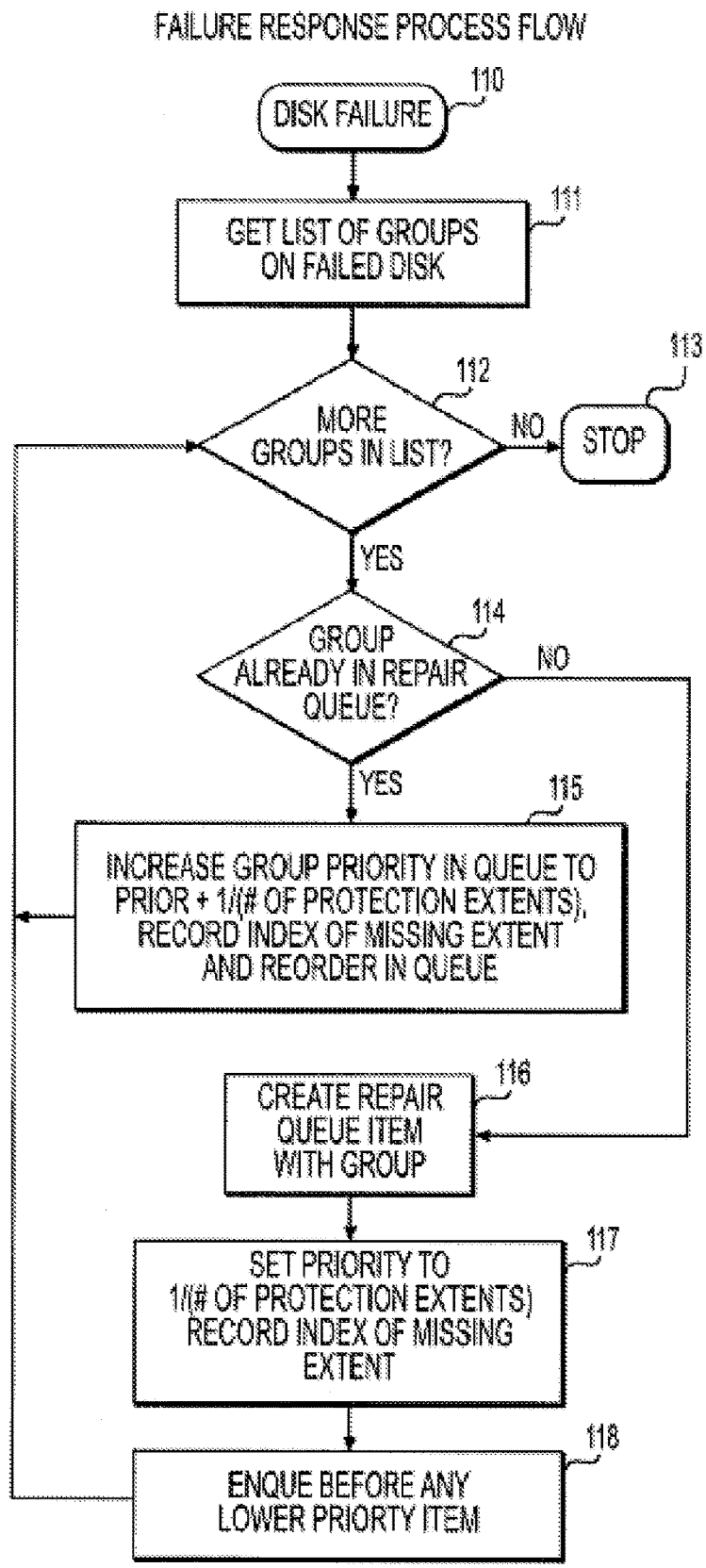
FIG. 14 is a processing flow for queuing extent groups that have been impacted by the failure of a storage device according to some implementations.
Figure 15:
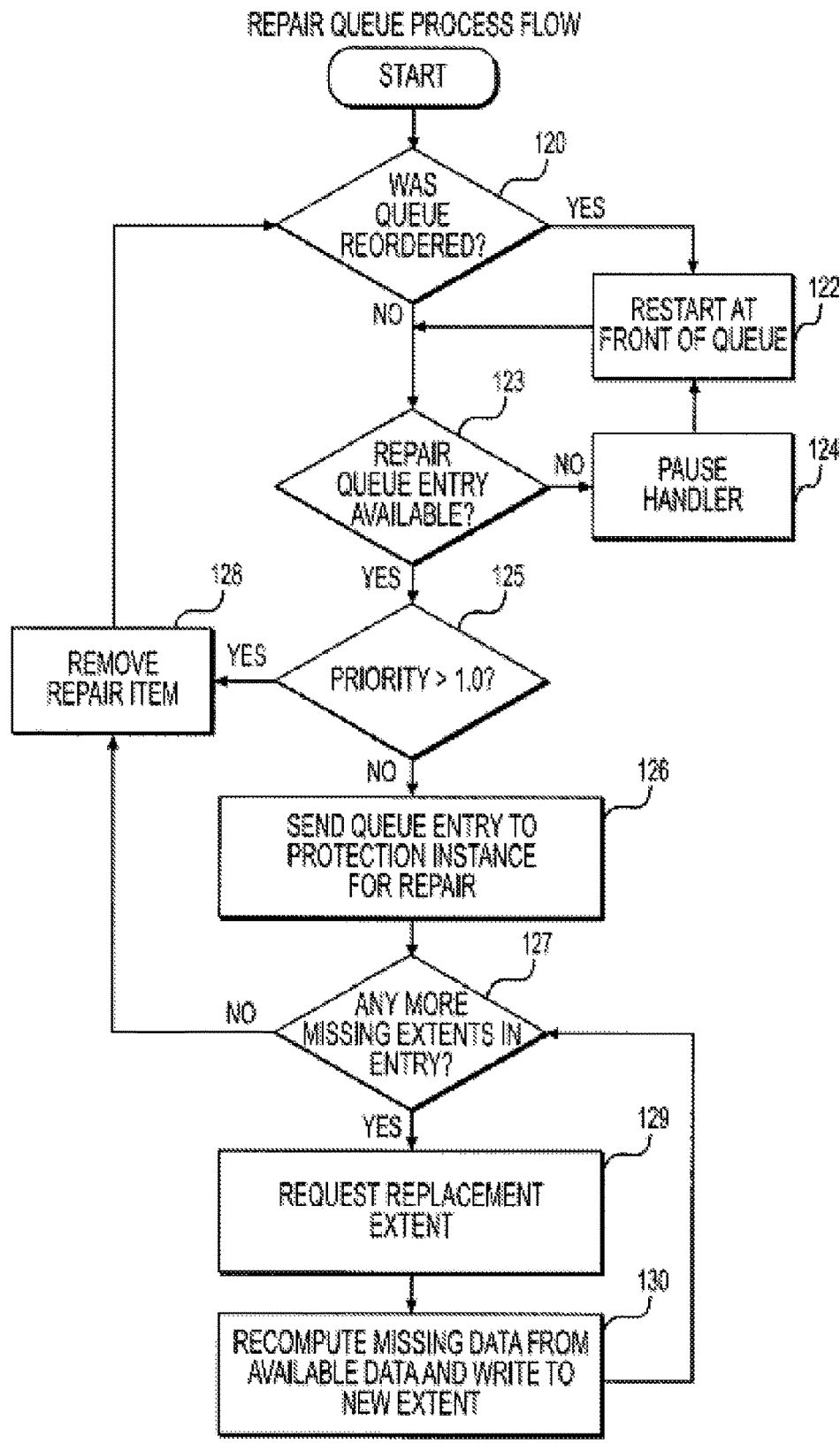
FIG. 15 is a processing flow for a repair queue organized according to some implementations.

FIG. 14 shows a processing flow for queuing extent groups have been impacted by the failure of a storage device. Further, FIG. 15 shows a processing flow for a repair queue organized according to FIG. 14.

In FIG. 14 at step 110, the device monitor 11c detects from the storage pool 6 that a storage device has failed, and a list of all affected extent groups is constructed at step 111. The list of all extent groups that have an extent on the failed disk can be determined by referencing the extent information 11f. Next, the processing flow enters a loop at step 112, which continues until all the extent groups in the list have been processed and added to the repair queue 11h before ending at step 113. Accordingly, for a given extent group selected at step 112, at step 114 it is determined whether the selected extent group already has been placed in the repair queue 11h. If not, the processing flow continues to step 116 where an item of the repair queue 11h is created for the selected extent group. Then, at step 117, a priority of the item created at step 116 is calculated. The priority is set as 1/(# of protection extents of the extent group). In other words, for an "A+B" protection class, the priority for a single disk failure may be set as 1/B. For example, a single disk loss for an "A+1" protection class results in an initial priority of 1/1=1.0 for the extent group item in the repair queue at step 117 whereas a "A+6" protection class results in an initial priority of ⅙=0.167. At step 118, the repair queue item for the selected extent group is inserted into the repair queue 11h before any other repair queue items having a lower priority.

Further, in FIG. 14, at step 114, if the selected extent group already has been created and prioritized in the repair queue 11h then the processing flow continues to step 115. At step 115, the priority of the selected extent group in the repair queue is increased. Specifically, the priority is recalculated as the previous priority in addition to 1/(# of protection extents). In other words, when more than one disk has failed, it is possible that one or more extent groups may have extents on multiple failed disks. As such, the remaining extents for these extent groups become more vulnerable to data loss and the extent groups may have their priority increased in order to be repaired sooner than extent groups less impacted by the one or more disk failures. Thus, in the case of an "A+2" protection class, the priority may initially be calculated at step 117 as ½=0.5. Subsequently, at step 115, the priority may be recalculated as the previous priority 0.5 plus (½)=1. Since the priority at step 115 may be modified, after recalculating the priority, the item for the selected extent group may be moved in the repair queue 11h before any other repair queue items having a lower priority. The processing flow continues to step 112 until each extent group in the listing of extent groups on the failed disk has been processed.

Based on the processing flow shown in FIG. 14, the repair queue 11h is updated as storage devices fail to create and maintain a prioritized listing of the extent groups that need to be repaired. For an extent group that has experienced an additional disk failure, leading to the extents thereon to go missing, the extent group may be adjusted in the repair queue 11h to have an increased priority to be repaired. However, should any extent group generate a priority greater than 1.0, data loss may generally be deemed to have occurred for the extent group.

Turning to FIG. 15, a repair queue processing flow is shown. The repair queue processing flow starts in FIG. 15 after one or more items are added to the repair queue 11h in FIG. 14. As an initial matter, it is determined at step 120 whether the repair queue 11h was been reordered. If the repair queue has been reordered, the repair process is restarted for the extent group listed in the first item in the repair queue at step 121. Otherwise, at step 123, the next available repair queue item is selected. If no repair queue items remain in the repair queue 11h, then the repair process is paused at step 124 until one or more items are added to the repair queue 11h as shown in FIG. 14.

After the next available repair queue item is selected at step 123, it is determined whether the priority of the repair queue item is greater than 1.0 at step 125. As discussed above, should any extent group cause an item in the repair queue 11h to have a priority higher than 1.0, data loss is generally assumed to have occurred in the extent group. As a result, an extent group with a priority greater than 1.0 may be deemed irreparable and removed from the repair queue at step 128. If the priority of the repair queue item is less than 1.0, then at step 126 the corresponding extent group is sent to the protection instance to which it is allocated for repair. Next, at step 127, if there are any "missing" extents in the extent group of the selected item, then processing continues to step 129. Otherwise, the processing flow continues to step 128 where the selected item is removed.

At step 129 in FIG. 15, a replacement extent is requested to be allocated by the extent manager 11b to the extent group for the missing extent in the extent group that has a missing flag. As such, any missing extent that is inaccessible due to the failure of a storage device 7 can be replaced by providing an available extent for each missing extent from the other storage devices 7 in the storage pool 6. Namely, replacement extents are selected from storage devices 7 in the storage pool 6 that do not store an extent that belongs to the extent group by referring to the allocated extent bitmaps in the superblocks 24 of the storage devices. Once a replacement extent has been provided for a missing extent in the extent group of the selected item, the data on the missing extent is able to be recomputed from the non-missing extents in the extent group at step 130. As each protection class provides data protection using different protection algorithms, the data on the missing extent is recomputed according to the algorithms specific to the protection class to which the extent group is allocated. As such, the non-missing data extents and non-missing protection extents are referred to in order to recompute the missing data. Once the missing data is recomputed, it is written into the replacement extent at step 130.

As shown in FIG. 15, steps 127 to 130 are repeated for each missing extent in the extent group. At step 127, once no more "missing" extents exist in the extent group of the selected item, the selected item is removed from the repair queue 11*h* at step 128. Following step 128, the repair queue 11*h* is checked to determine whether it has been reordered at step 120. If the repair queue 11*h* has been reordered as in FIG. 14 at step 115, the processing flow in FIG. 15 proceeds to restart at the front of the queue at step 121. Otherwise, the next available repair queue item is selected and processing continues as shown in FIG. 15.

According to the processing flows shown in FIGS. 14 and 15, when a failure occurs in the storage pool 6 causing one or more allocated extents to become missing extents, the data of the missing extents is recomputed. When multiple missing allocated extents exist, the missing extents are repaired according a prioritized order, which depends on the missing extents effect on the data integrity of the extent groups to which they respectively belong. As such, the restoration of data of missing extents which are more vulnerable to data loss due to subsequent storage device failure in the same extent group may be prioritized over the restoration of missing extents which are effectively less vulnerable to additional storage device failure.

Further, as in FIGS. 14 and 15, when a failure occurs in the storage pool 6 causing one or more allocated extents to become missing extents, replacement extents from unallocated available extents on the storage pool 6 are allocated to the corresponding extent groups which have missing extents to provide replacement storage for the missing data. Accordingly, by providing replacement extents from the storage pool to supplement the extent groups affected by storage device failure, there is no need to provide dedicated hot spare devices or for urgent administrator attention to replace a failed storage device. Any available extents in the storage pool are able to serve as replacement for missing extents. Restoring the data of the missing extents is, advantageously, able to significantly reduce the time required to restore a repairable extent group as compared to conventional RAID systems since any data recomputed as in FIG. 15 is directed as I/O across one or more replacement extents across multiple storage devices rather than to a single hot spare or replacement storage device provided by an administrator.

In other words, the replacement extent(s) allow data of a failed storage device to be spread across multiple storage devices immediately upon the device monitor 11*c* detecting that the storage device has failed. Further, the order in which replacement extents are allocated and missing data is recomputed is prioritized according to the vulnerability of the remaining extents in the affected extent groups to further storage device failures. Moreover, the prioritization is adjustable if additional storage devices fail up to the protection limit provided by the protection class.

While FIGS. 12-13 relate to processing following failures or crashes that affect the extent information database 11*f* and FIGS. 14-15 relate to processing following the failure of a storage device 7 for some examples, other examples address problems caused by failures that occur during data writing.

In general, when writing data in stripes across multiple storage devices 7, a failure or crash can leave one or more stripes in an unrecoverable state. In conventional RAID systems, this is referred to as a "RAIDS hole". Due to the failure or crash, it is impossible to know which parts of the stripe were written successfully and which were not completed, rendering the entire stripe invalid. Conventional RAID systems provide an uninterruptible power supply, battery-backed caches, or a combination thereof to address the problem of partially written stripes.

Some examples may address a problem where a failure or crash of one of the nodes occurs when writing stripes across the extents 24 of an extent group during a write operation to the storage pool 6. Specifically, the write data is used to compute a parity journal entry so that if a failure occurs during a write operation, in the best case, a partial write can be completed using erasure coding and using the data which was successfully written, and in the worst case, the integrity of portions of the stripe which would not have been affected by the write operation can be assured upon recovering from the failure or crash. While the description herein refers to parity journaling, a given parity journal entry may contain either parity information or error correction coding as in the case of RS/EC 20+6 protection class instances. Accordingly, the calculation of the list of protection blocks for a given journal subentry 25*b* as shown in FIG. 4 will depend on the protection algorithms of the respective protection class which the journal subentry 25*b* pertains to.

These examples may be based upon the thin provisioned block storage environment described above and the description of this embodiment is directed to the portions thereof, which are additional to, or modifications of the description of the examples already discussed above.

As shown in FIG. 4, journal segments 23*a* and 23*b* are provided for each of the nodes 1, 2 on the storage devices 7 in the storage pool 6. Journaling to multiple storage devices is used to provide a transactional layer for writing or updating existing data and protection blocks within a stripe 28 of an extent group. As such, in some examples, there is no need to include an uninterruptible power supply, battery-backed caches, or a combination thereof in the nodes 1,2 shown in FIG. 2. While it is possible to journal all data involved in a write, doing so may use substantial computational and disk I/O processing overhead.

Accordingly, in some examples, a type of journaling referred to herein as "parity journaling" is described. For example, the RS/EC 20+6 protection class provides significant data protection for each stripe, which allows for the parity journaling to provide guaranteed protection for stripe data unmodified by the write operation and further uses the erasure code protection data to recover and complete any interrupted writes when possible. Parity journaling has lower computational and I/O requirements than full data journaling, while incurring a slightly higher degree of risk that data may be corrupted. Moreover, with parity journaling, even the journal entries themselves in the journal segments 23*a*, 23*b* can be recovered should one or more storage devices 7 experience a failure when attempting to replay the parity journal depending on the protection class characteristics and the number of journal entries affected by the storage device failures.

As in FIG. 4, dedicated regions of each storage device are provided as the journal segment 23a, 23b, and journal subentries exist therein. Each node writes its journal entries sequentially in the respective journal segment. Thus, node 1 writes journal entries 25b in the node 1 journal segment 23a, for example, while node 2 writes journal entries 25b in the node 2 journal segment 23b in the case of the two node system shown in FIG. 1. Each write request from the clients 3 causes a corresponding journal entry to be created, and each journal entry has a copy written to at least as many disks as the number of protection extents for the extent group to which the write request is directed. Therefore, each journal entry shares the same level of protection as the extent group to which it corresponds.

Figure 16:
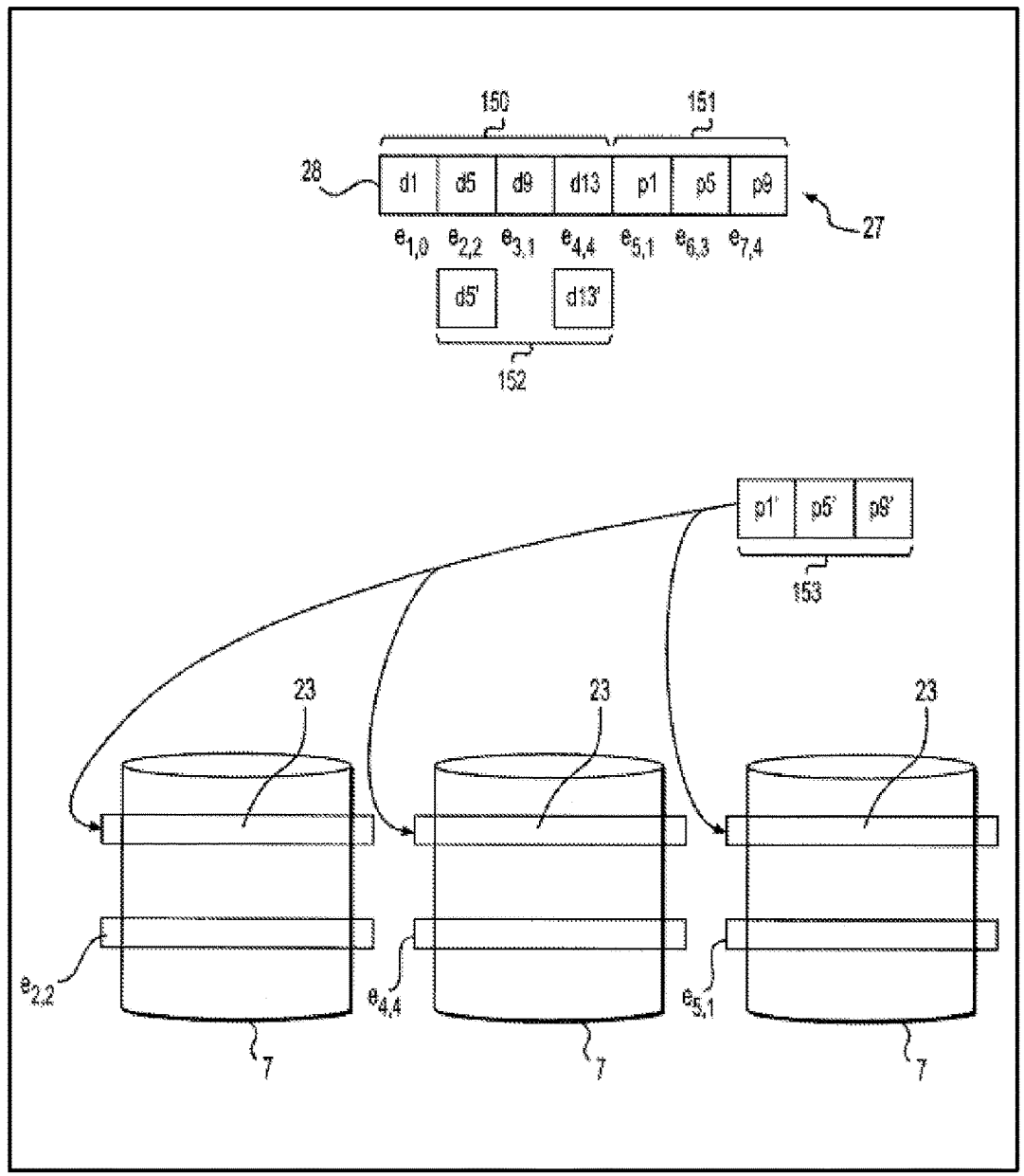
FIG. 16 illustrates an example distribution of journal entry copies for a write operation to an extent group for the parity line shown in FIG. 8 according to some implementations.

FIG. 16 shows an example distribution of journal entry copies for a write operation to the protection line shown in FIG. 8 according to some implementations. In general, the placement of parity journal entries within the storage pool is constrained so that journal entries for a respective write operation and placed on storage devices that do not store data that was unmodified by the respective write operation. In other words, when storing the copies of a journal entry, no storage device that stores unmodified data may store a journal entry, which includes parity information describing the unmodified data. FIG. 8 shows a simplified example for the case in which the protection line 27 in FIG. 8 is subject to a write, which modifies a portion of the blocks thereof.

Figure 17:
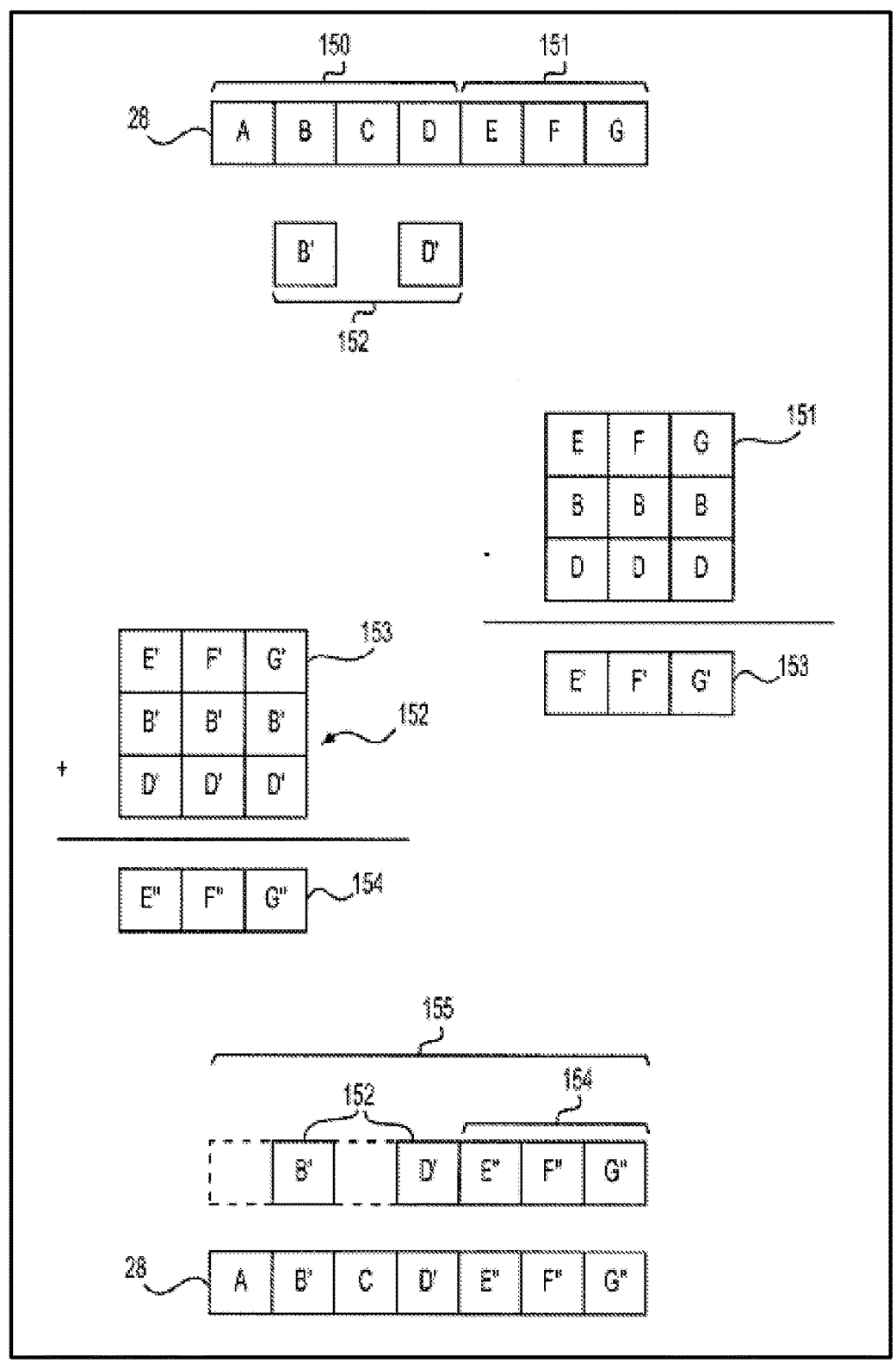
FIG. 17 illustrates a relationship between an existing stripe of data, new data to be written, and the computation of parity blocks according to some implementations.

Given the protection line 27 in FIG. 8 which consists of blocks as d1, d5, d9, d13 (as client data 150), p1, p5, p9 (as protection data) which is stored across the 7 distinct extents $\{e_{1,0}, e_{2,2}, e_{3,1}, e_{4,4}, e_{5,1}, e_{6,3}, e_{7,4}\}$ of extent group $eg_0$, if a write is directed to the protection line 27 which includes new data 152 consisting of blocks d5' and d13' then the unmodified data blocks are d1 and d9 which are respectively stored on extents $e_{1,0}$, and $e_{3,1}$. When the parity journal entries including parity blocks 153 for the new data 152 are to be stored, the parity journal entries may be located on any storage devices other than the storage devices that have the extents $e_{1,0}$, and $e_{3,1}$ thereon. As such, in FIG. 8, it is acceptable to store the parity journal entries in the journal segments 23 of the storage devices 7, which also store the extents $e_{2,2}$, $e_{4,4}$, and $e_{5,1}$, for example. The parity journal entries may also be stored on any other storage devices 7 in the storage pool other than the storage devices that have the extents e1,0 and $e_{3,1}$ thereon. The calculation of the parity blocks 153 is shown in FIG. 17. As shown in FIG. 16, a journal entry includes the parity blocks 153 corresponding to the unmodified data blocks 150. In this implementation, three parity blocks p1', p5', p9' make up the protection data for the journal entry. Each of the three parity blocks is stored separately in a journal entry copy 25b on the storage devices 7. That is, p1' is stored on a storage device 7 different from the storage devices where the journal entry copies containing p5' and p9', and vice versa.

Each journal entry 25b in a journal segment of a storage device 7 has at least an entry checksum, a list of block numbers (e.g., addresses) that may be updated in for the write, a CRC or checksum for the new data for the write, and parity blocks for each affected block in the parity line that is not being updated. A different parity block is included in each copy of the journal entry 25b. The parity blocks can be calculated from the data being written, the data being replaced, and the parity blocks being replaced as will become evident from the following description.

FIG. 17 is a drawing showing a generalized relationship between an existing stripe of data, new data to be written, and parity computation. In the implementation shown in FIG. 17, a an existing stripe 28 consists of data blocks 150 storing client data (A,B,C,D) and protection blocks 151 storing parity (E,F,G) of the data blocks. Further, the existing data blocks (B,D) are to be modified with new data blocks 152 (B',D') by a write request. First, in the parity journaling, the parity 153 (E',F',G') of the unmodified data is calculated by subtracting out the data to be modified in the write (B,D) from the existing parity 151 (E,F,G). In the implementation shown in FIG. 17, parity calculations are performed on a block basis. However, in other implementations, the parity calculations may be performed on each strip 29 of a stripe, on each parity line 27 as shown in FIG. 16, or on entire extents 24.

Secondly, to calculate the new parity 154 (E",F",G") of the stripe 28, the parity 153 (E',F',G') is added with the new data blocks 152 (B',D'). In FIG. 17, the parity blocks 153 (E',F',G') form the parity blocks of the journal entry 25b for writing the new data blocks 152 (B',D'). Thus, the parity blocks 153 are written to storage devices 7 in the respective journal segment 23 for the node performing the write request. Further, the data 155 to be written into the stripe 28 consists of the new data blocks 152 (B',D') and the new parity 154 (E",F",G"). Accordingly, the write request is committed to the relevant extent group when the existing stripe 28 is updated to (A,B',C,D',E",F",G").

Figure 18:
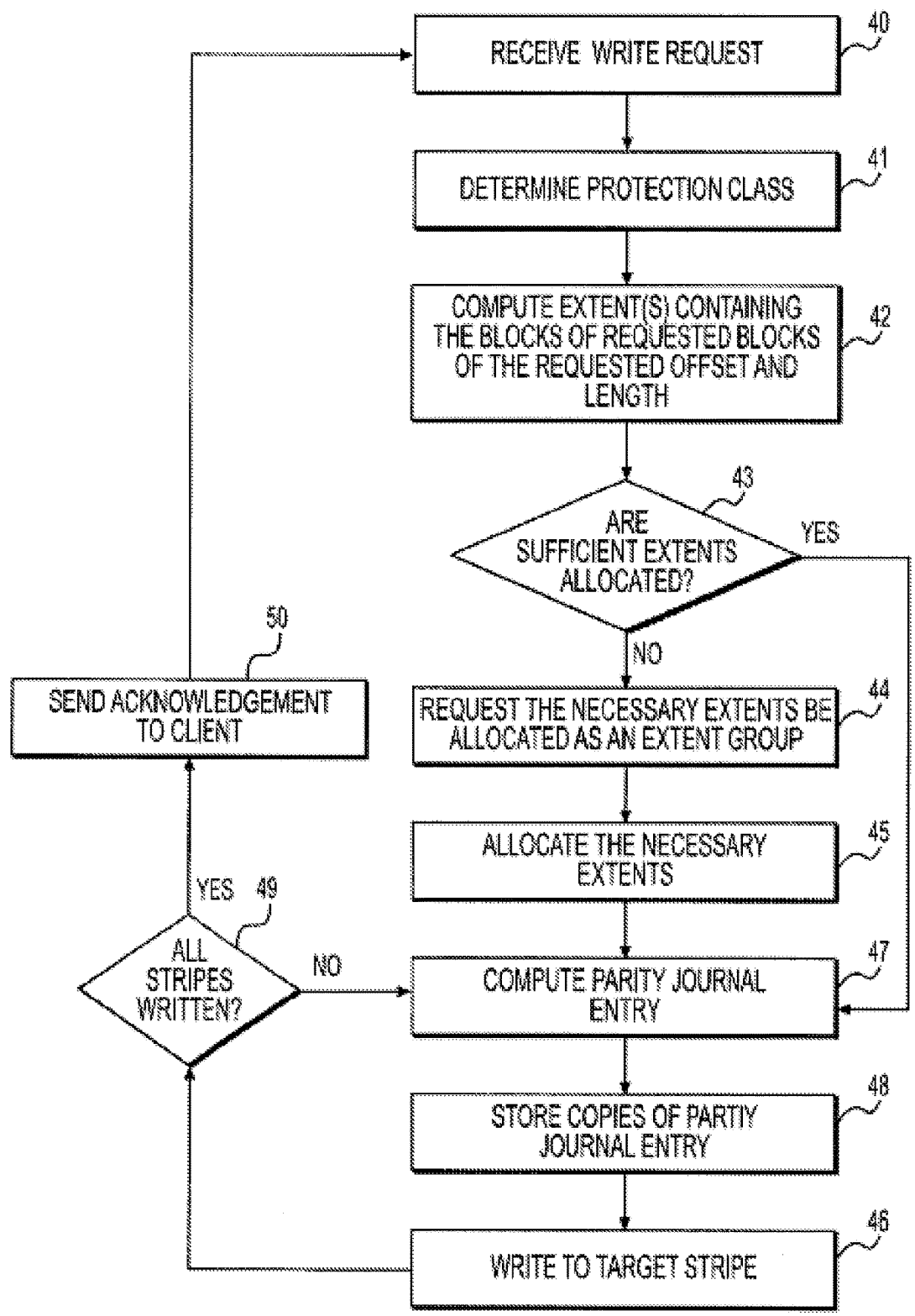
FIG. 18 is an example write processing flow according to some implementations.

FIG. 18 is a write processing flow with parity journaling according to some implementations. It is assumed in FIG. 18, that the one operational node performs the write processing flow while the other node remains as a backup. Steps 40 to 45 in FIG. 18 are the same as in FIG. 10. The write processing flow in this example differs in that steps 47 and 48 are added prior to writing data at step 46. As shown in FIG. 18, after the extent group(s) is allocated to the protection class at step 45, the processing flow proceeds to step 47. Steps 47, 48, 46 and 49 represent data writing on a stripe-by-stripe basis. At step 47, the parity blocks 153 for the parity journal entry are calculated for the first stripe to be written to. Then at step 48, copies of the parity journal entry are stored across the storage pool 6. Furthermore, the active segment count and list of active segments in the journal segments 23 may be updated to reflect the operation. After the storing the copies of the parity journal entry, the data 155 to be written to the first stripe, including the new data 152 and new parity 154 is committed to the first strip of the extent group specified by the write request at step 46. Then, at step 49, the processing flow may return to step 47 to continue the processing flow previously described until all stripes specified by the write request are completed. Once all journal entries have been recorded and all stripes updated, the processing flow returns to step 41 to handle the next write request after sending a write completion acknowledgement to the client that sent the write request at step 50.

Figure 19:
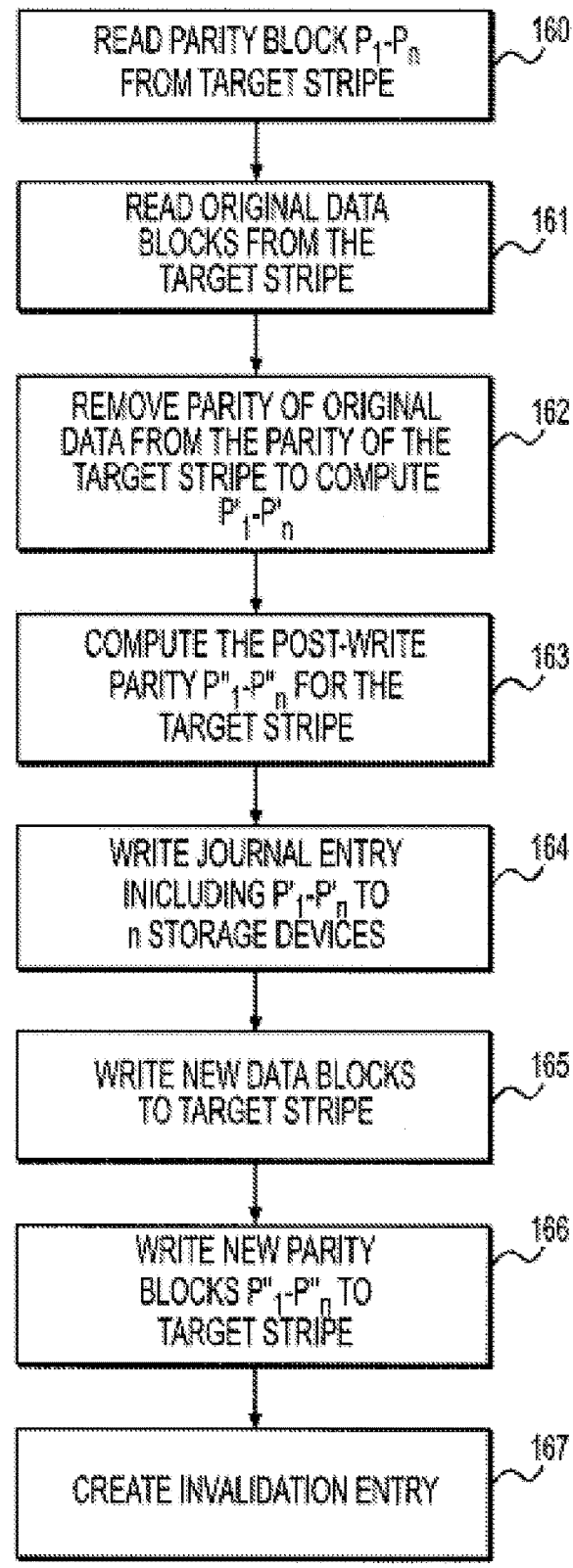
FIG. 19 is an example processing flow of the computation of the parity journal, storing of journal entry copies, and block data writing according to some implementations.

FIG. 19 is a detailed processing flow of the computation of the parity journal, storing of journal entry copies and block data writing according to some implementations. FIG. 19 depicts the parity journaling and data writing process accordingly to some implementations on a stripe-by-stripe basis. Namely, according to the processing flow shown in FIG. 19, journal entries are created sequentially for each stripe(s) that is to be modified by a write request. First, at step 160, the parity blocks p1 to pn are read from the target stripe which is to be modified by the write request. The parity blocks p1 to pn are shown in FIG. 17 as blocks 151 (e,f,g). Next, the original, unmodified data blocks are read from the target stripe at step 161. In the case of writing to a newly allocated extent group, the original data is assumed to be zero with corresponding zero parity. By referring to the initialized stripe bitmap in the extent header 24b, it can be determined that a given stripe has not been previously used to store data and is hence considered to be zero. In FIG. 19, if the stripe 28 had not yet been written to, blocks 151 (e,f,g) would all have zeros.

The unmodified data blocks are shown as blocks (b,d) in FIG. 7 whereas the new write data is shown as data blocks 152 (b',d'). Then at step 162, the parity of the original data blocks is removed from the parity of the target stripe to compute p1' to pn'. The parity blocks p1' to pn' are shown as parity blocks 153 (e',f',g') in FIG. 17. The post-write, or new, parity blocks p1" to pn" are then calculated from the parity blocks p1' to pn' and the write data for the target stripe at step 163. The post-write parity blocks p1" to pn" are shown as parity blocks 154 (e",f",g") in FIG. 17.

Next, at step 164, copies of the parity journal entry containing the parity blocks p1' to pn' are separately written to "n" separate storage devices where "n" is the number of parity blocks in the target stripe. While the "n" storage devices 7 may be selected from any of the storage devices 7 in the storage pool 6, to provide the maximum protection against storage device failure, the "n" storage devices that store the journal entry copies may be different from the storage devices 7 that provide the extents having the target stripes of the write request. In some implementations, additional journal entry copies may be stored on one or more additional storage devices with only the journal entry metadata shown in FIG. 4, that is, without the parity blocks. Upon writing the "n" copies of the parity journal entry at step 164, at step 165, the new data blocks are written to the target stripe. After writing the new data blocks to the target stripe, the new, post-write parity blocks p1" to pn" are written to the target stripe at step 166. At this time, the write processing can move to the next target stripe, which is to be modified as shown in FIG. 18 at step 48, for example.

In addition, after finishing writing the new parity blocks at step 166, an invalidation entry 25a is created in the corresponding journal segment 23 at step 167. The created invalidation entry corresponds to the journal entry written at step 164. Further, the active segment count and list of active segments may be updated to reflect that the write has completed. However, as explained above, when a node experiences a failure or crash rendering it non-operational, another node takes over from stand-by. Before the node can take over handling data requests from the clients, the node must determine whether the write requests handled by the failed node have completed or not and whether any data has been lost. By examining the journal segments 23 that correspond to the failed node, the journal entries of incomplete writes (e.g., any pending write processes that have not reached step 167) can be replayed to determine whether the data on targeted stripes by the outstanding write requests have successfully completed. Thus, in FIG. 19, any journal entries written previously at step 164 that exist in the journal segments for a failed node are indicative of an incomplete write operation.

During the write processing flow of FIG. 19, the node performing the write operation may potentially fail at any time. If the node fails prior to step 164, no journal entries may be written to the "n" storage devices. Further, the write processing flow of FIG. 18 may fail to reach step 49 and the client may not receive an acknowledgment that the write has completed. Further, the other one of the nodes, which did not initially handle the write operation, takes over operations for the failed node may not find any journal entry present for the write that was being processed at the time of failure. As a result, in this example, a failure or crash during the write processing before step 164 in FIG. 19 may result in the write being completely lost and the client must resend the write request.

If the node fails after beginning step 164 but prior to completion of step 165, some portion of journal entries may have been written in the journal segments 23 of up to the "n" storage devices. However, the write processing flow of FIG. 18 may still fail to reach step 49 and the client may not receive an acknowledgment that the write has completed. Further, the node that takes over operations for the failed node may find some portion of the journal entries that were written in the journal segments 23 of up to the "n" storage devices at step 164. By performing the recovery processing flow as shown in FIG. 21 to reference the journal segments of the failed node, it may be determined that the data writing failed to complete.

Further, if the node fails after beginning step 165 but prior to step 167, the journal entries may be fully written in the journal segments 23 of the "n" storage devices at step 164. However, some portion of the new data blocks and/or the new parity blocks may have been written to the target stripe. However, the write processing flow of FIG. 18 may still fail to reach step 49 and the client may not receive an acknowledgment that the write has completed. Further, if any "A" extents in an extent group for an A+B protection class instance were written to before the failure of the node, the write request can be completed. Otherwise, the blocks that were targeted during the write processing may be zeroed out and the protection information for the unmodified portions of the target strip may be restored by referring the journal entry.

Figure 20:
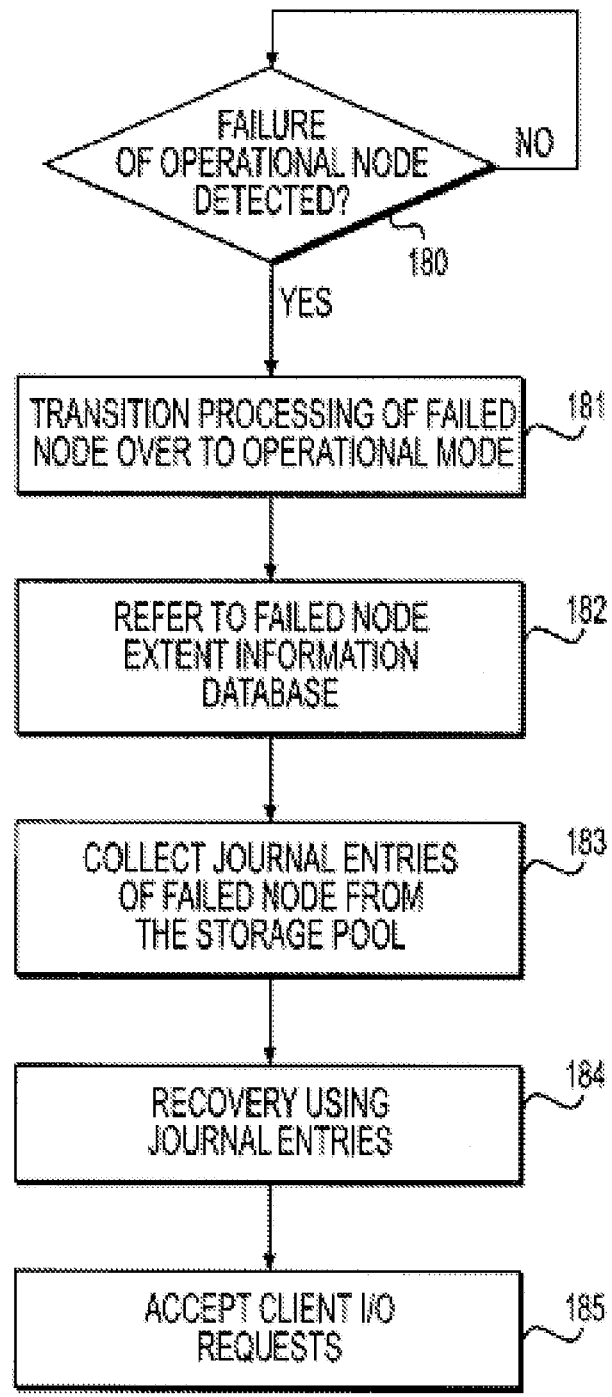
FIG. 20 illustrates a failure detection processing flow for detecting and responding to a failure or crash of one node by another node according to some implementations.

FIG. 20 is a failure detection processing flow for detecting and responding to a failure or crash of one node by another node. The heartbeat monitoring provided in the system memory 11 of each of the nodes continuously monitor the other node to detect when a failure or crash has occurred in either of the operational nodes at step 180. When a failure is detected at step 180, the node that remains operational transitions to perform I/O processing for the failed node at step 181. At step 182, the extent information 11f maintained by the failed node may be referred to by the now operational node if necessary. Further, at step 183, the journal entries in the journal segments corresponding to the failed node are collected from the storage devices 7 in the storage pool 6. For example, in the journal segments 23, a list of active segments and an active segment count are included. Assuming that the list of active segments and the active segment count do not conflict, the active journal entries that need to be collected at step 183 can be restricted to the list of active segments. Otherwise, the journal segments 23 of all the storage devices may be referred to in order to collected the active journal entries. While copies of each journal entry is written to "n" storage devices, the copies of the journal entry as calculated at step 164 are considered to be a single journal entry describing data writing to a target stripe. Then at step 184, recovery of any write requests that were being performed by the failed node begins using the journal entries. The recovery at step 184 is shown in detail in FIG. 21. After recovery has completed at step 184, the now operational node can begin to process client requests, such as new write requests as in FIGS. 18-19, after as much data as possible was recovered during the recovery processing of FIG. 21.

Figure 21:
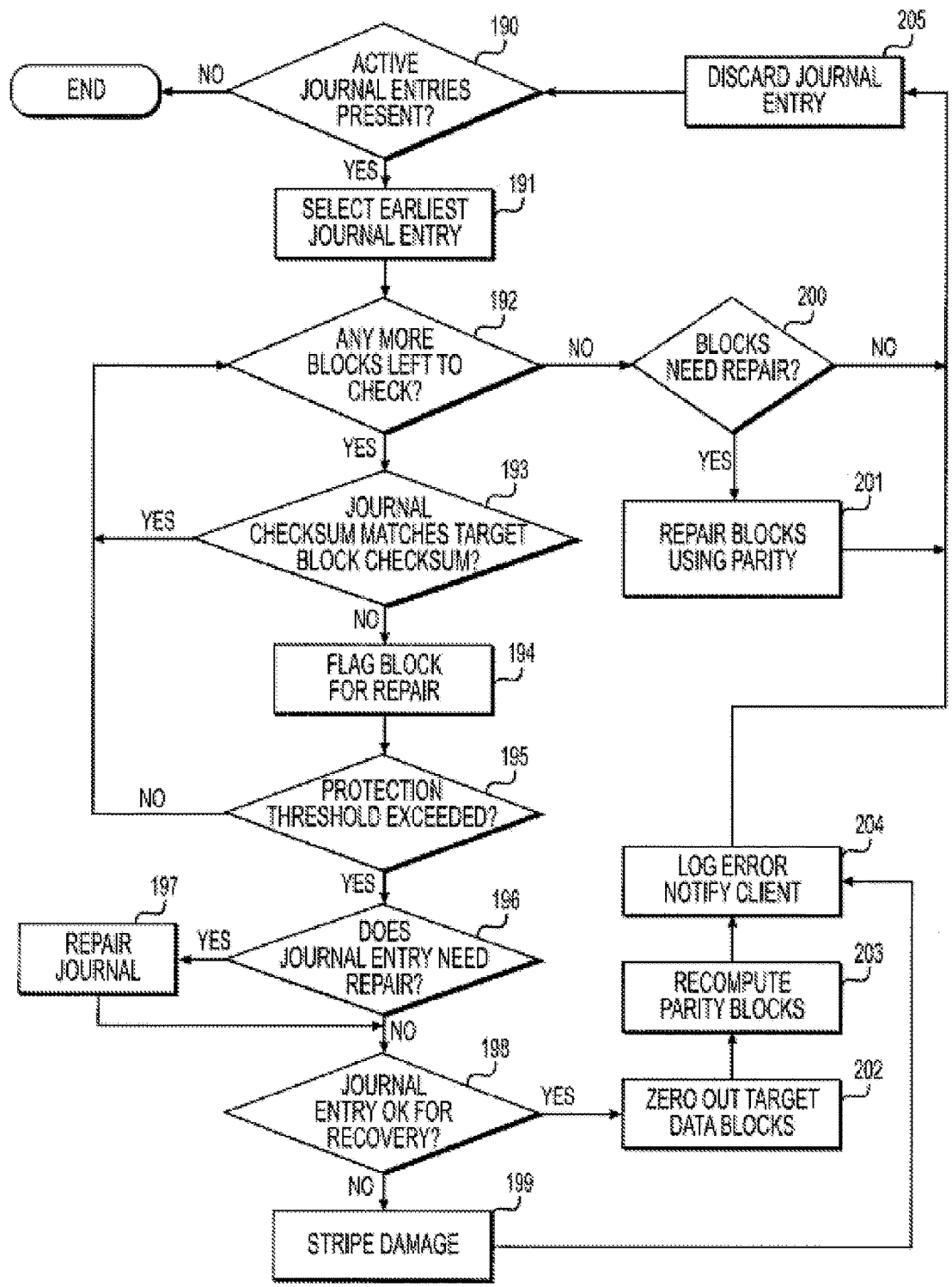
FIG. 21 illustrates a recovery processing flow with parity journaling according to some implementations.

FIG. 21 is a recovery processing flow with parity journaling according to some implementations. At step 190, as an initial matter, it is determined whether any active journal entries are present from the collection at step 183 in FIG. 20. Active journal entries are those journal entries 25b in the journal segments 23 that do not have corresponding invalidation entries 25a. When one or more active journal entries are present, the earliest journal entry is selected at step 191. For the selected journal entry, the processing flow proceeds to step 192 where the individual blocks of the extent group are individually checked on a block-by-block basis. First, at step 193, the block hash recorded in the selected journal entry 25b is compared with the target block checksum listed in the extent block hashes of the extent header 24b. If the checksums match at step 193, then the checksums of the next block are checked by returning to step 192. Otherwise, when the checksums do not match at step 193, the target block is flagged for repair at step 194. Next, at step 195, due to the data in the target block being found to be inconsistent, it is determined whether the protection threshold of the target stripe has been exceeded. That is, it is checked whether the data protection of the target stripe has been compromised, and cannot be recovered, due to the target blocks having data that has been affected by the node failure, which exceeds the protection level provided by the protection class.

If the data protection provided by the target stripe has not been compromised, then the processing flow in FIG. 21 returns to step 192 to process the next block in the stripe. Once all blocks have been checked at step 192, the processing flow moves to step 200 where it is checked whether the blocks need to be repaired. If repair is needed, then at step 201 the blocks flagged at step 194 are repaired using the parity blocks that were written to the extents. At step 201, the blocks within the extent group that matched the checksums/hashes in the journal entry at step 193 are used to repair the blocks which were flagged for repair at step 194 using the parity or erasure coding techniques associated with the protection class to which the extent group belongs and the available protection information.

After repairing the blocks at step 201 or when no repair is needed, the journal entry 25b is discarded, and it is checked whether any active, non-invalidated journal entries are remaining in the respective one of the journal segments (e.g., one of 23a or 23b) at step 190 for the extent group associated with the previous journal entry selected at step 191. When no more active journal entries are present at step 190 for the extent group associated with the previous journal entry selected at step 191 in the respective one of the journal segments, the data in the extent group is considered up to date and new write requests to the extent group can be processed by the nodes 1,2.

Otherwise at step 196, it is determined whether the journal entry itself needs to be repaired. If repair is needed, then at step 197 the journal entry is repaired Here, unmodified blocks from the extent group and the copies of the parity journal entry are used to repair the journal using the parity or erasure coding techniques associated with the protection class to which the extent group belongs. At step 198, the journal entry is checked to determine whether it is suitable to be used for recovery. If not, the target stripe for the selected journal entry is considered to be damaged at step 199, and an error is logged for the target stripe and the client is notified at step 204 before discarding the journal entry at step 205. However, if the journal entry is suitable for recovery of unmodified portions of the target stripe, then the data blocks which were attempted to be written to are zeroed out at step 202. By zeroing out the target data blocks, no data will be lost and makes it unnecessary to compute parity from the known garbage data that existed in the target data blocks. In other words, any data existing in the target data blocks was only important in the sense that balanced the unmodified parity calculations. Then, the parity blocks for the unmodified parts of the target stripe may be recovered from the parity blocks recorded in the repaired journal entry at step 203 and stored in the target stripe. After step 203, an error is logged for the target stripe and the client is notified at step 204 before discarding the journal entry at step 205. Once all journal entries have been processed as shown in FIG. 21, client requests are then accepted by the node as shown in step 185 at FIG. 20.

U.S. Application PCT/US14/51419, which is herein incorporated by reference, discloses a file system service, which is provided over a block storage service and is also provided with a highly-available, transaction-safe relational database to manage data storage. In some implementations, the block storage service 24C disclosed in PCT/US14/51419 is implemented as a client 3 as shown in FIG. 1 herein. Accordingly, the block service 15 as described herein is utilized to provide a protection class instance 20 as an underlying source of blocks for allocation by the block storage service 24C disclosed in PCT/US14/51419.

Figure 22:
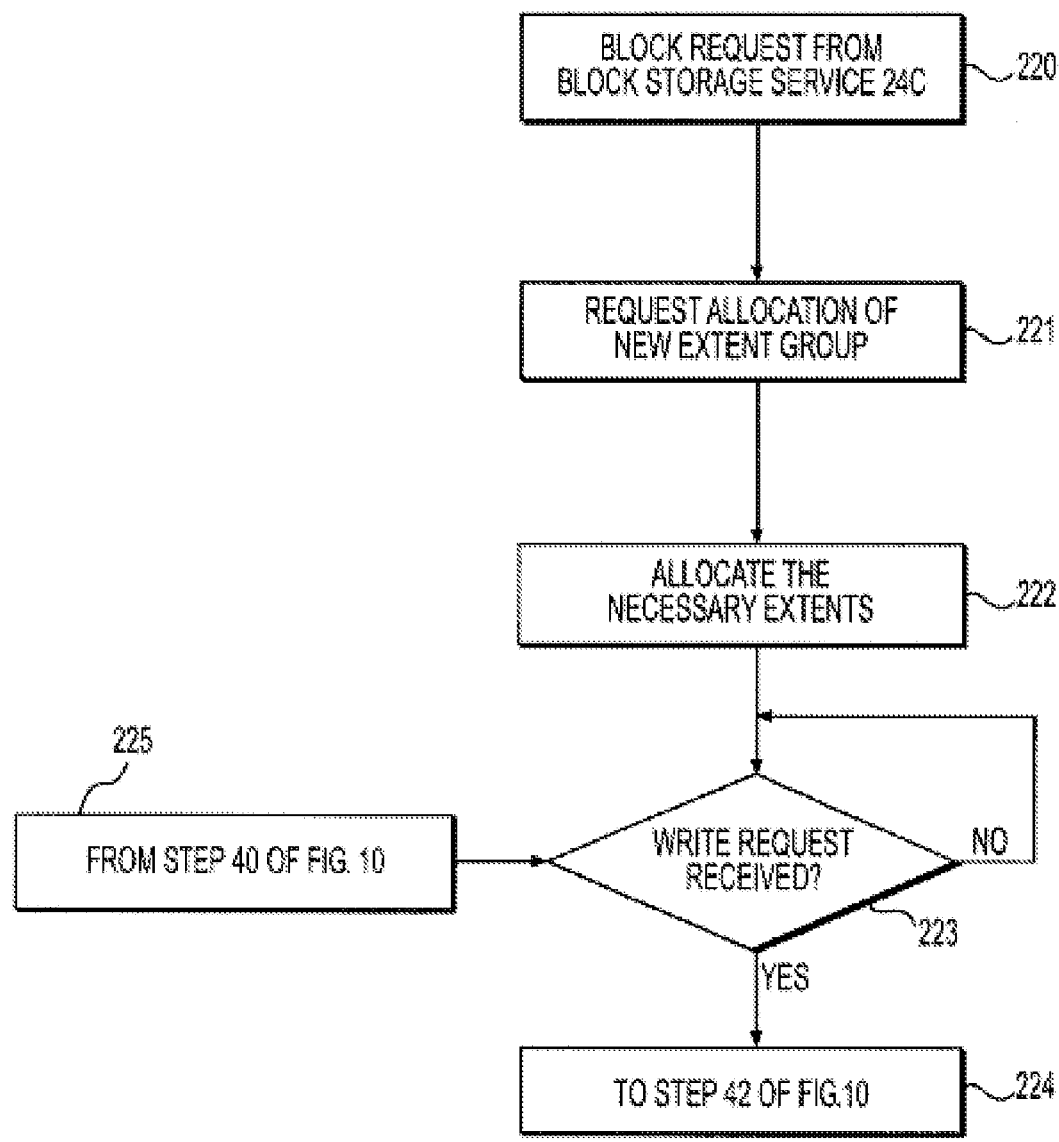
FIG. 22 is a processing flow for allocating block storage space from a protection class instance in accordance with an implementation where a block storage service is provided as a client.

As shown in FIG. 13 of PCT/US14/51419, blocks may be allocated and added to a free table managed by the block storage service 24C. In this example, a protection class 20 serves as the source of the blocks used for addition to the free table in FIG. 13 of PCT/US14/51419. FIG. 22 of the present application shows an implementation of a processing flow to allocate block storage space from a protection class instance, which is executed to provide the blocks at step 1304 of PCT/US14/51419.

At step 220, the block storage service 24C requests blocks from the protection class instance 20 provided by the block service 15. The block service 15 of the present application, in turn, requests a new extent group be allocated to the protection class, providing the block storage space to the block storage service 24C, by the extent manager 11b at step 221. Next at step 222, similar to step 44, an extent group that conforms to the requirements of the protection class is allocated thereto. Returning to FIG. 13 of PCT/US14/51419, the block storage service 24C adds the blocks provided by the newly allocated extent group at step 1305. The block storage service 24C may accordingly proceed to handle upper-level write requests as shown in FIG. 5 causing file data to be written to blocks provided by the underlying protection class.

As a result, as shown in FIG. 22, the block service 15 may receive one or more write requests to the block storage space of the underlying protection class as shown at step 223. The processing flow of FIG. 22 may continue at step 224 to step 41 of FIG. 10, which illustrates the write process. The write processing may continue as shown at steps 40 and 225 in FIGS. 10 and 22 until the upper-level write request from the block storage service 24C has completed.

Thus, in some examples, the block service 15 provides a protection class that is utilized by the block storage service 24C as a source of blocks available for allocation according to the disclosure of PCT/US14/51419. While block allocation and write processing are described in this example, the recovery processing and parity journaling described in the other examples above may also be incorporated into this example.

As mentioned above, in some implementations both object data and object metadata are stored on the thin-provisioned block service herein such that blocks for the storage of both data and metadata are dynamically provisioned from a shared storage pool. Consequently, an instance of the object store may automatically adapt to the size and number of objects being stored, and additional storage space for metadata may be allocated dynamically.

Additionally, some examples herein include techniques and arrangements for storing data on multiple trays. For instance, an allocation algorithm may be tray-aware, and may allocate extents to disks selected from multiple trays in a way that maximizes the chance that data remains recoverable in the presence of a failure in one or more trays.

Figure 23:
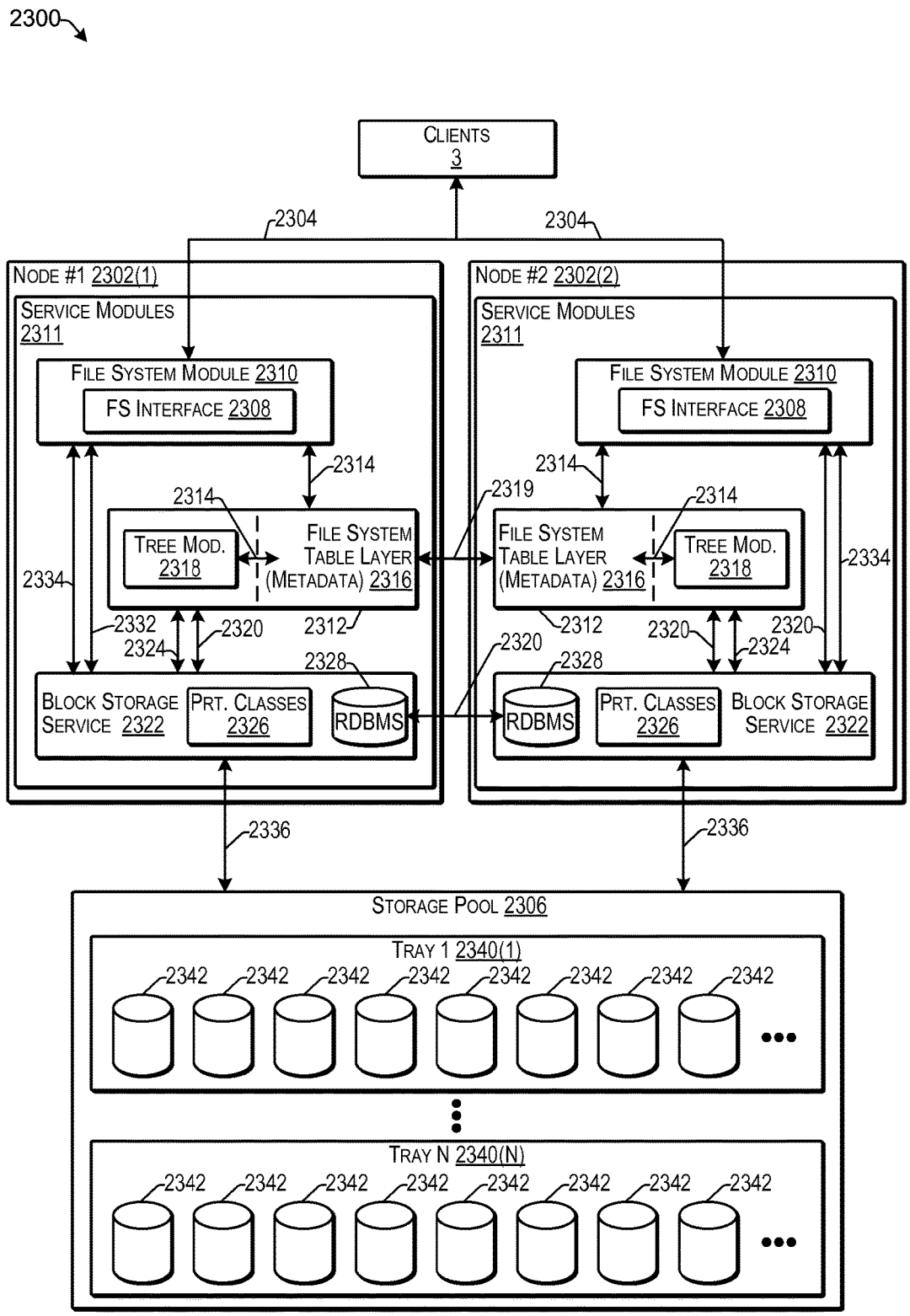
FIG. 23 illustrates an example system architecture according to some implementations.

FIG. 23 illustrates an example system 2300 able to store metadata on dynamically provisioned block storage and/or able allocate extents across multiple trays according to some implementations. The system 2300 includes a first node 2302(1) and a second node 2302(2), which may be the same as or similar to the first node 1 and second node 2, respectively, discussed above, e.g., with respect to FIGS. 1-22. Clients 3 direct file operation requests 2304 to the nodes 2302. As an example, the file operation requests 2304 may specify whole files stored in a storage pool 2306. In some examples, the storage pool 2306 may correspond to the storage pool 6 discussed above with respect to FIG. 1, and may include the databases D1A, D1B, D2A and D2B discussed above.

The file operation requests 2304 may be received by the nodes 2302 at a respective file system (FS) interface 2308 that may be provided by a file system module 2310 that is executed on each node 2302. The file system module 2310 may provide a file system including the FS interface 2308. Thus, the file system module 2310 is able to receive the file operation requests 2304 and send one or more communications in response to the received file operation requests 2304, depending on the type of file operation requests 2304 received. Further, the file system module 2310 may be one of a plurality of service module 2311 executed on the nodes 2302 for providing the various functionalities and services attributed to the nodes 2302 herein.

Each file system interface 2308 may further be able to communicate with a file system metadata service 2312. For example, the file system interface 2308 may send metadata communications 2314 to the file system metadata service 2312. The file system metadata service may include a file system table layer 2316 that may be managed by the file system module 2310, and a tree module 2318 that may create, manage, and enable interaction with a tree data structure used to store the metadata 2314. In some cases, the tree module 2318 may be one or more modules of the file system module 2310. In other cases, the tree module 2318 may be one more modules that are separate from the file system module 2310.

At any given point in time, one of the file system metadata services 2312 may be a lead while the other file system metadata service 2312 is not. Thus, if the file system metadata service 2312 on the second node 2302(2) is the lead, and a request to access metadata is received by the file system interface 2308 on the first node 2302(1), then as indicated at 2319, the file system metadata service 2312 on the first node 2302(1) passes the request to the file system metadata service 2312 on the second node 2302(2). The file system metadata service 2312 on the second node 2302(2) communicates with the tree module 2318 in response to the request. If the lead file system metadata service 2312 on one node fails then the other file system metadata service 2312 on the other node takes over as the lead.

As one example, the metadata communication 2314 may include metadata for storage in the tree data structure. As another example, the metadata communication 2314 may be a request for the location of data, or a request for other metadata information stored in the tree data structure. For example, the file system metadata service 2312 may receive the metadata communication 2314 at the file system table layer 2316, and may pass the metadata communication 2314 to the tree module 2318. For instance, if the metadata communication 2314 includes metadata for storage, the tree module 2318 may send a metadata tree communication 2320 to a block storage service 2322, such as a request to store the metadata. On the other hand, if the metadata communication 2314 is a request for information stored in the tree data structure, the tree module 2318 may send a data retrieval request as the metadata tree communication 2320 sent to the block storage service 2322.

The tree data structure may be stored in blocks of the allotted extents of a particular protection class 2326. As the tree data structure grows, additional extents may be added to the particular protection class. Since the tree is a data structure, the structure inherent in the tree allows the tree to know how the tree is mapped from the first block to the last block in the allotted block storage. The data transactions between tree module 2318 and the block storage service 2322 may further include communication of block allocation data 2324. For example, the block allocation data 2324 may include information regarding a particular protection class 2326 provided by the block storage service 2322.

Each block storage service 2322 may include, or may access, a relational database management service 2328 that manages a relational database that contains information indicating the storage usage, protection classes applied to various portions of the storage, and the like. The relational databases may be synchronously replicated via data path 2330 between the nodes 2302(1) and 2302(2).

Accordingly, the nodes 2302 store same relational database information in their respective system memories. The in-node relational databases managed by the RDBMS 2328 may also be synchronized with the respective relational databases D1A, D1B, D2A and D2B (not shown in FIG. 23) discussed above with respect to FIG. 1 stored in the storage pool 6. By maintaining synchronization with the relational databases D1A, D1B, D2A and D2B stored in the storage pool 2306, each node 2302 can access the relational database of the other node even if the other node has crashed or shutdown. For instance, mirroring or other data protection between D1A and D1B as well as D2A and D2B may provide redundancy for the relational database information, further protecting against storage device failure in the storage pool 2306.

The file system module 2310 may further communicate with the block storage service 2322 to send file or other object content 2332 and block allocation data 2334. The block storage service 2322 in turn communicates file content data and/or metadata to be stored in the storage pool 2306 via transactions 2336, which may be SAS/SCSI communications in some examples. The block storage service 2322 is configured to provide fixed-length storage areas referred to herein as "blocks". Each block represents a storage area to store file data in the shared storage pool 2306 and may be, for example, 4 KB in size. The block storage service 2322 allocates one or more blocks to the file system metadata service 2312 and/or to the file system 2310 as needed. Further, the various protection classes 2326 provide protection to the stored data to protect against drive failure and, as discussed below, tray failure. Accordingly, clients 3 are able to perform file-level transactions on data stored at the block-level in the storage pool 2306 via either of the nodes 2302(1) and/or 2302(2).

In addition, in this example, the storage pool 2306 includes a plurality of trays 2340(1)-2340(N). Each tray 2340 includes a plurality of storage devices 2342, which in some examples may be SAS drives or SATA (serial advanced technology attachment) drives with SAS adapters. Additionally, or alternatively, other types of storage devices may be used. As one example, the nodes 2302 may be redundantly connected for communication with the storage pool 2306, which may include between 3 and 16 storage trays 2340. For instance, the trays 2340 may include two independent SAS expanders (not shown in FIG. 23) for connection to the respective nodes 2302. The tray SAS expanders may provide signal pass-through between five interconnect ports that may be used to connect primary trays to secondary trays in each rack. For example, redundant inter-tray connections may be configured to prevent a secondary tray from being vulnerable to the failure of a single primary tray. Thus, connection redundancy between the nodes 2302 and the primary trays and between the primary trays and the secondary trays guarantees that the failure of a single node 2302, a single node SAS port, a single SAS cable, or a single tray SAS expander will only affect one of the nodes 2302. Access from outside the system 2300 to the data stored within is therefore not be impeded by any of these single failures.

Each tray 2340 holds a plurality of storage devices 2342, such as between 30 and 60 storage devices 2342 in some examples, although implementations herein are not limited to a particular number. As one example, each storage device 2342 may provide storage capacity for approximately 93,000 data extents, each able to store 64 MB. Of course, in other examples, storage devices 2342 having other storage capacities may be used. As discussed additionally below, data storage extents may be allocated across the plurality of trays 2340(1)-2340(N) to minimize the chance of data loss in the case of failure of a tray or a component of the tray.

Figure 24:
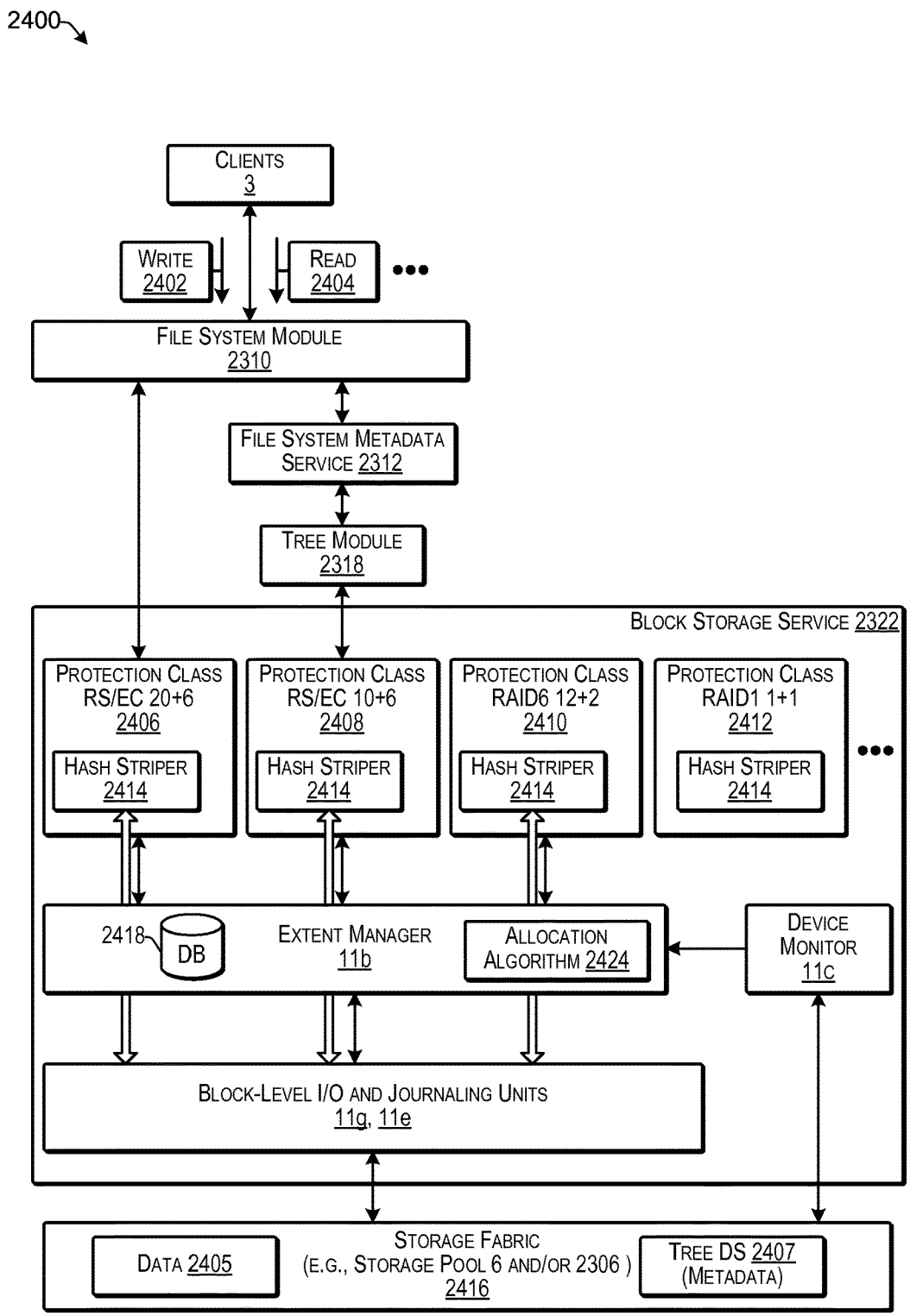
FIG. 24 illustrates an example logical configuration of a block storage service according to some implementations.

FIG. 24 illustrates an example logical configuration 2400 of the block storage service 2322 according to some implementations. The block storage service 2322 may support protected block storage by managing protection groups via arbitrary protection algorithms in a way that minimizes the vulnerability of each group to drive failure and tray failure. This example extends use of this architecture to also cover the storage of the file system data, or other object data, using a first type of protection class, and storing file system metadata, or other object metadata, using an independent second protection class instance. FIG. 24 is a logical diagram of the illustrative software environment showing data transaction paths between various components according to some implementations. As discussed above, the nodes 2302 and storage pool 2306 provide a block storage service to the clients 3. The block storage service 2322 may be accessible by any number of interfaces as discussed above with respect to FIG. 3.

In this example, the clients 3 may perform file operations, such as a write operation 2402, a read operation 2404, or other types of operations (not shown) such as a delete operation, a lookup operation, or the like. As discussed above with respect to FIG. 23, the file system module 2310 may receive the file operations and may communicate with the tree module 2318 and/or the block storage service 2322. For instance, in the case that the file system 2310 needs to save or access file system metadata, the file system module 2310 may communicate with the tree module 2318, such as via the file system metadata service 2312, as discussed above. The file system metadata service 2312 acts on behalf of the file system 2310 for storing the metadata through interaction with the tree module 2318. For instance, as mentioned above, the file system metadata may include information regarding the storage blocks at which each file or other object is stored, as well as other information about the file or other objects. The tree module 2318 may communicate with the block storage service 2322 to access the tree data structure. Alternatively, if the file system module 2310 needs to save or access file data, the file system module 2310 may communicate directly with the block storage service 2322. In some examples, the file system module 2310 may first obtain metadata about an object to determine a storage location of the object.

In the illustrated example, file system data or other object data 2405 is stored using an RS/EC 20+6 protection class 2406, while the file system metadata or other object metadata is stored as the tree data structure 2407 using an RS/EC 10+6 protection class 2408. Other protection classes illustrated in this example include a RAID 6 12+2 protection class 2410 and a RAID1 1+1 protection class 2412, although numerous other variations are possible. The protection class instances 2406-2412 are provided by the block storage service 2322. For example, protection classes 2406 and 2408 provide Reed-Solomon Erasure Coding (RS/EC) data protection. Protection class 2410 provides RAID6 data protection and protection class 2412 provides RAID1 data protection.

Each protection class 2406-2412 provides a specified level of data protection for the data stored therein and is denoted herein using the notation "A+B" where 'A' refers to the number of extents storing client-accessible data and 'B' refers to the number of extents storing protection data for the client accessible data within the extent groups of the protection class instance. Thus, in protection class instance 2406, RS/EC is implemented on extent groups having 20 extents of data and six extents of protection per extent group so that the six protection extents store protection data calculated according to RS/EC. Additionally, the protection class 2408 is similar, but has extent groups having 10 extents of data (i.e., file system metadata) and 6 protection extents storing RS/EC protection data. Similarly, in a RAID-based protection class, for each extent group thereof, the protection extents store parity data calculated from the corresponding data extents of the extent group. In still other implementations, mirroring or other error detection coding techniques may be used, separately or in combination with the above protection techniques, to provide data protection. While protection information, protection data, parity information, and parity data may be the terms used herein to describe the stored content on the protection extents, the particular algorithms used to calculate the protection information are administratively set for each protection class.

Each protection class 2406-2412 provides an addressable block storage space for storing data that has a predefined level of data protection from the extents that are allocated thereto. The addressable block storage space may be unique or otherwise individually distinguishable with respect to other addressable block storage spaces of other protections classes. In this configuration, each protection class may be accessible as a logical unit having a unique, or otherwise distinct, block address space thereon and can be identified, for instance, by a logical unit number (LUN) when reading and writing thereto. A storage fabric 2416 used for the block storage may include the storage pool 2306 discussed above with respect to FIG. 23 and/or the storage pool 6 discussed above with respect to FIG. 1.

Each of the protection class instances 2406-2412 is provided with a hasher/striper service 2414 executed by the hasher/striper unit 11*d* discussed above with respect to FIG. 2. The extent manager 11*b* serves as an intermediary between the protection classes and block-level I/O and journaling units 11*e*, 11*g*. Further, the extent manager 11*b* utilizes the extent management information in a relational extent information database DB 2418. In some examples, the DB 2418 may be stored on storage devices in the storage fabric 2416 and may correspond to the extent information database 11*f* and/or D1A, D1B, D2A and/or D2B, which may be managed by the RDBMS 2328 discussed above. For example, information in the DB 2418 may be used to manage extents and extent groups, as well as for the creation and allocation of extent groups. In other words, the storage fabric 2416 provides quick access to the extent information database 2418, which aggregates the data present in the superblocks 22 of the storage devices 7, 2342. The block-level I/O and journaling units 11*g*, 11*e* communicate with the physical storage devices of the storage pool 6 or 2306 to store the data of the protection classes 2406-2412 therein as discussed above. Additionally, the device monitor 11*c* is provided to monitor the status of the storage devices in the pool 6 or 2306 to determine if any of the devices in the storage pool 6, 2306 have failed. In addition, a heartbeat monitoring function may also be provided separately in the system memory or included in the device monitor 11*c* to determine when a failure has occurred in one or more other nodes.

In some examples, the RS/EC 20+6 extents groups for data and the RS/EC 10+6 extent groups for metadata are dynamically allocated from among the drives in the various trays of the storage pool 2306. For RS/EC 20+6, one extent is allocated from among 26 unique disks. For RS/EC 10+6, one extent is allocated from among 16 unique disks. The software context for both features includes the base storage architecture which extent-maps the space available on each drive, supports protected block storage by managing protection groups via arbitrary protection algorithms to minimize the vulnerability of each group to drive failures.

In some cases, the tree module 2318 may be configured to generate and manage a log-structured merge (LSM) tree data structure storing key-value pairs. A table abstraction layer of in-core data objects within the file system may serve as a client of the tree module 2318, which uses the block thin-provisioned RS/EC 10+6 protection class instance to store and manage the tree data structure 2407. As mentioned above, in some examples, the tree data structure 2407 may be an LSM tree. The LSM tree, like other search trees, may maintain key-value pairs. Further, the LSM tree may maintain data in two or more separate structures, each of which may be optimized for its respective underlying storage medium. For example, newer portions of the tree may be maintained in the memory of the node, and subsequently merged to the tree data structure 2407. Data may be synchronized between the two structures efficiently, such as in batches. Thus, the use of the LSM tree may result in data being written to the block storage less frequently and in larger chunks than would be the case if some more traditional data structures, such as B-trees, were to be used. For example, HDDs are more efficient when used for writing a few large updates, rather than many small updates.

The LSM tree provides key-value pair semantics, and relational database semantics may be layered on top of the key-value pair semantics for storing the metadata. For instance, a relational database views data in tables. As an example, a first column in a table may correspond to files and other columns in the table may correspond to attributes of the respective files. Thus, each row may represent a particular file and the attributes for that file. Relational databases use indexes to allow rows to be looked up quickly from column values. The indexes may be implemented as key-value lookups, and the index information may be stored in the LSM tree according to some examples herein. Further, modifying the indexes may be performed with concurrent writes using ACID compliant techniques. ACID (Atomicity, Consistency, Isolation, Durability) is a set of properties that guarantee that database transactions are processed reliably. As an example, snapshot isolation and read-write locks may be used to keep the database ACID compliant. For instance, snapshot isolation may guarantee that all reads made in a transaction will see a consistent snapshot of the database, and the transaction itself may successfully commit only if no updates it has made conflict with any concurrent updates made since the snapshot was taken.

In the implementations herein, both object data 2405 and object metadata 2407 are stored on a uniform thin-provisioned block service where blocks for the storage of both the data 2405 and the metadata 2407 are dynamically provisioned from the shared pool 6, 2306. Thus, no decisions need be made in advance about the required relative sizes of the data and the metadata. The metadata storage automatically adapts to the size and number of objects being stored in the object storage. Pre-allocation of storage for object metadata is no longer required, and storage may not be allocated until there is an actual demand for additional storage capacity. Consequently, underprovisioning and/or overprovisioning of pre-allocated metadata storage space is no longer an issue. For instance, the storage may be used to hold a large number of small files that subsequently may be deleted and replaced with a small number of very large files without a metadata overprovisioning penalty. Similarly, the storage may be used to hold a small number of very large files that subsequently may be deleted and replaced with a large number of small files without a metadata underprovisioning penalty.

Figure 25:
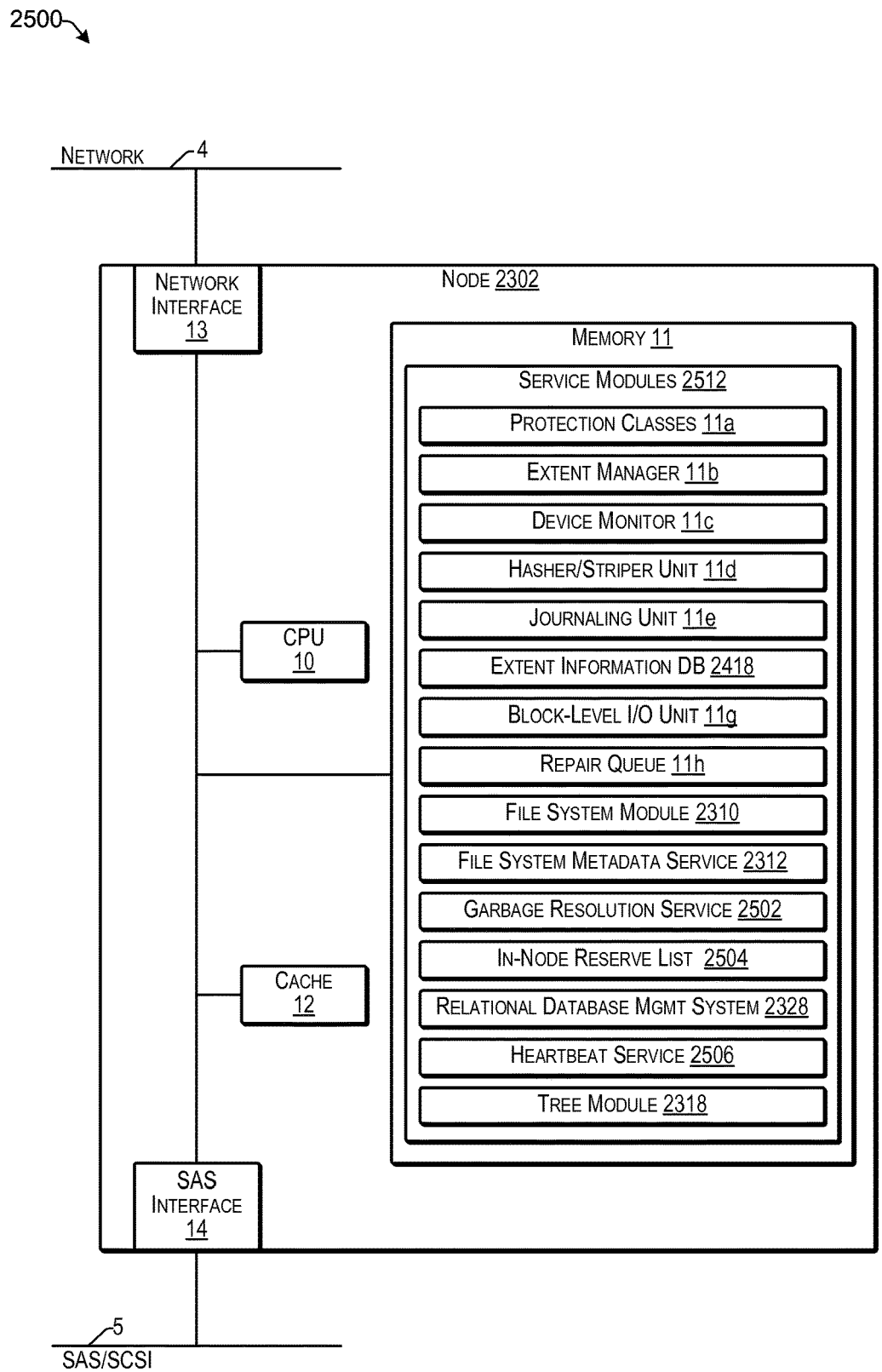
FIG. 25 illustrates a block diagram of a hardware and software configuration of a node according to some implementations.

FIG. 25 illustrates a block diagram of a hardware and software configuration 2500 of one of the nodes 2302 illustrated in FIG. 23 according to some implementations. Each of the nodes 2302 may be configured similarly or identically. As illustrated in FIG. 25, the node 2302 may be connected to the network 4 via the network interface 13 and may be connected to the storage pool via an SAS interface 14 and SAS/SCSI connection 5. Additionally, or alternatively, other protocols may be implemented at the interface 14. Further, the node 2302 is provided with the central processing unit (CPU) 10 that includes one or more processors, the system memory 11 and the cache 12, as discussed above with respect to FIG. 2.

The system memory 11 includes executable instructions which are executable by the CPU 10 to provide the protection class management information 11*a*, the extent manager 11*b*, the hasher/striper unit 11*d*, the journaling unit 11*e*, the extent information database 2418, the block-level I/O unit 11*g*, and the repair queue 11*h*, as discussed above. In addition, the system memory 11 may further store the file system module 2310, which may provide at least a portion of a file system, the file system metadata service 2312, which in some examples may be a module of the file system module 2310, a garbage resolution service 2502, an in-node reserve list 2504, the relational database management system 2328, a heartbeat service 2506, and the tree module 2318. Each of the services in the system memory 24 may be provided by one or more software programs executed by the CPU 22.

In some examples, the nodes 2302 may include more than one file system which may be generated by the file system module 2310, or one or more additional file system modules (not shown). Each file system may be accessible by the clients 14 as a distributed file system through either of the nodes 2302(1), 2302(2), or other nodes 2302. The file system metadata service 2312 manages the metadata of each file stored in the file system. For instance, the file metadata for file data stored in the file systems may be managed by the file system metadata service 2310 and the tree module 2318. Example metadata information includes user information, path information, access control information, and file hash information. The garbage resolution service 2502 determines when to delete objects from the storage. The in-node reserve list 2504 is a table of data blocks currently reserved by the respective node. The in-node reserve list 2504 may be stored in the system memory 11, as shown in FIG. 25, or may alternatively be located in the cache 23 of each node 2302. The data in the in-node reserve list 2504 corresponds to the most current list of reserved blocks for the respective node 2302. Accordingly, the in-node reserve list 2504 may be periodically synchronized with the extent information DB 2418 stored in the storage devices for each node, and in some cases, in the memory 11. Additionally, the heartbeat service 2506 operates on each node 2302. The heartbeat service 2506 handles periodic notifications between nodes 2302 so that each node 2302 can detect when the other of the nodes 2302 has crashed using a so-called "heartbeat". As one of skill in the art will appreciate there are many techniques known in the art that are suitable for determining when a respective node has crashed by the other of the nodes. The heartbeat service 2506 may not only detect crashes but may also proactively provide a notification that the respective node has performed a clean shutdown.

Figure 26:
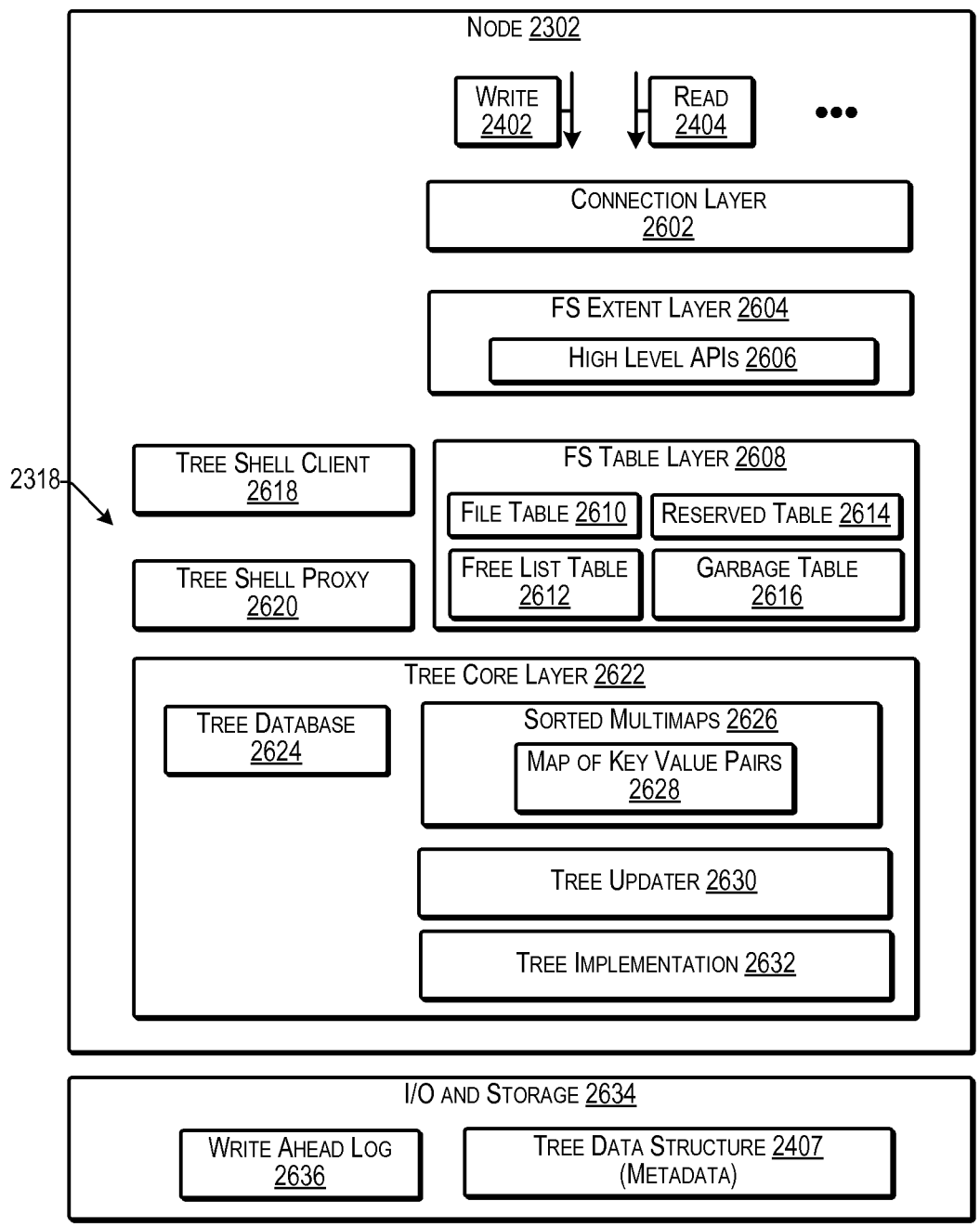
FIG. 26 illustrates an example logical configuration of a node according to some implementations.

FIG. 26 illustrates an example logical configuration of the node 2302 according to some implementations. For example, the node 2302 may receive, at a connection layer 2602, the file system operations from the clients, such as the write operation 2602, the read operation 2404, or the like. A file system extent layer 2604 may include one or more high level application programming interfaces (APIs) 2606 that may be used for communication with the clients.

Further, a file system table layer 2608 may include a plurality of tables that may be used for tracking the storage usage. The file system table layer 2608 may be used to interface the table-centric portions of the file system the tree data structure key-value implementation discussed additionally below. Example tables associated with the file system table layer 2608 include a file table 2610, a free list table 2612, a reserved table 2614, and a garbage table 2616.

The file table 2610 may include a list that identifies files stored in the storage pool. In addition, the free list table 2612 may include a list of blocks that are identified by block number and that have been allocated from the block storage service. Blocks listed in the free list table 2612 are not currently allocated to any file and are not currently involved in write processing. Furthermore, the reserved table 2614 includes a list of blocks identified by block number that have been reserved for use in servicing client writes from the free list table 2612 by the nodes 2302. In addition, the garbage table 2616 includes a list of blocks that are subject to recycling by the garbage resolution service. The table layer may tables may be in-core data objects within the file system. This table abstraction layer is a client of the tree module, which uses a block storage thin-provisioned protection class instance to store and manage the tree data structure 2407.

In addition, the tree module may include or may manage a tree shell client 2618, a tree shell proxy 2620, and a tree core layer 2622. For example, the tree shell client 2618 may be used by a user to interact with the metadata, e.g., send write or read requests. The tree shell proxy may serve as a proxy interface between the tree shell client and the tree core layer 2622. The tree core layer 2622 may include a tree database 2624 that is derived at least in part from the file system table layer 2608. Furthermore, the tree core layer 2622 may include sorted multimaps 2626, such as a map of key-value pairs 2628. Furthermore, the tree core layer may include one or more tree updaters 2630, and the tree implementation 2632, which may define the tree structure during generation of the tree data structure 2407.

Furthermore, an input output and storage layer 2634 may include the tree data structure 2407 for storing the metadata. In addition, in some examples, the I/O and storage layer 2634 may include a write ahead log 2636 that may be used to preserve metadata that is to be written to the tree data structure, such as in the case of failure before the metadata is written.

Figure 27:
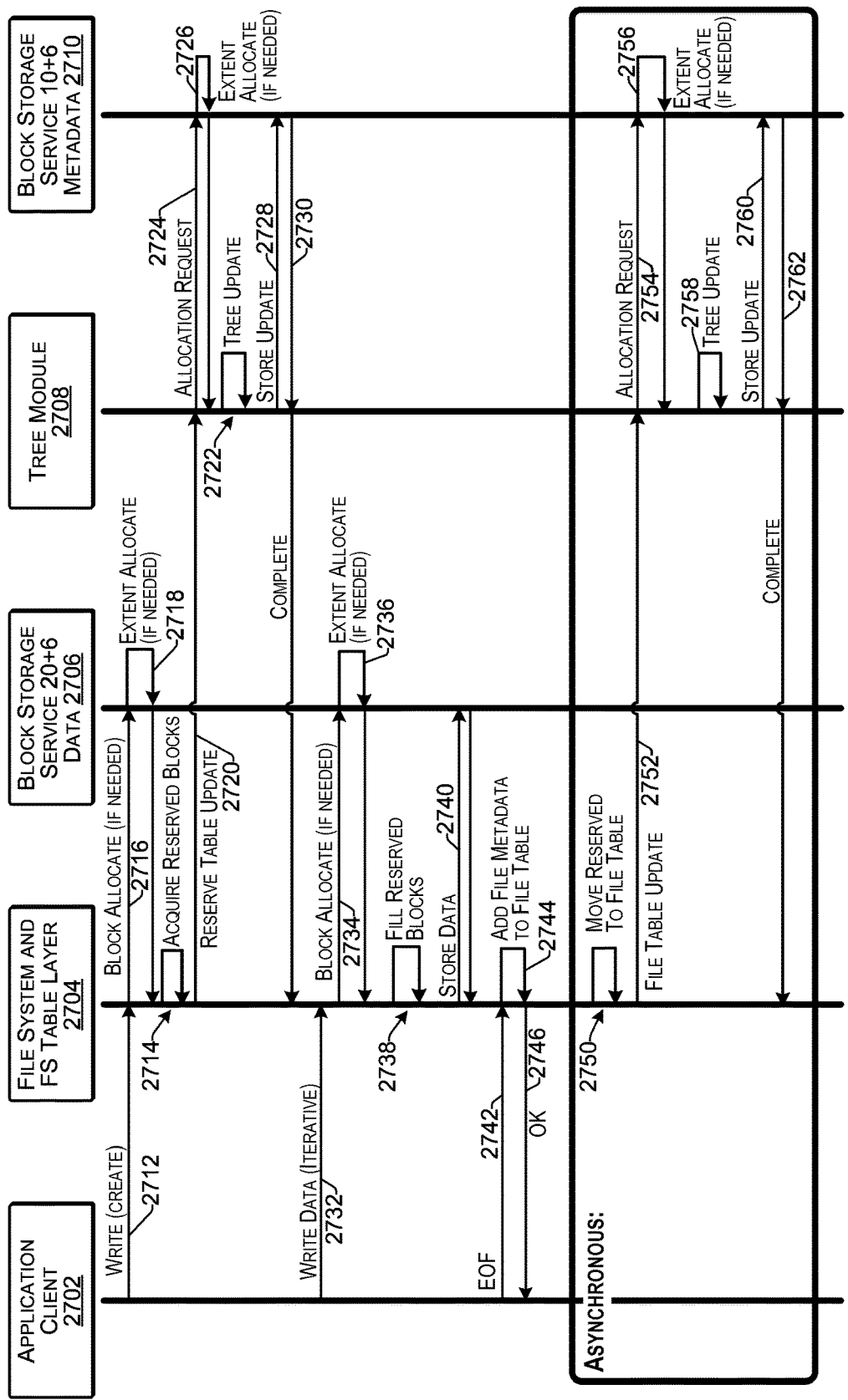
FIG. 27 illustrates an example write flow according to some implementations.

FIG. 27 illustrates a write flow 2700 according to some implementations. Participants in the write flow 2700 may include an application client 2702, the file system and file system table layer 2704, block storage service 2706 for storing data, such as in the 20+6 protection class, tree module 2708, and block storage service 2710 for storing metadata, such as in the 10+6 protection class. At 2712, the write operation includes an initial request to create a file sent by the client application 2702 to the file system 2704. At 2714, the file system may attempt to reserve blocks for the file at the file system table layer, such as by using the free list table and the reserved table discussed above with respect to FIG. 26.

At 2716, if insufficient blocks are available in the free list table, the file system 2704 may send a block allocation request through the RS/EC 20+6 protection class instance to the block storage service 2706. At 2718, the block storage service 2706 may allocate extents in response to the file system request and, subsequently, the file system may acquire the reserved blocks as indicated at 2714. At 2720, the file system updates the reserved table to identify the blocks being reserved for the incoming file. At 2722, the tree module 2708 receives the reserve table update as metadata indicating the location of the file being written and updates the tree data structure with the received block information. At 2724, if there are insufficient available blocks in the 10+6 storage protection class to perform the tree update, the tree module may send an allocation request to the block storage service 2710. In response, at 2726, the block storage service 2710 allocate extents in the template 6 protection class and the tree module performs the tree update, and at 2728, stores the tree update to the block storage service 2710. At 2730, the block storage 2710 provides a completion indication to the tree module 2708, which sends a completion indication to the file system 2704.

At 2732, the client data may be written into the reserved blocks. At 2734, the file system request additional blocks from the block storage if needed and at 2736 the additional extents are allocated if needed. At 2738, the file system fills the reserve blocks and stores the data at 2740 stores the data to the block storage service 2706.

At 2742, after the end the file has been reached, then all of the data for the file has been received. At 2744, the entries in the reserved table are marked for movement to the file table as metadata, and at 2746, the write is acknowledged to the client 2702.

In addition, an asynchronous thread may move the completed reserve table entries to the file table and may dispatch a request to update the tree data structure. Accordingly, at 2750, the file system may move reserved table entries to the file table. At 2752, the file system may send a file table update request to the tree module 2708. In some examples, as indicated at 2754, this may trigger an allocation request from the tree module to the to the RS/EC 10+6 protection class block storage service 2710 to provide space for the tree-encoded table entries. At 2756, the block storage service 2710 may allocate additional extents if needed. At 2758, the tree module updates the tree data structure and at 2760 stores the update to the block storage service 2710. At 2762, the storage completion is reported to the tree module 2708, which reports the completion to the file system 2704.

Figure 28:
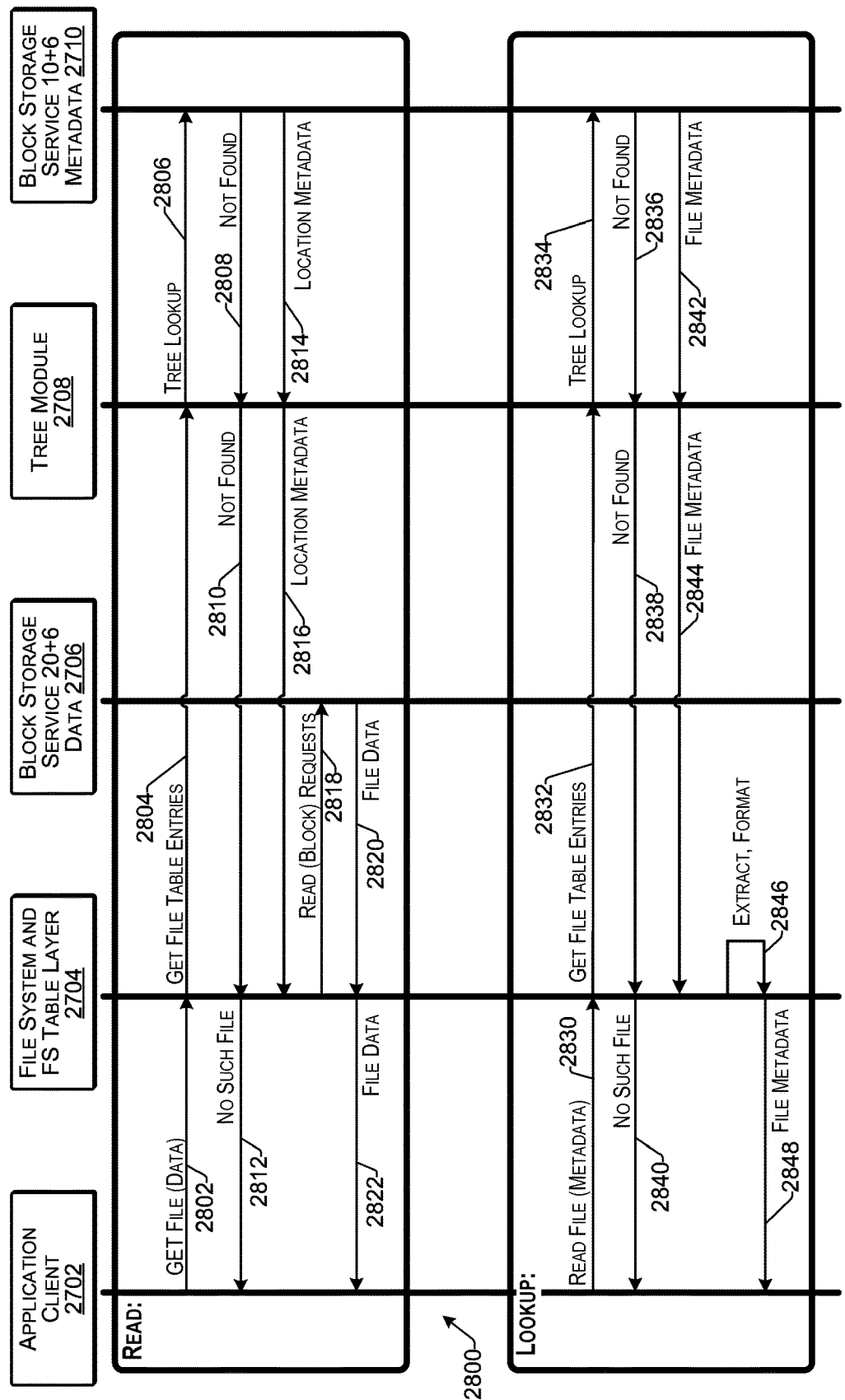
FIG. 28 illustrates an example read flow and an example lookup flow according to some implementations.

FIG. 28 illustrates a read flow 2800 and a lookup flow 2801 according to some implementations. For example, the read request may be to obtain file data, whereas the lookup request may be for obtaining metadata itself. No extent allocation requests are performed during the read and lookup flows.

At 2802, the file system 2704 may receive a get file request from the application client 2702. At 2804, the file system 2704 requests the tree module 2708 to get the file table entries corresponding to the requested file. At 2806, the tree module 2708 performs a tree look up to determine the file table entries corresponding to the file. At 2808, if the requested metadata is not found, the block storage service 2710 may return a "not found" indicator to the tree module 2708. At 2810, the tree module 2708 may send a "not found" indicator to the file system 2704, and at 2812, the file system 2704 may send a "no such file" indicator to the application client 2702.

On the other hand, if the location metadata for the file is found in the tree during the tree look up, then at 2814 the location metadata is returned to the tree module 2708 from the block storage 2710. At 2816, the tree module sends the location metadata to the file system 2704. At 2818, the file system 2704 uses the location metadata to read the file data from the block storage 2706 as one or more read block requests. At 2820, the block storage 2706 returns the file data to the file system 2704. At 2822, the file system 2704 sends the retrieved file data to the application client 2702.

For the metadata lookup request, at 2830, the file system receives, from the application client 2702, a read file metadata request. At 2832, the file system 2704 sends a get file table entries request to the tree module 2708. At 2834, the tree module 2708 performs a tree look up for the requested file table entries. At 2036, if the requested metadata is not found the block storage service 2710 returns a "not found" indicator to the tree module 2708. At 2838, the tree module 2708 returns a "not found" indicator to the file system 2704. At 2840, the file system sends a "no such file" communication to the application client 2702.

On the other hand, at 2842, if the file metadata is located by the tree lookup, the block storage service 2710 returns the file metadata to the tree module 2708. At 2844, the tree module 2708 returns the file metadata to the file system 2704. At 2846, the file system extracts and/or formats the retrieved file metadata. At 2848, the file system sends the retrieved file metadata to the application client 2702.

Figure 29:
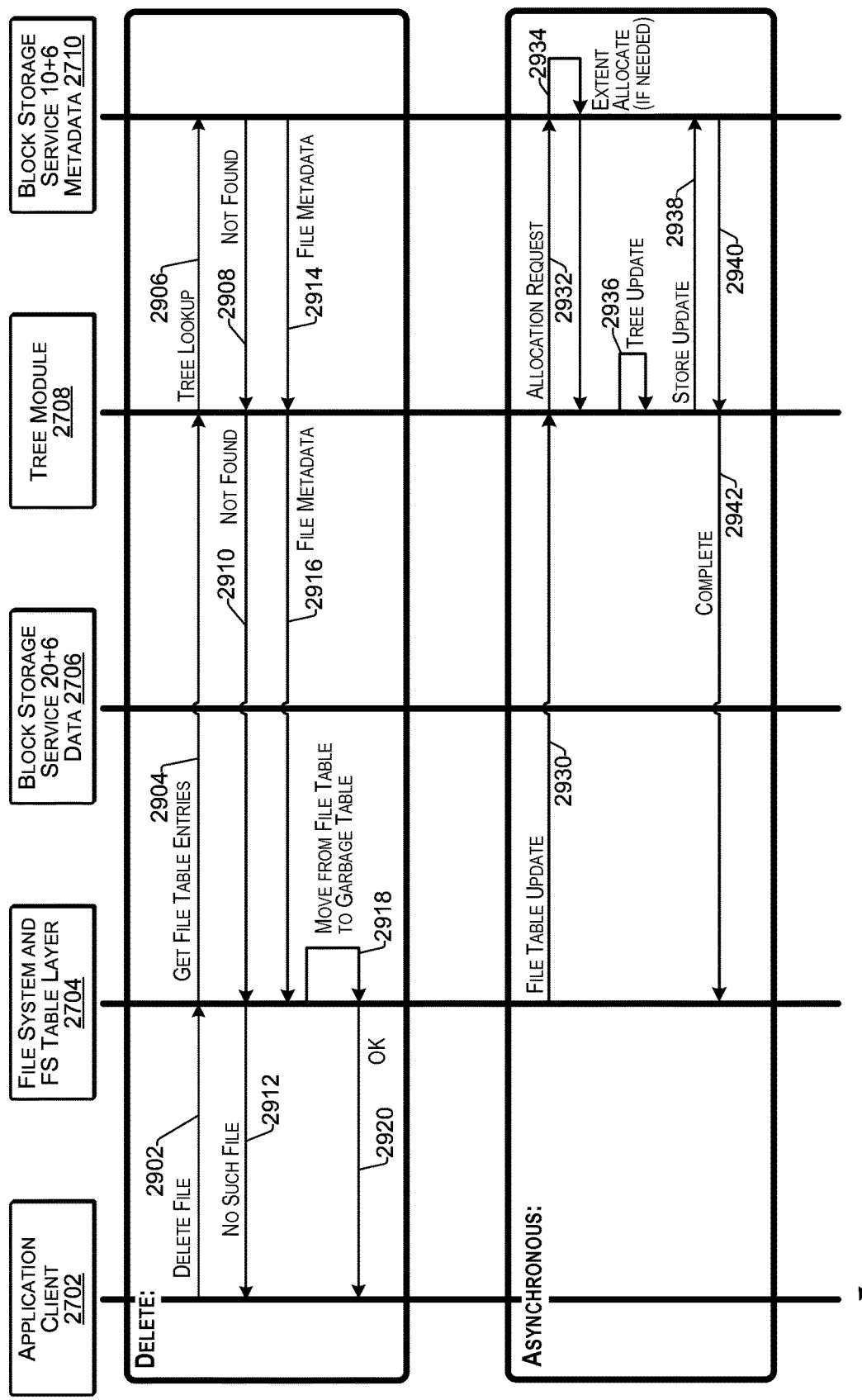
FIG. 29 illustrates a delete flow according to some implementations.

FIG. 29 illustrates a delete flow 2900 according to some implementations. For example, the delete request may be to delete file data from the 20+6 block storage. During the delete, metadata in the tree data structure is may be modified asynchronously to reflect movement of file system metadata entries from the file table to the garbage table.

At 2002, the application client 2702 may send a delete file request to the file system 2704. At 2904, the file system may send a get file table entry request to the tree module 2708. At 2906, the tree module 2708 may perform a tree lookup to the block storage 2710. At 2908, if the requested metadata cannot be found in the tree data structure, a "not found" indicator is returned to the tree module 2708. At 2910, the tree module 2708 returns a "not found" indicator to the file system 2704. At 2912, the file system sends an indication to the application client 2702 that there is no such file.

On the other hand, if the tree lookup results in the requested metadata being found, at 2914, the file metadata is returned from the block storage 2710 to the tree module 2708. At 2916, tree module returns the file metadata to the file system 2704. At 2918, the file system moves the file information from the file table to the garbage table. At 2920, the file system sends an indication to the application client that the deletion has been performed.

In addition, the file table may be updated asynchronously from the deletion flow. Accordingly, at 2930, the file system may send a file table update to the tree module 2708. At 2932, if additional space is needed for the tree data structure, the tree module 2708 may send an allocation request to the block storage service 2710. At 2934, the block storage service may allocate additional extents for the tree data structure. At 2936, the tree module may perform a tree update to update the file table information in the tree data structure. At 2938, the tree module may store the tree update to the block storage service 2710. At 2940, the block storage 2710 may indicate to the tree module 2708 that the update is complete. At 2942, the tree module 2708 may indicate to the file system 2704 that the update is complete.

Figure 30:
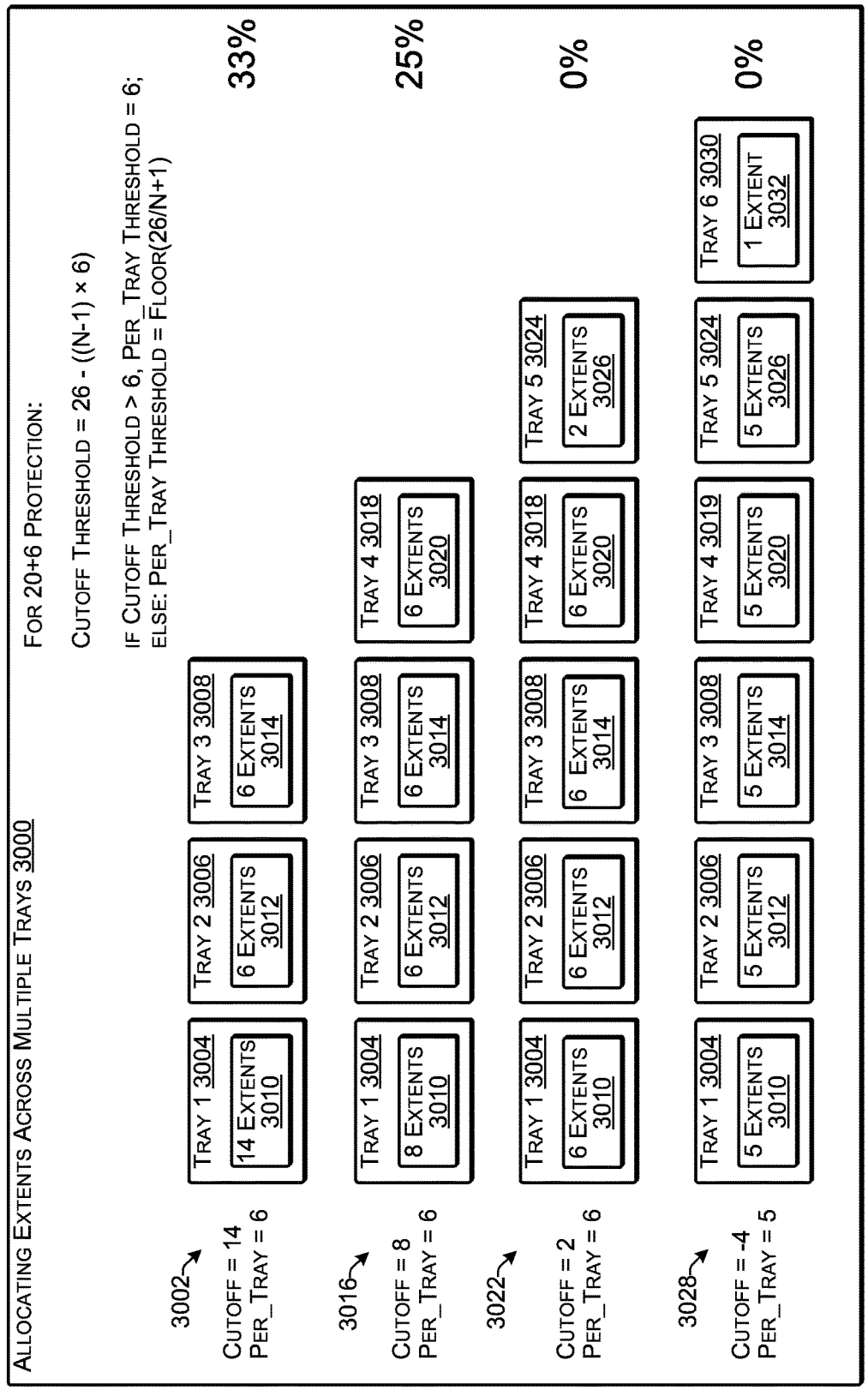
FIG. 30 illustrates an example of tray aware distribution of extents over a plurality of trays according to some implementations.

FIG. 30 illustrates an example 3000 of tray aware distribution of extents over a plurality of trays according to some implementations. Trays may fail for any of a various reasons, such as bad cable, bad SAS expander at the tray, failed power supply, operator error, and so forth. Accordingly, implementations herein may attempt to limit the possibility of data loss or data unavailability by storing data and metadata across multiple trays in a protected manner. For example, as discussed above, such as with respect to FIG. 23, the extent manager 11b may create extents and may take into consideration the number of extents already created on the tray as well as extents created on the individual drives. Further, in some examples, each tray may have its own address (e.g., based on a SAS expander) in the storage fabric so that the extent manager 11b is able to distinguish individual trays from each other, and further distinguish individual drives inside each tray. In addition FIG. 30 illustrates several examples of allocating extents across multiple trays to provide an illustration of how data protection is improved according to some implementations herein. As discussed above, e.g., with respect to FIG. 7, a 20+6 RS/EC protection class may include 20 data extents allocated across 20 drives and 6 coding protection extents allocated across six additional drives for a total of 26 extents allocated across 26 different drives. If these drives are all located on the same tray however, and that tray fails, then the data will become unavailable. In some examples, the extent manager 11b is configured to allocate extents to the drives on the several trays so that new allocations are made to the most sparsely populated disks on the most sparsely populated trays. Furthermore, in some examples, a cutoff may be determined such that distributing additional extents across the multiple trays is counterproductive to maintaining data protection. FIG. 30 illustrates one example of extent allocations for a 20+6 RS/EC protection class when applied to varying numbers of trays.

In the example of FIG. 30, as indicated at 3002, suppose that for a 20+6 protection group, 26 extents are to be distributed across 3 trays, i.e., a first tray 300, a second tray 3006, and a third tray 3008. A naïve distribution may attempt to distribute the extents as evenly as possible among the three trays 3004-3008, such as, for example, distributing nine extents on two of the trays and eight extents on the third tray. Consequently, if any of the trays failed, there would only be 17 or 18 available extents remaining, whereas a 20+6 protection group needs at least 20 extents to remain active for data to be available and/or recovered. Accordingly, a cutoff threshold and a per_tray threshold may be determined for each different number of trays and for each different data protection class to maximize the odds of data remaining available.

As one example, the cutoff threshold is used to determine whether there are enough trays available to allocate fewer than c extents per tray. This causes the extent manager to allocate extents to trays such that the failure of a tray would leave more than d extents available. So long as d extents are available, service may continue uninterrupted and any lost data may be recovered using the protection extents. However, if there are not enough trays for each tray to get fewer than c extents, the number of trays that would cause data unavailability may be minimized by placing exactly c extents on all but the most lightly loaded tray. The most lightly loaded tray gets the cutoff threshold number of extents. This technique provides a data unavailability probability of 1/t with t trays. Some examples also minimize the number of extents that are relocated to maintain optimal layout when trays are added to the system.

According to some examples, the cutoff threshold may be determined as follows:

$$\text{cutoff threshold} = (d+c) - ((N-1) \times c) \qquad \text{EQ(1)}$$

where d represents to the number of extents storing client-accessible data, c represents the number of extents storing code protection, and N represents the number of trays. In addition, some examples may include determining an extent per tray threshold, which may be determined as follows:

$$\text{if cutoff threshold} > c, \text{ then per\_tray threshold} = c; \text{ else:}$$
$$\text{per\_tray threshold} = \text{floor}[((d+c)/N) + 1] \qquad \text{EQ(2)}$$

where d refers to the number of extents storing client-accessible data, c represents the number of extents storing code protection, and N represents the number of trays. For the floor, the calculated number is rounded down to the closest integer.

Applying this technique to the example of FIG. 30, at 3002, the cutoff threshold is calculated be 14 and the per_tray threshold is calculated to be 6. Consequently, as shown at 3002, the first tray 3004 is allotted 14 extents 3010, i.e., the cutoff threshold; the second tray 3006 is allotted six extents 3012, i.e., the per_tray threshold; and the third tray 3008 is also allotted six extents 3014, i.e., the per_tray threshold. The 26 extents are distributed across three trays as 14, 6, 6. If the first tray 3004 is lost, then the data becomes unavailable. However, if the second tray 3006 or the third tray 3008 is lost, then the lost data can be recovered from trays 1 and 2. Accordingly, with the configuration of three trays, as illustrated at 3002, there is a 33 percent chance of losing data, assuming that there is an equal chance of each of the trays 3004-3008 failing.

As another example, as indicated at 3016, suppose that a fourth tray 3018 is added to the three trays of the example discussed above. Furthermore, another consideration for maintaining efficiency is to minimize the movement of data when adding a new tray to an existing set of trays. Accordingly, based on the equations discussed above when a fourth tray is added, the cutoff threshold is equal to 8, and the per_tray threshold remains equal to 6. Consequently, six extents may be redistributed from the first tray 3004 to the fourth tray 3018 to provide six extents 3020 in the tray 3018. Thus, the 26 extents are distributed across four trays as 8, 6, 6, 6. Therefore, there is a 25 percent chance of losing data, i.e., if the first tray 3004 fails, then there is an insufficient number of remaining extents to recover the data. On the other hand, if any of the second through fourth trays fail, there is a sufficient number of extents remaining in the other three trays to recover the data.

As another example, as indicated at 3022, suppose a fifth tray 3024 tray is added to the group of trays. In this example, the cutoff threshold becomes equal to two while the per_tray threshold remains equal to six. Consequently, two extents 3026 are moved from the first tray 3004 to the fifth tray 3024. The 26 extents are distributed across five trays as 6, 6, 6, 6, 2. Accordingly, if one tray fails, the system can still fully recover all the lost data. Therefore, the chance of losing data from a single tray failure is zero.

As still another example, as indicated at 3028, suppose that a sixth tray 3030 is added to the group of trays. Accordingly, the cutoff threshold becomes equal to −4 and the per_tray threshold falls from 6 to 5. Consequently, the extents may be redistributed from the first four trays to the fifth tray 3024 and the sixth tray 3030. Accordingly, the 26 extents are distributed across the six trays as 5, 5, 5, 5, 5, 1. In this configuration, if one tray is lost, there is a zero percent chance of data becoming unavailable. Furthermore, if the sixth tray 3030 fails and one of the other trays 3004, 3006, 3008, 3019, or 3024 also fails, the four remaining trays will still be able to recover all the data since the number of remaining extents is greater than or equal to d.

As demonstrated above, the algorithms herein are automatically adjusted for different protection class instances. Additionally, as long as at least one tray remains available, the system may continue to accept write requests, and may provision new extents on the remaining tray. Prolonged absence of any tray may trigger the re-allocation of the absent tray's extent groups to the remaining active trays and the subsequent repair of missing data or parity bits. Accordingly, some examples herein augment thin provisioned extent-based storage with multiple protection classes and by allowing extents to be allocated across multiple storage trays. This may be done to expand storage and to mitigate the effects of tray failure. Further, to better mitigate the effects of tray failure, the allocation of extents to the several drives takes account of the locations of the drives within trays to assure the maximum RS/EC data recovery in the event of the failure of one or more trays. In addition, some examples provide a way to account for trays when allocating extents to storage devices, optimizing for recovery in each allocation based on the protection scheme supported by the protection class instance requesting the allocation.

Figure 31:
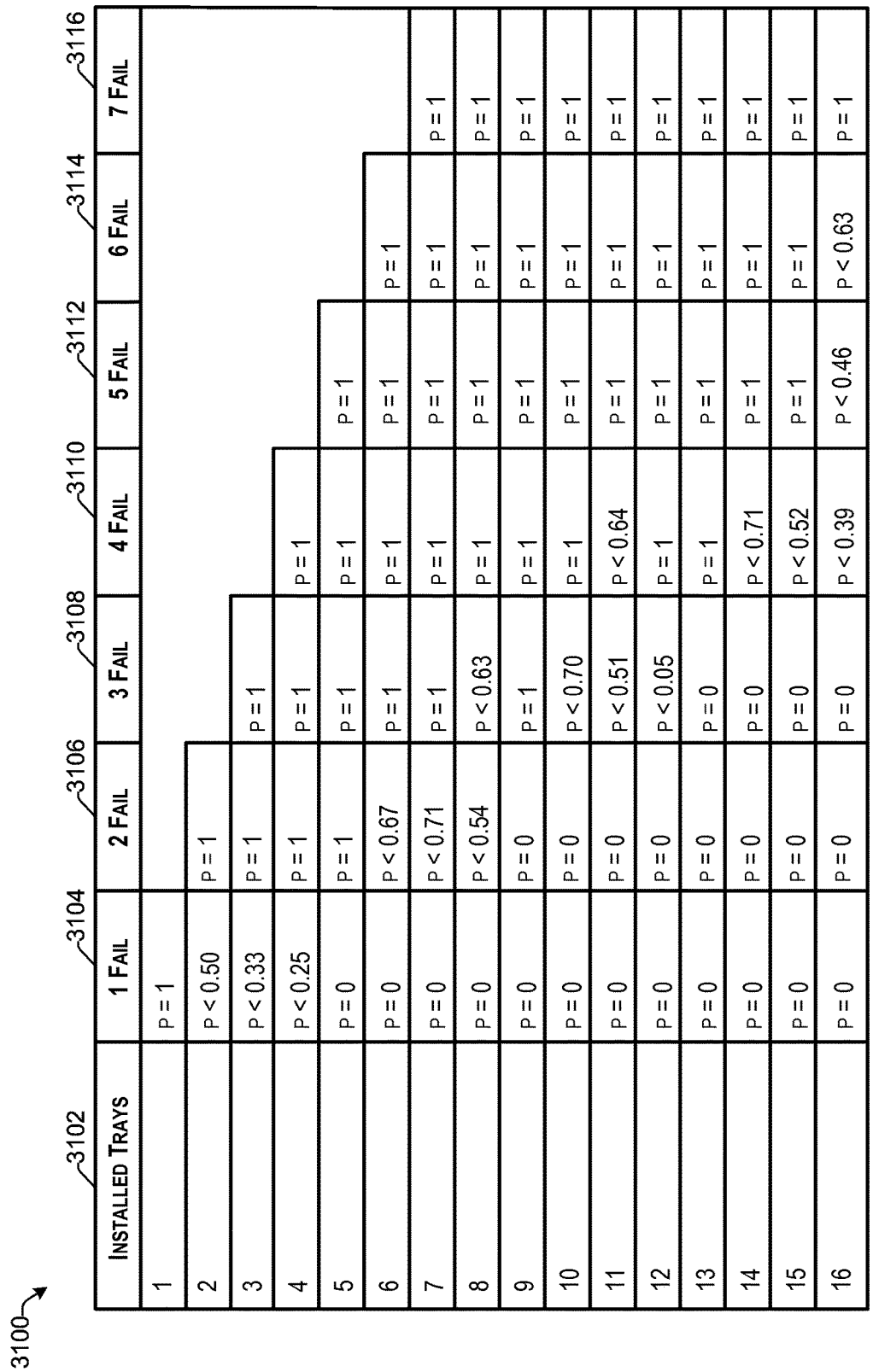
FIG. 31 illustrates an example probabilities table for multiple tray allocation according to some implementations.

FIG. 31 illustrates an example probabilities table 3100 according to some implementations. In this example, table 3100 demonstrates that as the number of installed trays increases, the chances of data unavailability due to tray failure decrease. Table 3100 includes a number of installed trays 3102, a probability 3104 of data unavailability if one tray fails, a probability 3106 of data unavailability if two trays fail, a probability 3108 of data unavailability if three trays fail, a probability 3110 of data unavailability if four trays fail, a probability 3112 of data unavailability if five trays fail, a probability 3114 of data unavailability if six trays fail, and a probability 3116 of data unavailability if seven trays fail. For example, if four trays are installed and one tray fails, the probability of data unavailability is less than 25 percent. However, if two of the four trays were to fail, the probability of data unavailability is 100 percent. Similarly, when 14 trays are installed, as many as three trays can fail, and in some cases four, and the data may still be available. Furthermore, the probabilities represented in the probabilities table 3100 are based on the algorithms disclosed herein. Other algorithms may render different probabilities as will be apparent to those of skill in the art having the benefit of the disclosure herein.

FIGS. 32-37 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

FIGS. 32-35 illustrate example processes for allocating extents from a plurality of available trays according to some implementations. For instance, the processes may be executed by the extent manager 11*b* when allocating extents, as discussed above. In these processes, the cutoff threshold discussed above is used to determine if there are enough trays available to allocate fewer than c extents per tray. This allows the allocation of extents to trays such that the failure of a tray would leave more than d extents available, providing uninterrupted service, where d is the number of data extents and c is the number of coding protection extents. If there are not enough trays for each tray to get fewer than c extents, the processes may minimize the number of trays that would cause data unavailability by placing exactly c extents on all but the most lightly loaded tray. The most lightly loaded tray gets the cutoff threshold number of extents. This gives a data unavailability probability of 1/t with t trays. The processes also may minimize the number of extents that are relocated to maintain optimal layout when trays are added.

Figure 32:
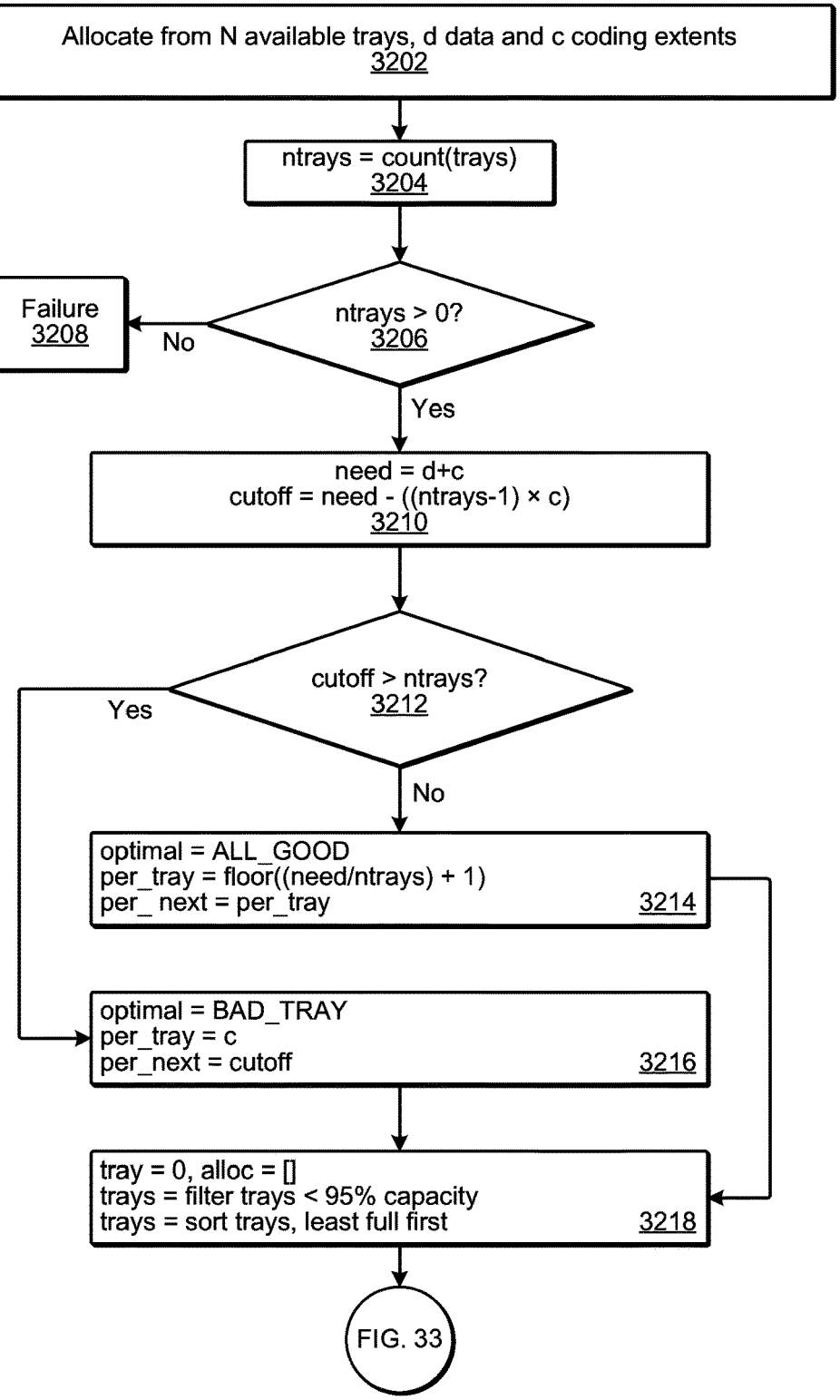
FIG. 32 is a flow diagram illustrating an example process for allocating extents from a plurality of trays according to some implementations.

FIG. 32 illustrates an example process 3200 in which a first allocation pass attempts to allocate the extents as computed by the setup. If there are sufficient disks with sufficient free extents in the available trays, this will succeed. If the process is unable to obtain the precomputed number of extents from the trays, the process proceeds to FIG. 33.

At 3202, the process allocates, from N available trays, d data extents, and c coding (protection) extents. For example, a 20+6 protection class has 20 data extents and 6 coding extents.

At 3204, the process sets the number of trays equal to the tray count.

At 3206, the process determines whether the number trays is greater than zero.

At 3208, if the number trays is not greater than zero, the process fails.

At 3210, on the other hand, if the number trays is greater than zero, the process calculates the cutoff threshold based on equation 1 discussed above.

At 3212, the process determines whether the cutoff threshold is greater than the number trays.

At 3214, if the cutoff threshold is not greater than the number trays then the per_tray threshold is calculated and the per_next variable is set equal to the per_tray threshold.

At 3216, alternatively, if the cutoff threshold is greater than the number trays then the per_tray threshold is set equal to the number of coding extents and the per next variable is set equal to the cutoff threshold.

At 3218, the process identifies trays that are less than the 95 percent capacity and sorts the trays to determine the least full trays.

Figure 33:
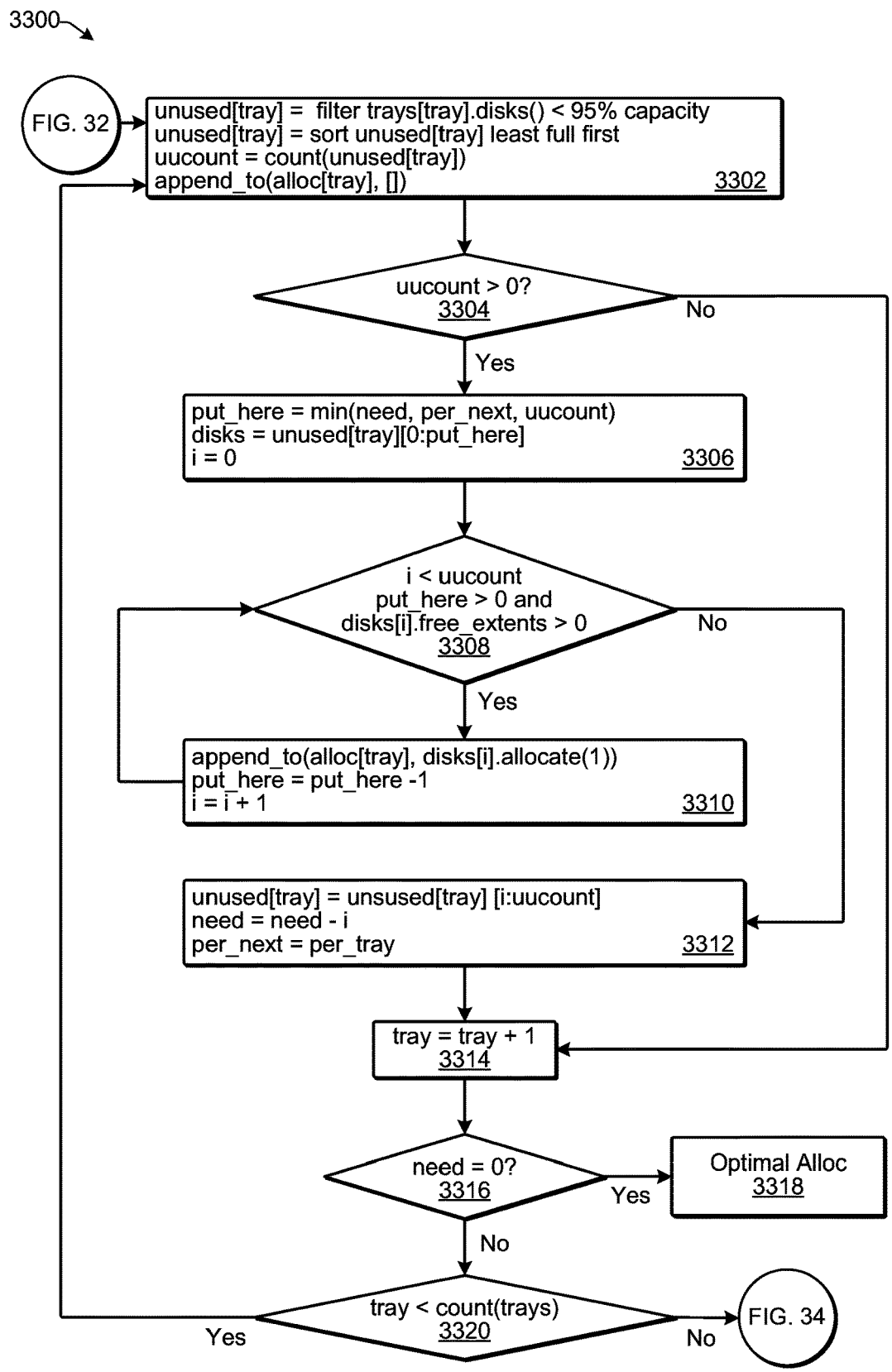
FIG. 33 is a flow diagram illustrating an example process for allocating extents from a plurality of trays according to some implementations.

FIG. 33 illustrates a process 3300 that is a continuation of the process 3200 from FIG. 32.

At 3302, the process sorts the unused trays so that the least full tray is first and sets a variable uucount equal to the number of unused trays.

At 3304, the process determines whether the variable uucount is greater than zero.

At 3306, if the variable uucount is greater than zero, the process sets a put_here variable based on a minimum value of need, per_next, and uucount, and sets a counter variable i equal to zero.

At 3308-3314, the process allocates extents from disks and trays in an iterative manner.

At 3316, the process determines whether the "need" (c+d) is equal to zero.

At 3318, if the process determines that the need is equal to zero, the allocation is determined to be optimal, i.e., the number of extents per tray is less than or equal to c, and the process may end.

At 3320, on the other hand, if the need is not equal to zero, then it is determined whether the tray is less than the tray count. If so, the process may return to block 3302 to make another pass. On the other hand, if not the processing may continue to FIG. 34.

Figure 34:
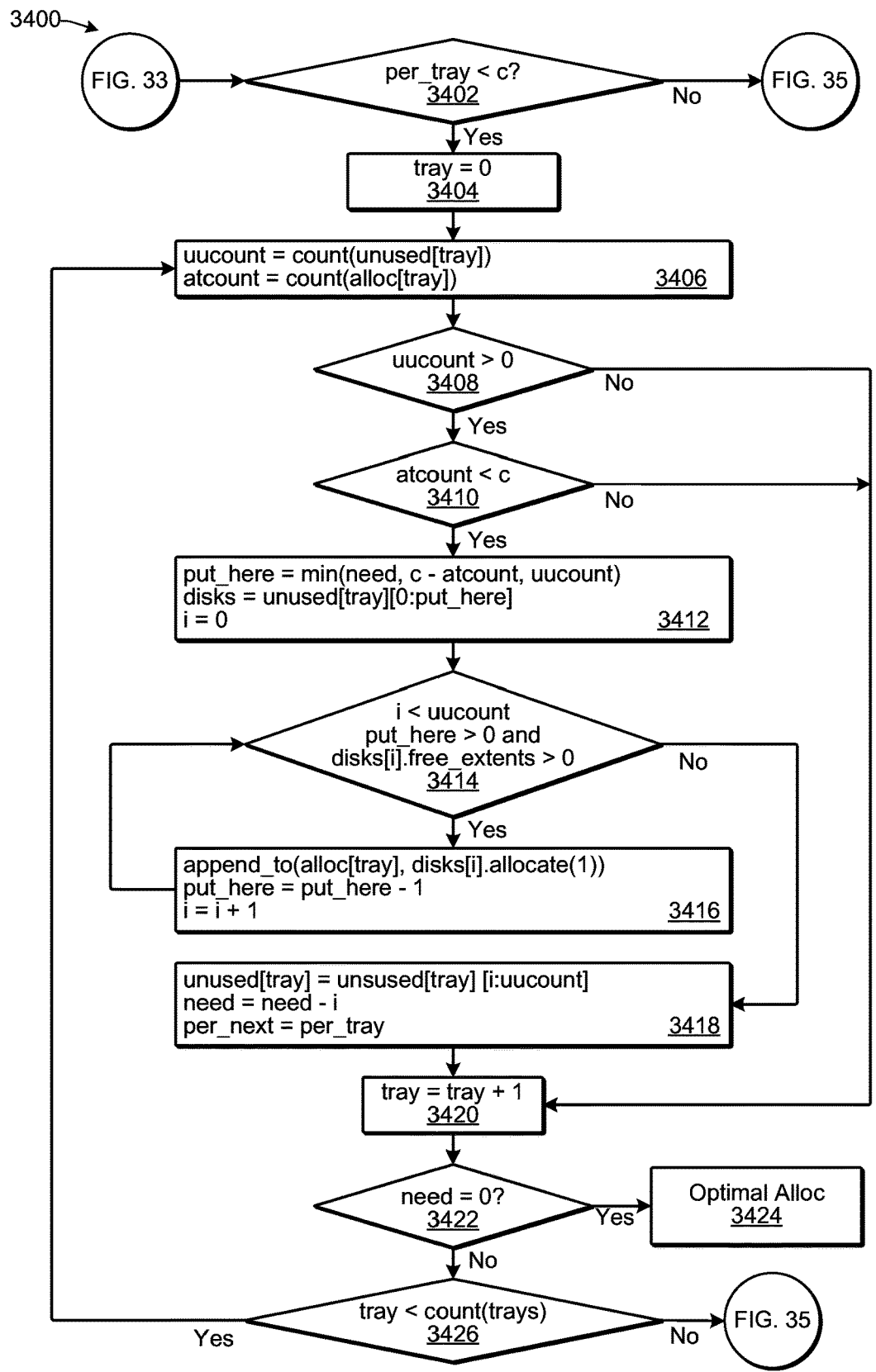
FIG. 34 is a flow diagram illustrating an example process for allocating extents from a plurality of trays according to some implementations.

FIG. 34 illustrates an example process 3400 that is executed if the first pass fails to find an optimal allocation. For example, the second pass is executed if the precomputed value for the number of extents on the trays beyond the least loaded tray is less than c. In process 3400, any allocation in which fewer than c extents are obtained from the tray is adjusted upward to exactly c. If during the process 3400, the required number of total extents is allocated, the process will end; otherwise, the processing will proceed to a third pass at FIG. 35.

At 3402, the process determines whether the per_tray variable is less than c. If not, the process moves on to FIG. 35.

At 3404, if the per_tray variable is less than c, the process sets the tray variable equal to zero.

At 3406, the process sets the uucount variable and the account variable.

At 3408-3420, the process may run through a series of iterations to attempt to allocate extents to trays and disks.

At 3422, the process determines whether the need is equal to zero.

At 3424, if the process determines that the need is equal to zero, the allocation is determined to be optimal and the process may end.

At 3326, on the other hand, if the need is not equal to zero, then the process determines whether the tray variable is less than the tray count. If so, the process may return to block 3406 to make another pass. On the other hand, if not, the processing may continue to FIG. 35.

Figure 35:
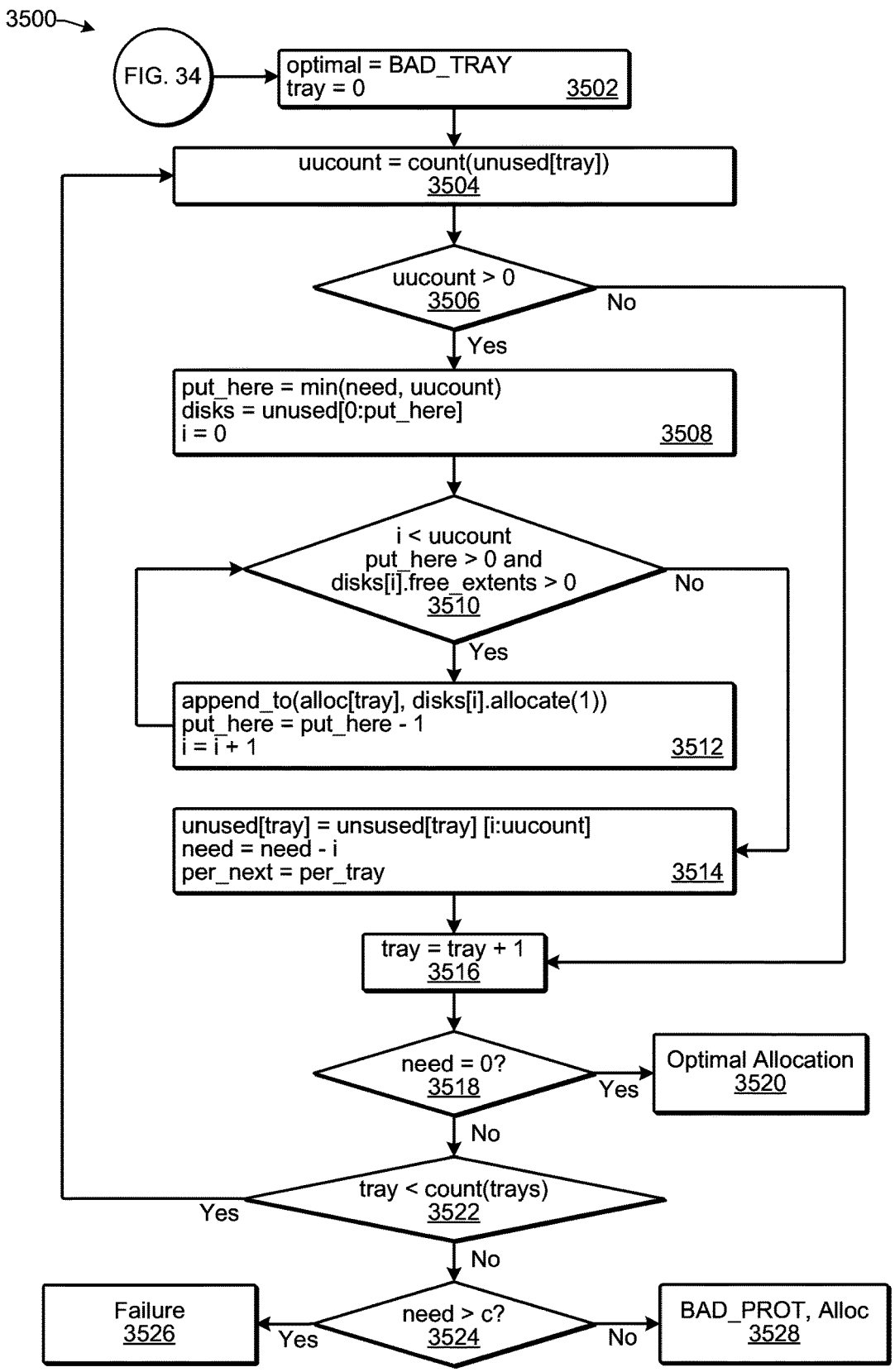
FIG. 35 is a flow diagram illustrating an example process for allocating extents from a plurality of trays according to some implementations.

FIG. 35 illustrates an example process 3500 that makes an additional attempt to determine an optimal allocation according to some implementations. In the third pass, any further required extents are drawn from the first tray located that has space available. Because the process 3400 already levelled the per-tray allocations to c, finding additional extents by this method will make the allocated protection group vulnerable to tray failure. Accordingly, if the process 3500 is able to complete the allocation of the required number of extents, the allocation is returned with an annotation that indicates that there may be a tray vulnerability. Alternatively, if the process is unable to complete the allocation, the process returns a partial allocation provided there are at least d extents allocated. Depending on the policy of the requesting protection class, this allocation may be usable but will be more vulnerable to disk or tray failures. If upon completion of the third pass, the process has been unable to draw at least d extents from the provided trays, the allocation attempt falls.

At 3502, BAD_TRAY indicates that at least one tray has more than c extents.

At 3504, the variable uucount is set to the account of unused trays.

At 3506, the process determines whether the variable uucount is greater than zero.

At 3508-3516, the process may run through a series of iterations to attempt to allocate extents to trays and disks.

At 3518, the process determines whether the need is equal to zero.

At 3520, if the process determines that the need is equal to zero, the allocation is determined to be optimal and the process may end.

At 3522, on the other hand, if the need is not equal to zero, then the process determines whether the tray variable is less than the tray count. If so, the process may return to block 3504 to make another pass. On the other hand, if not, the processing may continue to block 3524.

At 3524, the process determines if the need is greater than c.

If yes, at 3526, the process fails.

If no, then at 3528, the process indicates that there are not enough disks/trays to allocate. The process of FIGS. 32-35 performs three passes to attempt to obtain an optimal allocation of c or fewer extents on each tray. Furthermore, the process of FIGS. 32-35 is just one example of a process that may be employed for allocating extents to drives on multiple trays. Other algorithms and processes will be apparent to those of skill in the art having the benefit of the disclosure herein.

Figure 36:
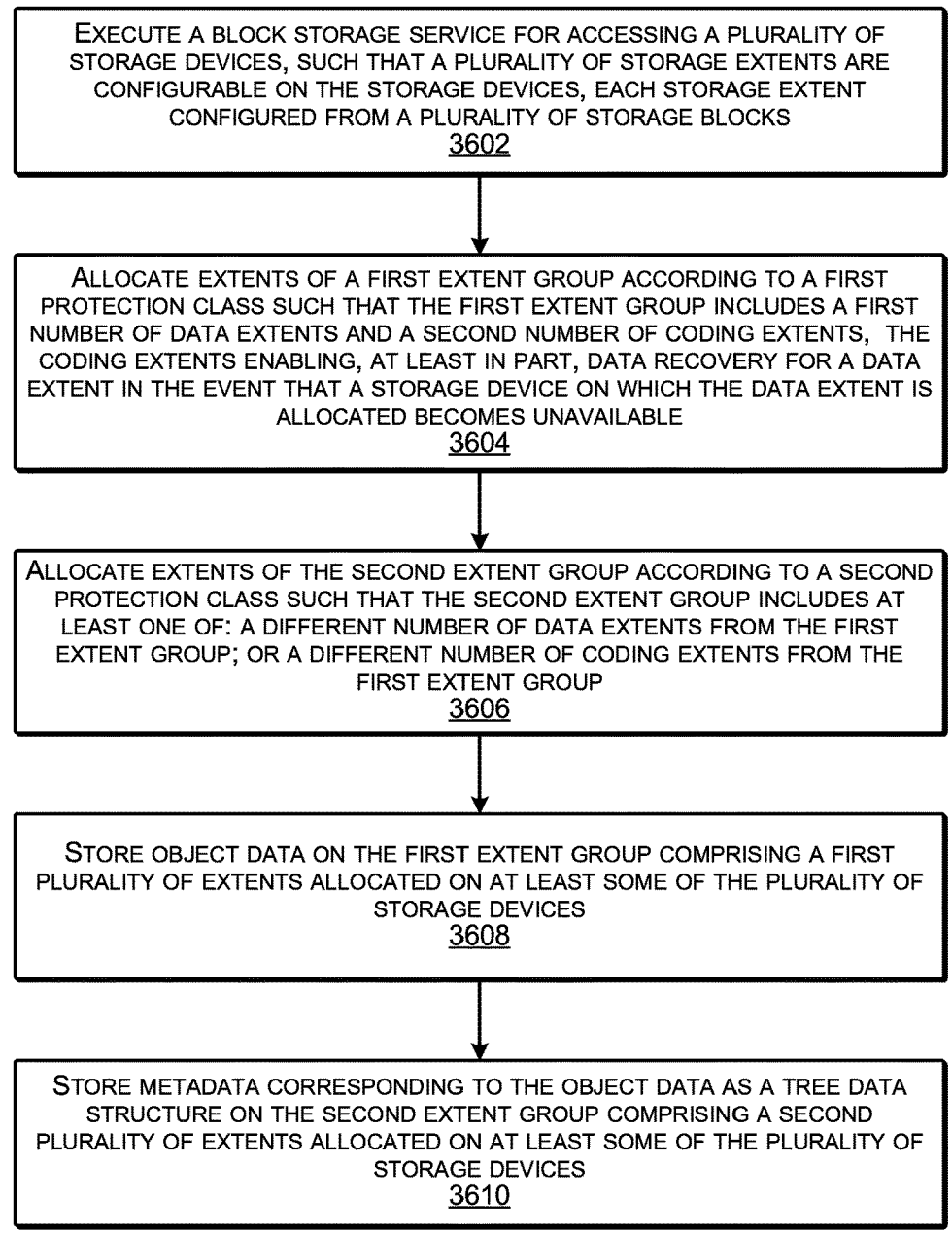
FIG. 36 is a flow diagram illustrating an example process for storing metadata according to some implementations.

FIG. 36 is a flow diagram illustrating an example process 3600 according to some implementations. In some examples, the process 3600 may be executed by one or more processors of at least one node or other suitable computing device.

At 3602, the node may execute a block storage service for accessing a plurality of storage devices. For example, a plurality of storage extents may be configurable on the storage devices, each storage extent configured from a plurality of storage blocks.

At 3604, the node may allocate extents of a first extent group according to a first protection class such that the first extent group includes a first number of data extents and a second number of coding extents. For example, the coding extents may enable, at least in part, data recovery for a data extent in the event that a storage device on which the data extent is allocated becomes unavailable.

At 3606, the node may allocate extents of the second extent group according to a second protection class such that the second extent group includes at least one of: a different number of data extents from the first extent group; or a different number of coding extents from the first extent group.

At 3608, the node may store object data on the first extent group. The first extent group may comprise a first plurality of extents allocated on at least some of the plurality of storage devices.

At 3610, the node may store metadata corresponding to the object data as a tree data structure on the second extent group. The second extent group may comprise a second plurality of extents allocated on at least some of the plurality of storage devices. For example, the tree data structure may be an LSM tree data structure and may include key value pairs corresponding in part to tables maintained by the file system. Alternatively, in other examples, the second extent group may be the same protection class as the first extent group and/or the same extent group.

Figure 37:
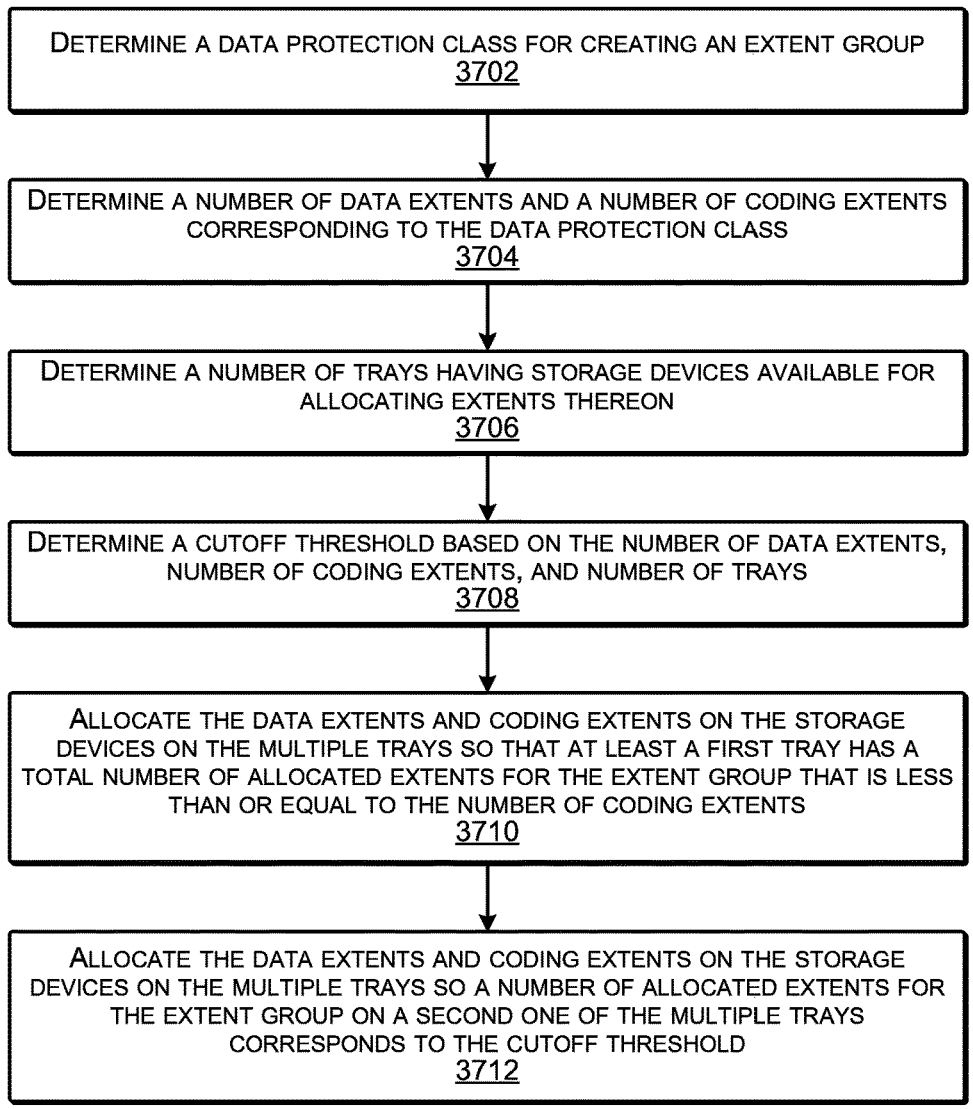
FIG. 37 is a flow diagram illustrating an example process for allocating data across trays according to some implementations.

FIG. 37 is a flow diagram illustrating an example process 3700 for allocating extents across multiple trays according to some implementations. In some examples, the process 3700 may be executed by the processor of at least one node or other suitable computing device.

At 3702, the node may determine a data protection class for creating an extent group.

At 3704, the node may determine a number of data extents and a number of coding extents corresponding to the data protection class.

At 3706, the node may determine a number of trays having storage devices available for allocating extents thereon.

At 3708, the node may determine a cutoff threshold based on the number of data extents, the number of coding extents, and the number of trays. For example, the node may apply equation (1) discussed above for determining the cutoff threshold.

At 3710, the node may allocate the data extents and coding extents on the storage devices on the multiple trays so that at least a first tray has a total number of allocated extents for the extent group that is less than or equal to the number of coding extents. In some examples, the data extents and the coding extents are allocated to the multiple trays such that, following failure of one of the trays, a number of allocated extents remaining available on other trays of the multiple trays is greater than or equal to the number of data extents.

At 3712, the node may further allocate the data extents and coding extents on the storage devices on the multiple trays so a number of allocated extents for the extent group on a second one of the multiple trays corresponds to the cutoff threshold.

Accordingly, implementations herein may include a system comprising: a storage including multiple trays, each tray including a plurality of storage devices, wherein a plurality of storage extents are configurable on the storage devices; and a one or more processors coupled to the storage, the one or more processors programmed by executable instructions to: determine a number of data extents and a number of coding extents to allocate for creating an extent group; and allocate the data extents and the coding extents on the storage devices on the multiple trays so that at least a first one of the multiple trays has a total number of allocated extents for the extent group that is less than or equal to the number of coding extents.

The one or more processors may be further programmed to allocate the data extents and the coding extents to the multiple trays such that, following failure of one of the trays, a number of allocated extents remaining available on other trays of the multiple trays is greater than or equal to the number of data extents. In addition, at least one of the coding extents may enables, at least in part, data recovery for at least one data extent in the event that a storage device on which the at least one data extent is allocated becomes unavailable.

The one or more processors may be further programmed to determine a protection class for the extent group; and the number of data extents and the number of coding extents for the extent group is determined according to the protection class. The one or more processors may be further programmed to determine a cutoff threshold for the extent group based at least in part on the number of data extents, the number of coding extents, and a number of trays having storage devices with available extents, wherein, a number of allocated extents on a second one of the multiple trays corresponds to the cutoff threshold.

The one or more processors may be further programmed to: allocate the number of extents on the second tray based on the cutoff threshold; and allocate extents on the first tray and remaining other trays of the multiple trays so that a total number of allocated extents for the group on the first tray and each of the other trays is less than or equal to the number of coding extents. The one or more processors may be further programmed to: determine a total number extents to be allocated based on the number of data extents plus the number of coding extents for the extent group; determine a product of the number of trays, minus one, times the number of coding extents; and determine the cutoff threshold from a difference between the total extents to be allocated and the product.

The one or more processors may be further programmed to: add another tray to the multiple trays; and move at least one allocated extent from the second tray to the added other tray. The one or more processors may be further programmed to: recalculate the cutoff threshold based on adding the other tray to the multiple trays; and determine a number of allocated extents to move from the second tray to the added other tray based at least in part on the recalculated cutoff threshold.

The one or more processors may be further programmed to allocate the extents for the extent group across multiple storage devices on the multiple trays so that no more than one extent for the extent group is allocated on each storage device of the multiple storage devices. The number of data extents and the number of coding extents for the extent group may be determined according to a protection class provided by a block storage service, wherein individual extents comprise a plurality of blocks of storage, the system further comprising a memory configured to store extent group information indicative of a mapping of the allocated extents to the extent group according to the protection class.

Furthermore, implementations herein may include a method executed by one or more processors of a node in communication with a storage including multiple trays, each tray including a plurality of storage devices, wherein a plurality of storage extents are configurable on the storage devices, the method comprising: determining, by the one or more processors, a number of data extents and a number of coding extents to allocate for creating an extent group; and allocating, by the one or more processors, the data extents and the coding extents on the storage devices of the multiple trays so that at least a first one of the multiple trays has a total number of allocated extents for the extent group that is less than or equal to the number of coding extents. The method may further include allocating the data extents and the coding extents to the multiple trays such that, following failure of one of the trays, a number of allocated extents remaining available on other trays of the multiple trays is greater than or equal to the number of data extents.

In addition, implementations herein may include one or more non-transitory computer-readable media storing instructions that, when executed by one or more processors, program the one or more processors to: determine a number of data extents and a number of coding extents to allocate for creating an extent group in a storage including multiple trays, each tray including a plurality of storage devices, wherein a plurality of storage extents are configurable on the storage devices; and allocate the data extents and the coding extents on the storage devices on the multiple trays so that at least a first one of the multiple trays has a total number of allocated extents for the extent group that is less than or equal to the number of coding extents. The instructions may further program the one or more processors to allocate the data extents and the coding extents to the multiple trays such that, following failure of one of the trays, a number of allocated extents remaining available on other trays of the multiple trays is greater than or equal to the number of data extents.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a plurality of trays, each tray including a plurality of storage devices, each storage device having multiple storage blocks for storing data, wherein a plurality of storage extents are configurable on the storage devices, each storage extent configured from a plurality of the storage blocks, each tray and respective storage devices being distinguishable from other trays and respective storage devices; and
one or more processors coupled to the plurality of trays, the processors programmed by executable instructions to:
determine a number of data extents and a number of coding extents to allocate for creating a first extent group and a second extent group;
allocate the data extents and the coding extents on the storage devices on the plurality of trays so that at least a first tray of the plurality of trays has a total number of allocated extents for the first extent group that is less than or equal to the number of coding extents;
store object data on the first extent group; and
store metadata corresponding to the object data as a tree data structure directly in the storage blocks of the second extent group.

2. The system as recited in claim 1, wherein the one or more processors are further programmed to allocate the extents of the first extent group according to a first protection class such that the first extent group includes a first number of data extents and a second number of coding extents, wherein the coding extents enable, at least in part, data recovery for at least one of the data extents in the event that a storage device on which the at least one data extent is allocated becomes unavailable.

3. The system as recited in claim 2, wherein the one or more processors are further programmed to allocate the extents of the second extent group on the plurality of trays so that at least a second tray of the plurality of trays has a total number of allocated extents for the second extent group that is less than or equal to the number of coding extents, wherein the second extent group is allocated according to a second protection class such that the second extent group includes at least one of:
a different number of data extents from the first extent group; or
a different number of coding extents from the first extent group.

4. The system as recited in claim 1, wherein the one or more processors are further programmed to:
receive, from a client, a write request;
request allocation of one or more additional extents to the second extent group for storing metadata corresponding to the write request in the tree data structure; and
store metadata corresponding to the write request in the tree data structure on the one or more additional extents allocated to the second extent group.

5. The system as recited in claim 4, wherein the one or more processors are further programmed to:
request allocation of one or more additional extents to the first extent group for storing data corresponding to the write request; and
store at least a portion of the data corresponding to the write request on the one or more additional extents allocated to the first extent group.

6. The system as recited in claim 4, wherein the one or more processors are further programmed to:
based on storage of the data corresponding to the write request, add file metadata about the data to a table maintaining file information for files stored on the first extent group; and
update the tree data structure with the file metadata added to the table.

7. The system as recited in claim 1, wherein the one or more processors are further programmed to allocate the data extents and the coding extents to the plurality of trays such that, following failure of one of the trays, a number of allocated extents remaining available on other trays of the plurality of trays is greater than or equal to the number of data extents,
wherein at least one of the coding extents enables, at least in part, data recovery for at least one data extent in the event that a storage device on which the at least one data extent is allocated becomes unavailable.

8. The system as recited in claim 1, wherein the one or more processors are further programmed to determine a cutoff threshold for the first extent group based at least in part on the number of data extents, the number of coding extents, and a number of trays having storage devices with available extents, wherein, a number of allocated extents on a second tray of the plurality of trays corresponds to the cutoff threshold.

9. The system as recited in claim 8, wherein the one or more processors are further programmed to:
determine a total number extents to be allocated based on the number of data extents plus the number of coding extents for the first extent group;
determine a product of the number of trays, minus one, times the number of coding extents; and
determine the cutoff threshold from a difference between the total extents to be allocated and the product.

10. The system as recited in claim 8, wherein the one or more processors are further programmed to:
add another tray to the plurality of trays;
move at least one allocated extent from the second tray to the added other tray;
recalculate the cutoff threshold based on adding the other tray to the plurality of trays; and
determine a number of allocated extents to move from the second tray to the added other tray based at least in part on the recalculated cutoff threshold.

11. The system as recited in claim 1, wherein the one or more processors are further programmed to allocate the extents for the first extent group across the plurality of storage devices on the plurality of trays, respectively, so that no more than one extent for the first extent group is allocated on each storage device.

12. A method executed by one or more processors of a node in communication with a plurality of trays, each tray including a plurality of storage devices, each storage device having multiple storage blocks for storing data, wherein a plurality of storage extents are configurable on the storage devices, each storage extent configured from a plurality of the storage blocks, each tray and respective storage devices being distinguishable from other trays and respective storage devices, the method comprising:
determining, by the one or more processors, a number of data extents and a number of coding extents to allocate for creating a first extent group and a second extent group;
allocating, by the one or more processors, the data extents and the coding extents on the storage devices on the plurality of trays so that at least a first tray of the plurality of trays has a total number of allocated extents for the first extent group that is less than or equal to the number of coding extents;

storing, by the one or more processors, object data on the first extent group; and storing, by the one or more processors, metadata corresponding to the object data as a tree data structure directly in the storage blocks of the second extent group.

13. The method as recited in claim 12, further comprising:
allocating the data extents and the coding extents to the plurality of trays such that, following failure of one of the trays, a number of allocated extents remaining available on other trays of the plurality of trays is greater than or equal to the number of data extents, wherein at least one of the coding extents enables, at least in part, data recovery for at least one data extent in the event that a storage device on which the at least one data extent is allocated becomes unavailable.

14. One or more non-transitory computer-readable media storing instructions that, when executed by one or more processors, program the one or more processors to:

execute a block storage service for accessing a plurality of trays, each tray including a plurality of storage devices, each storage device having multiple storage blocks for storing data, wherein a plurality of storage extents are configurable on the storage devices, each storage extent configured from a plurality of the storage blocks, each tray and respective storage devices being distinguishable from other trays and respective storage devices;

determine a number of data extents and a number of coding extents to allocate for creating a first extent group and a second extent group;

allocate the data extents and the coding extents on the storage devices on the plurality of trays so that at least a first tray of the plurality of trays has a total number of allocated extents for the first extent group that is less than or equal to the number of coding extents;

store object data on the first extent group; and store metadata corresponding to the object data as a tree data structure directly in the storage blocks of the second extent group.

15. The one or more non-transitory computer-readable media as recited in claim 14, wherein the instructions further program the one or more processors to:

allocate the extents of the first extent group according to a first protection class such that the first extent group includes a first number of data extents and a second number of coding extents, wherein the coding extents enable, at least in part, data recovery for at least one of the data extents in the event that a storage device on which the at least one data extent is allocated becomes unavailable; and allocate the extents of the second extent group on the plurality of trays so that at least a second tray of the plurality of trays has a total number of allocated extents for the second extent group that is less than or equal to the number of coding extents, wherein the second extent group is allocated according to a second protection class such that the second extent group includes at least one of:

a different number of data extents from the first extent group; or a different number of coding extents from the first extent group.

16. The one or more non-transitory computer-readable media as recited in claim 14, wherein the instructions further program the one or more processors to allocate the data extents and the coding extents to the plurality of trays such that, following failure of one of the trays, a number of allocated extents remaining available on other trays of the plurality of trays is greater than or equal to the number of data extents, wherein at least one of the coding extents enables, at least in part, data recovery for at least one data extent in the event that a storage device on which the at least one data extent is allocated becomes unavailable.

17. The one or more non-transitory computer-readable media as recited in claim 14, wherein the instructions further program the one or more processors to determine a cutoff threshold for the first extent group based at least in part on the number of data extents, the number of coding extents, and a number of trays having storage devices with available extents, wherein, a number of allocated extents on a second tray of the plurality of trays corresponds to the cutoff threshold.

18. The one or more non-transitory computer-readable media as recited in claim 17, wherein the instructions further program the one or more processors to:

determine a total number extents to be allocated based on the number of data extents plus the number of coding extents for the first extent group;

determine a product of the number of trays, minus one, times the number of coding extents; and determine the cutoff threshold from a difference between the total extents to be allocated and the product.

19. The one or more non-transitory computer-readable media as recited in claim 14, wherein the instructions further program the one or more processors to:

add another tray to the plurality of trays;

move at least one allocated extent from the second tray to the added other tray;

recalculate the cutoff threshold based on adding the other tray to the plurality of trays; and determine a number of allocated extents to move from the second tray to the added other tray based at least in part on the recalculated cutoff threshold.

20. The one or more non-transitory computer-readable media as recited in claim 14, wherein the instructions further program the one or more processors to allocate the extents for the first extent group across the plurality of storage devices on the plurality of trays, respectively, so that no more than one extent for the first extent group is allocated on each storage device.

* * * * *